(12) United States Patent
Babikov et al.

(10) Patent No.: US 7,831,534 B2
(45) Date of Patent: Nov. 9, 2010

(54) METHOD OF BUILDING PERSISTENT POLYHIERARCHICAL CLASSIFICATIONS BASED ON POLYHIERARCHIES OF CLASSIFICATION CRITERIA

(76) Inventors: Pavel Babikov, 1702-515 Riverside Drive West, Windsor, Ontario (CA) N9A 7C3; Oleg Gontcharov, 305-3000 Sandwich Street, Windsor, Ontario (CA) N9C 4G3; Maria Babikova, 13763 Riverside Drive East, Tecumseh, Ontario (CA) N8N 1BN ( * ) Notice: Subject to any disclaimer, the term of this patent is extended or adjusted under 35 U.S.C. 154(b) by 444 days.

(21) Appl. No.: 12/069,452

(22) Filed: Feb. 11, 2008

(65) Prior Publication Data

US 2008/0140603 A1   Jun. 12, 2008

Related U.S. Application Data

(63) Continuation of application No. 10/927,811, filed on Aug. 27, 2004, now abandoned.

(60) Provisional application No. 60/498,313, filed on Aug. 27, 2003, provisional application No. 60/514,273, filed on Oct. 24, 2003.

(51) Int. Cl.
*G06N 5/00* (2006.01)

(52) U.S. Cl. .......... 706/45; 707/E17.108; 707/999.103; 715/738

(58) Field of Classification Search .......... 706/45; 707/E17.108, 999.003; 715/738
See application file for complete search history.

(56) References Cited

U.S. PATENT DOCUMENTS

| 6,233,581 | B1 | 5/2001 | Rambaud et al. |
| 6,275,957 | B1 | 8/2001 | Novik et al. |
| 6,442,566 | B1 | 8/2002 | Atman et al. |
| 7,096,216 | B2 * | 8/2006 | Anonsen .................. 707/781 |

FOREIGN PATENT DOCUMENTS

WO   WO 01/59613   8/2001

* cited by examiner

*Primary Examiner*—Wilbert L. Starks, Jr.
*Assistant Examiner*—Mai T Tran
(74) *Attorney, Agent, or Firm*—Vinson & Elkins L.L.P.

(57) ABSTRACT

A method for providing a polyhierarchical classification includes identifying properties of objects useful for distinguishing objects under classification. A plurality of criteria are identified for specializing the identified properties. A form is chosen for attributive expressions that describe classification categories. The attributive expressions are customizable and encode compositions of object properties in terms of attributes from the plurality of criteria. A domain of applicability is identified for each criterion that is representable by attributive expressions, and a dependence relationship between criteria is defined by the inclusion of attributes in the attributive expressions, where a selected criterion depends on another criterion if its domain of applicability includes at least one attribute by the other criterion. A generating polyhierarchy of criteria is automatically established by the dependence relationships between the criteria. The generating polyhierarchy of criteria implicitly defines an induced polyhierarchy of classification categories.

35 Claims, 16 Drawing Sheets

| Car Model | Manufacturer Name | Model Year | Engine Type | IC Engine Family | Fuel Type | Gasoline Grade | Electric Power Source | Battery Type |
|---|---|---|---|---|---|---|---|---|
| A4 3.0 | Audi | 2003 | IC | Piston | Gasoline | Premium | N/A | N/A |
| A-class | Mercedes | 2002 | Electric | N/A | N/A | N/A | Fuel Cell | N/A |
| Azure 6.75 | Bentley | 2003 | IC | Piston | Gasoline | Premium | N/A | N/A |
| Blazer LS | Chevrolet | 2003 | IC | Piston | Gasoline | Regular | N/A | N/A |
| Caravan SE | Dodge | 2003 | IC | Piston | Gasoline | Regular | N/A | N/A |
| CivicGX | Honda | 2003 | IC | Piston | Natural Gas | N/A | N/A | N/A |
| CL 3.2 | Acura | 2003 | IC | Piston | Gasoline | Premium | N/A | N/A |
| Corolla CE | Toyota | 2003 | IC | Piston | Gasoline | Regular | N/A | N/A |
| Crown Victoria | Ford | 2001 | IC | Piston | LPG | N/A | N/A | N/A |
| E320cdi | Mercedes | 2003 | IC | Piston | Diesel | N/A | N/A | N/A |
| Escape XLT | Ford | 2003 | IC | Piston | Gasoline | Regular | N/A | N/A |
| EV1 | General Motors | 2003 | Electric | N/A | N/A | N/A | Battery | PbAcid / NiMH |
| FCX | Honda | 2003 | Electric | N/A | N/A | N/A | Fuel Cell | N/A |
| Focus FCV | Ford | 2003 | Electric | N/A | N/A | N/A | Fuel Cell | N/A |
| Golf GLS TDI | VolksWagen | 2000 | IC | Piston | Diesel | N/A | N/A | N/A |
| HD F-250 | Ford | 2003 | IC | Piston | Diesel | N/A | N/A | N/A |
| HD F-350 | Ford | 2003 | IC | Piston | Diesel | N/A | N/A | N/A |
| Intrepid SE | Chrysler | 2003 | IC | Piston | Gasoline | Regular | N/A | N/A |
| Jimmy SLS | General Motors | 2003 | IC | Piston | Gasoline | Regular | N/A | N/A |
| M5 | BMW | 2003 | IC | Piston | Gasoline | Premium | N/A | N/A |
| Necar 2 | Chrysler | 2004 | Electric | N/A | N/A | N/A | Fuel Cell | N/A |
| PT Cruiser | Chrysler | 2004 | IC | Piston | Diesel | N/A | N/A | N/A |
| RX-8 | Mazda | 2004 | IC | Rotary | Gasoline | Premium | N/A | N/A |
| S80 CNG | Volvo | 2002 | IC | Piston | Natural Gas | N/A | N/A | N/A |
| Sierra 2500 HD | General Motors | 2003 | IC | Piston | Diesel | N/A | N/A | N/A |
| Sierra 3500 | General Motors | 2003 | IC | Piston | Diesel | N/A | N/A | N/A |
| THINK | Ford | 2003 | Electric | N/A | N/A | N/A | Battery | NiCd |
| TopKick C4500 | General Motors | 2003 | IC | Piston | Diesel | N/A | N/A | N/A |
| Vanquish V12 | Aston Martin | 2003 | IC | Piston | Gasoline | Premium | N/A | N/A |
| Z8 5.0 | BMW | 2003 | IC | Piston | Gasoline | Premium | N/A | N/A |

Figure 4 (Prior Art)

PolyHDL (Polyhierarchy Definition Language)

*branch_list* ::= *branch_name* | *branch_list, branch_name*
*criterion_definition_statement* ::=
    Criterion *criterion_name* { *branch_list* } |
    Criterion *criterion_name* : *definition_domain* { *branch_list* }
        //minimum 1 branch, maximum undefined.

*brunion* ::= *criterion_name::branch_name* | *criterion_name::{ branch_list }*
*brunion_definition_statement* ::=
    BrUnion *brunion_name brunion*
        //minimum 1 branch, maximum = number of branches in the criterion.

*collection_element* ::= *brunion_name* | *brunion*
*collection_element_list* ::= *collection_element* | *collection_element_list, collection_element*
*collection* ::= { *collection_element_list* }
*collection_definition_statement* ::=
    Collection *collection_name collection*
        //minimum 1 brunion, maximum undefined
        //every brunion in the list must follow its direct parent.

*colunion_element* ::= *collection_name* | *collection*
*colunion_element_list* ::= *colunion_element* | *colunion_element_list, colunion_element*
*colunion* ::= { *colunion_element_list* }
*colunion_definition_statement* ::=
    ColUnion *colunion_name colunion*
        //minimum 1 collection, maximum undefined.

*definition_domain* ::= *collection_element* | *colunion_element* | *colunion_name* | *colunion*

*category_definition_statement* ::=
    Category *category_name definition_domain*

Figure 21

```
Criterion Manufacturer_Name
      { Acura, Aston_Martin, Audi, Bentley, BMW,
        Chevrolet, Chrysler, Dodge, Ford, GM, Honda, Mazda, Mercedes,
        Toyota, VolksWagen, Volvo }
Criterion Model_Year
      { 2000, 2001, 2002, 2003, 2004 }
Criterion Engine_Type
      { Electric, IC, Hybrid }

BrUnion Hybrid_OR_IC
      Engine_Type::{ IC, Hybrid }
Criterion IC_Engine_Family : Hybrid_OR_IC
      { Piston, Rotary }
Criterion Fuel_Type : Hybrid_OR_IC
   { Diesel, Gasoline, LPG, Natural_Gas }
Criterion Gasoline_Grade : Fuel_Type::Gasoline
      { Regular, MidGrade, Premium }

BrUnion Hybrid_OR_Electric
      Engine_Type::{ Electric, Hybrid }
Criterion Electric_Power_Source : Hybrid_OR_Electric
      { Battery, Fuel_Cell }
Criterion Battery_Type : Electric_Power_Source::Battery
      { Lithium_Ion, NiCd, NiMH, PbAcid }
```

Figure 22

METHOD OF BUILDING PERSISTENT POLYHIERARCHICAL CLASSIFICATIONS BASED ON POLYHIERARCHIES OF CLASSIFICATION CRITERIA

RELATED APPLICATIONS

This application is a continuation of co-pending U.S. patent application Ser. No. 10/927,811, filed Aug. 27, 2004, which claims the benefit of U.S. provisional patent applications METHOD OF BUILDING HIERARCHICAL CLASSIFICATIONS BASED ON HIERARCHIES OF CLASSIFICATION CRITERIA, Ser. No. 60/498,313, filed Aug. 27, 2003, and METHOD OF BUILDING PERSISTENT POLYHIERARCHICAL CLASSIFICATIONS BASED ON POLYHIERARCHIES OF CLASSIFICATION CRITERIA, Ser. No. 60/514,273, filed Oct. 24, 2003, each of which is hereby incorporated by reference in their entireties, as if set forth below.

BACKGROUND OF THE INVENTION

1. Field of the Invention

This invention relates generally to construction and/or description of polyhierarchical classifications, and, in particular, to construction and/or description of computer-stored polyhierarchical multi-criteria classifications with intrinsic recognition of domains of classification criteria applicability and simultaneous (random) access to applicable classification criteria.

2. Description of the Related Art

Classification of sets of arbitrary entities such as objects, relations, processes, concepts, subjects, etc, is a basic paradigm used by both the human mind and present-day information technologies for storage, retrieval, analysis and systematization of knowledge. The kernel principle of classification is decomposition of a classified set into a number of classes (categories) in accordance with a system of rules (criteria). If categories are ordered by a directed relationship, such as "abstract-concrete", "general-specific", or "parent-child" they form a polyhierarchical structure. The term "polyhierarchical structure" is intended to include both single and multiple inheritance relationships between categories. In other words, a category in a polyhierarchical structure may have one or more than one parent.

Polyhierarchical classifications provide a dramatic increase of functionality as compared with classifications constructed without ordering categories by their abstraction level. In fact, the latter can be used only to store, search for, and retrieve information. In contrast, the former creates a well-developed formalism for manipulating systems of interrelated abstract entities, thus providing the ability to process information across different abstraction levels, create new languages, formalisms, concepts, and theories.

Persistent polyhierarchical classifications include structures that are relatively stable. Persistence of a classification denotes that a set of categories and system, for example, of the "general-specific" relationships between them must be pre-designed and stored in a permanent descriptive repository. Further extensions and refinements of a persistent classification may include the introduction of new criteria, categories, and relationships. Previously developed parts of a persistent classification ordinarily remain unchanged when extending a classified set, adding new selection options to existing criteria, and introducing new criteria. Moreover, a run-time modification of a persistent classification is generally not permitted. This means, in particular, that the accessible search options including keywords and ranges of parameters are permanently stored in the descriptive repository.

Persistent classifications are a foundation for collaborative development of general, reusable, and standardized systems. For example, hierarchies of classes, subjects, and aspects in object-oriented ('OO'), subject-oriented ('SO'), and aspect-oriented ('AO') programming, respectively, are persistent classifications. The classifications used in natural sciences, such as taxonomies of species, classifications of minerals, chemicals, astronomical objects, natural languages, fundamental particles, mathematical abstractions, and countless others are persistent as well.

Classification schemes are used in the vast majority of modern computer-aided information systems such as electronic data repositories, computer modeling environments, expert systems, and many others. In particular, electronic data repositories are increasingly being used to store, search for, and retrieve data. These repositories are capable of storing and providing access to large volumes of information.

The Internet is one factor that has contributed to the demand for electronic data repositories and to their proliferation. A large number of websites on the Internet, for example, allow users to search though data repositories and retrieve information free of charge. Several well-known examples include websites advertising vehicles available for purchase. These websites typically allow the user to search though the repository by entering search criteria, such as the make of the vehicle, the model, price range, color, and the like. Internet search engines are another example of an application that searches for, and retrieves information from an electronic repository. Other applications include catalogues and directories, online documentation, and components of operating systems, as well as countless others. In short, the ability to electronically search for and retrieve information has become essential in a number of different software and commercial environments. Data repositories are often very large in size. Managing, organizing, and classifying the data is essential in maximizing the usefulness of the repository. The usual approach is to organize and manage the repository using a multi-criteria classification scheme, which can be hierarchical and/or persistent depending on the desired functionality.

A number of advanced applications work with sets of abstract entities rather than plain data. These applications may include OO, SO, and AO programming environments, as well as, component based software engineering (CBSE) systems, intelligent databases, content management and expert systems. Such applications explicitly use persistent hierarchies of classes, aspects, etc. as formal schemes for defining entities of different abstraction levels, describing relations between them, and manipulating abstract entities rather than specific objects.

The use of hierarchical classifications provides a mechanism for logical operations, such as generalization, specialization, and composition of information. For example, the OO programming paradigm is based on class hierarchies formed by inheritance relationships. Under this approach, a child class includes the data (instance variables) and functions (class methods) of its parents, along with some additional ones. In other words, the child class is similar to its parents except for some additional features. This creates a so-called abstraction mechanism (i.e., a way of accessing a class object by reference to its abstract parent class with automatic data mapping and class method dispatch). Object-oriented hierarchies can be treated as multi-criteria classifications whose criteria are represented by sets of inheritance relationships sharing common parent classes.

Modern approaches to multi-criteria classification schemes generally use representations in terms of trees, directed acyclic graphs ('DAGs'), compositions of trees, or set based formulas. These approaches, however, do not provide efficient support for development, maintenance, and use of general persistent polyhierarchical classifications. Several disadvantages of present-day multi-criteria classification schemes are discussed below for the case of a simplified classification of automobiles.

In FIG. 1, an illustrative tree-structured hierarchical classification scheme 100 is presented, where boxes (nodes of the tree) denote categories. The tree structure 100 graphically presents one illustrative example of a system of parent-child relationships, described above. For example, node 104 is the parent to nodes 108 and 112. Likewise, node 112 is the parent to nodes 116, 120, and 124.

The criteria in this example include manufacturer name, model year, engine type, internal combustion (IC) engine family, electric power source, fuel type, gasoline grade, and battery type. Some criteria are applicable to only specific kinds of cars, but not to other types of cars. For example, the "gasoline grade" criterion is applicable only for cars with IC engines requiring gasoline fuel. Likewise, the "battery type" criterion, in this illustrative example, is applicable only for electric cars with battery power sources. Such criteria can be called conditional criteria because their applicability depends on specific selections made under more general criteria.

Information on available cars in a hypothetical electronic data repository may be organized and searched based on the criteria shown. For example, data entries related to Toyota cars manufactured in 2003 with internal combustion piston engines fueled with regular gasoline should be classified under node 128, while data on electric Toyota cars manufactured in 2003 with Lithium Ion batteries should be classified under node 132. To retrieve information on these cars, the corresponding attribute values (i.e., Toyota, 2003, IC engine, etc.) may be entered in succession.

Unfortunately, the tree-structured hierarchical classification scheme 100 forces the developer to decide early on which criterion is most important. For example, in FIG. 1, the most preferable (i.e., most significant) criterion in the classification scheme 100 is "manufacturer name". The second and third most preferable criteria are "model year" and "engine type", respectively. The developer is forced to rank the importance of the different criteria because tree hierarchies require strictly predefined sequence of selections. The applicable, but lower ranking criteria are not searchable until the higher ranking (i.e., more preferable criteria) are satisfied. For example, the classification 100 does not provide the capability to search for electric cars directly. Instead, the search begins with the most preferable criterion, the make of the car. After this selection, the search progresses with the next most preferable criterion, the model year, and so on. If information on all electric cars had to be retrieved, using this classification scheme, a variety of combinations of makes and model years must be browsed by moving logically up and down the tree 100. This limitation is commonly referred to as the "predefined path" problem.

Another disadvantage of tree-type hierarchies is the mutual exclusivity of subcategories corresponding to different selection options of a criterion. When a category of objects is specialized by a criterion, only one of the available options is selectable (i.e., different options are considered to be mutually exclusive). This may be confusing, for example, if a feature defined by a lower-ranking criterion is equally applicable for several options of higher-ranking criteria. For example, cars with internal combustion engines in the classification 100 are supplied with engine specifications like IC engine family, fuel type, etc. A practical classification scheme should include the same specifications for hybrid engine cars, since they are also equipped with IC engines. In other words, the sub-tree rooting from node 104 has to be duplicated starting from node 136. If, for example, information was needed on all cars having a rotary internal combustion engine, the information is not capable of being retrieved in one step. Instead, the selection of engine type (e.g., internal combustion, hybrid, etc.) is made first, thus requiring separate searches of hybrid cards and regular cars with IC engines, and the results are then manually combined. This problem is made more confusing if access to a feature of interest required multiple selections for every combination of appropriate higher-ranking options.

These disadvantages arise, at least in part, due to the conjunctive logical structure of tree hierarchies. Elementary specializations performed by selecting options by different criteria describe a set of traits connected by the logical operator 'AND'. For example, node 124, in FIG. 1, describes a subcategory of cars "manufactured by Toyota" AND "made in 2003" AND "having internal combustion engines" AND "having piston IC engine" AND "fueled with gasoline". A one-step search for cars with rotary engines would conceivably be possible by using the disjunctive formula "internal combustion" OR "hybrid" engine. However, tree hierarchical structures do not support disjunctive superposition of properties (i.e., they do not allow the developer to describe sets of traits combined by logical OR).

Another disadvantage of tree-structured classifications relates to fast multiplication of sub-trees with increases in simultaneously applicable criteria. Continuing with the example of FIG. 1, if the simplified classification 100 includes twenty manufacturer names and five model years, then the sub-tree starting from the criterion "engine type" would have to be repeated for all meaningful combinations of these options (about 100 times). If the classification includes three additional criteria: "brand" (10 options on average), "exterior category" (10 options), and "price range" (10 options), the total number of sub-trees duplicated increases up to about 100,000.

Furthermore, a more comprehensive specialization of technical characteristics of piston engines (ICP) may require introduction of at least three more criteria: "ICP family", "number of cylinders" and "cylinders volume range" with approximately 6 to 8 options each. In this case, the sub-tree starting from the criterion "fuel type" would be repeated 20,000,000 to 50,000,000 times. Finally, a full-scale commercial version of the car classification would implement about 70 criteria in total, and the respective tree structure would contain an astronomical number of nodes. A vast majority of these corresponding categories are intermediate abstract categories and empty leaf categories because there are only a limited number of different car models in the world. However, to support the appropriate sequences of transitions between categories and retrievals of respective criteria, in most cases, a large percentage of the intermediate nodes must be enumerated and stored. Therefore, such a structure would become unmanageable due to the amount of data stored in a repository or incorporated in a computer program to support the tree hierarchy.

Directed acyclic graphs ('DAGs') that can be viewed as generalization of trees are one approach used to reduce the aforementioned predefined path problem. Similar to trees, DAGs represent hierarchical classifications as category sets strictly ordered by directed relationships, such as "abstract-concrete", "general-specific", "parent-child", etc. However, in contrast to trees, DAGs allow each category to have more than one parent (i.e., DAGs utilize the so-called multiple inheritance concept).

FIG. 2 illustrates a relatively small topmost fragment of a DAG representing the same sample classification of automobiles shown in FIG. 1. Vertices of the graph 200 (boxes) and its edges (arrows) denote, respectively, classification categories and inheritance relationships between them. Due to simultaneous applicability of some criteria the shown polyhierarchical classification uses multiple inheritance. For example, the vertex 216 of the graph 200 has two parent vertices: 204 and 208. Likewise, the vertex 228 is a common child of the vertices 216, 220, and 224. When performing a search, multiple inheritance mechanism provides an opportunity to use any criterion applicable at the current level of specialization.

A search may be started with any of the criteria, "manufacturer name", "model year", or "engine type" applicable to all cars. After a selection, the search progresses with the remaining originally applicable criteria (if any), as well as with other criteria that may become applicable due to the selection just made, and so on. For example, if "internal combustion" of the criterion "engine type" is selected, the next selection available includes one of the remaining criteria "model year", "manufacturer name", or the new criterion "IC engine family" applicable to all the cars with IC engines. In contrast to trees, DAGs provide simultaneous (random) access to all currently applicable criteria, and a sequence of selections corresponds to a particular path on the graph. For example, the vertex 228 can be reached from the root "ALL CARS" by any of six paths: (→204→216→228), (→204→220→228), (→208→216→228), (→208→224→228), (→212→224→228), or (→212→220→228) corresponding to six respective criteria transpositions.

Directed acyclic graph structured polyhierarchical classifications resolve the predefined path problem at the expense of an even more dramatic increase in the amount of descriptive data. To provide a full variety of possible selection sequences, all meaningful combination of options from different criteria, and all possible transitions between them must be represented by graph vertices and edges. To illustrate by example, a topmost sub-graph reflecting only five globally applicable criteria of the car classification: "manufacturer name", "model year", "brand", "exterior category", and "price range", would contain 167,706 vertices and 768,355 edges. Due to the large amount of mandatory stored data, DAG representations are not relevant for a vast majority of practical applications.

As described above for tree-type hierarchies, DAGs also include the disadvantage of the mutual exclusivity of different selection options of a criterion, discussed above. Thus, logical disjunctions of traits are not allowed when developing and using DAGs structured polyhierarchical classifications. Directed acyclic graphs introduce an additional limitation in relation to testing for the "parent-child" relationships between mutually distant categories. In FIG. 2, for example, this problem is illustrated when testing whether vertex 228 is a distant child of vertex 232.

A DAG is usually stored in a computer as an array of vertices, where each vertex is supplied with lists of its immediate parents and children. Continuing with the example shown in FIG. 2, to check whether vertex 228 is a distant child of vertex 232, a first step is to determine whether the list of immediate parents of vertex 228 includes vertex 232. If it does, then the latter is a parent of vertex 228. If not, the next step is to check the immediate parents of vertices 216, 220, 224 for the presence of vertex 232. If vertex 232 is found in one of these lists, then it is a grandparent of vertex 228. Otherwise the test is continued with lists of immediate parents of the grandparent vertices, and so on. If vertex 232 is not found, the algorithm finally reaches the root vertex "ALL CARS". In this case, it is concluded that vertex 232 is not a distant parent of vertex 228. From this example, it is clear that the test requires a combinatorial search over all levels of intermediate parents; hence its cost exponentially grows with the increase of the number of levels. Therefore, a test for distant inheritance may consume an unacceptable large amount of computer resources when processing relatively large DAGs.

To reduce the described problems with trees and DAGs, modern "synthetic" classification methods use compositions of multiple trees, changing the most preferable criteria for each tree. In particular, this approach may be implemented via the concept of "faceted classification". FIG. 3 illustrates one application of facets to the sample classification of automobiles shown in FIGS. 1 and 2. In this example, instead of arranging classification categories into a single polyhierarchy, the method uses a number of facet hierarchies, each reflecting an independent and persistent classification aspect.

The classification aspects represented by different facets are mutually exclusive and collectively form a description of object properties identifying classification categories. Mutual exclusivity of aspects means that a characteristic represented by a facet does not appear in another one. In this example, the sample classification 300 includes five facets: "manufacturer name", "model year", "engine type", "fuel type", and "battery type". In contrast to trees and DAGs, a faceted classification does not define categories in advance. Instead, it combines the properties described by different facets using a number of loose but persistent relationships. For example, the category 124 of the tree classification 100 corresponds to a composition of the four categories 304, 308, 312, and 316, pertaining to different facets. These categories are called facet headings.

When performing a search, a selection may be made from the facets in arbitrary order. For example, a selection may specify internal combustion engine (node 320 of the facet "engine type"), Toyota (node 304 of the facet "manufacturer name"), gasoline fuel (node 316 the facet "fuel type"), year 2003 (node 308 of the facet "model year"), piston engine (node 312 of the facet "engine type"), and so on. Each facet functions like an independent hierarchical classification (i.e., after each selection the process moves to the next applicable criterion, if any). At each step of specialization, a computer program supporting faceted classification retrieves the list of car models having the set of properties collectively defined by different facets.

Unfortunately, faceted classifications include a number of limitations. For example, faceted classification methods require splitting a classification into a set of independent hierarchies, which hides domains of criteria applicability. In the illustrative example of FIG. 3, the facet "fuel type" is applicable only to cars with internal combustion engines, while the facet "battery type" is applicable only to electric cars. The logical structure of the classification 300 itself does not include rules defining applicability of the facets in different contexts. To provide the classification with automatic recognition of domains of facets applicability, the developer is forced to supply the classification with additional descriptive data structures and/or managing programs. When developing a full-scale practical classification containing dozens or even hundreds of facets, these auxiliary descriptions and/or programs may become extraordinarily sophisticated. For example, to describe appropriate systems of facet interactions, modern Faceted Knowledge Representation (FKR) approaches, involve cumbersome mathematical constructions such as association and production rules, hierarchical relationships, roles and purposes of facets, meta-facets, and the like.

These techniques are used to describe multi-level systems of relationships between finite sets of units characterized by their relations to other units but not by their internal properties, and, in particular, to establish domains of facet applicability. Advanced FKR methods are capable of representing sophisticated systems of relationships, but when implemented for constructing complex polyhierarchical classifications based solely on "general-specific" relations, they become inconvenient for practical implementations due to the large number of auxiliary data structures. Such an approach becomes exasperating for the developer because it requires manipulating highly abstract concepts, but does not offer a clear logical approach to building classification.

In addition, faceted classifications do not automatically provide a persistent polyhierarchical structure of a classification. In fact, faceted classifications implement persistent inheritance relationships only within separate facets. The final classification categories are formed dynamically in run-time and are described by combinations of independently specified properties. If some facets are not globally applicable, a global polyhierarchical structure is not defined unless supplementary rules for defining compatibility and priority of headings from different facets are introduced. For example, it is not possible to check directly whether the category "Toyota cars fueled with gasoline", defined by a composition of the headings 304 and 316 in FIG. 3, is included in the category "Toyota cars having internal combustion engines", defined by a composition of the headings 304 and 320. Generally, extra rules for defining cross-facet inheritance relationships can be described using auxiliary data structures or program codes, mentioned above, but this would only move the problem from one part of a project to another. Because of the lack of global polyhierarchical structure, faceted classifications are ordinarily only implemented in plain data repositories supporting approximate interactive search and retrieve operations, which are usually supplemented with additional specialization techniques, such as search by keywords. They are not relevant for more advanced applications, such as supporting fully automatic classification of objects, search and retrieval of information, run-time logical operations on abstract categories, etc. without human control.

Moreover, in practical cases, it can be difficult to appropriately separate classification aspects for representation by a set of independent hierarchies. One approach is to build a relatively small number of large multi-criteria facets. If, for example, the facets "fuel type" and "battery type" shown in FIG. 3, were included as sub-hierarchies in the facet "engine type", the classification 300 would automatically resolve domains of criteria applicability. However, in this case, the developer would encounter the same problems of predefined path and/or category multiplication typical for large trees and DAGs.

Smaller facets generally improve flexibility of the classification. If, for example, the criteria "IC engine family" and "electric power sources" are extracted and represented as independent facets, they may then be suitable for use in wider contexts. This classification design, however, would result in further encumbering supplementary data structures or program codes defining applicability and consistency of facets in terms of roles or purposes of facets, meta-facets, etc. Therefore, a classification developer has to find an optimal design that reduces the complexity of both individual facets and rules of their interactions (i.e., satisfy two contradictory requirements). In practice, the solution to this problem may be difficult or nonexistent. As a result, many faceted classification tools do not include mechanisms for the control of applicability and consistency of facets, thus creating an opportunity for errors when developing and using the classification tool.

Other techniques of tree or DAG compositions are unified by the concepts of "separation of concerns" ('SOC') and "multi-dimensional separation of concerns" ('MDSOC'). These approaches are currently used for building software engineering environments for subject and aspect oriented programming ('SOP' and 'AOP', respectively) and subject oriented databases ('SOD'). SOC, for example, has been developed as a supplementary tool for existing OO programming languages, such as C++, Java, and Smalltalk.

In an attempt to solve the predefined path problem, these approaches introduce one or more additional tree-structured hierarchies, similar to the unified modeling language ('UML') class diagrams that provide crosscutting access to categories of the dominant class hierarchy. In other words, different trees representing areas of concern are built and associated with the dominant tree of classes. In one example, SOC allows a developer to build any number of overlapped trees associated with the same set of classes. A set of user-defined composition rules describes application-specific scenarios of the class method dispatch and data mapping. MDSOC supports composing concerns into tree-structured hyperslices considered hyperplanes in the hyperspace of concerns, thus allowing so-called "multiple classifications" based on compositions of concerns.

SOC and MDSOC are specialized approaches intended solely for efficient non-invasive extension of object-oriented computer codes while keeping the advantages of the object-oriented inheritance mechanism. They cannot realistically be considered as general principles for constructing complicated polyhierarchical classifications with dynamically retrieving particular sub-hierarchies in run time. For instance, both concerns and hyperslices are typically tree-structured hierarchies. Generation of a new hyperslice is a static procedure since it requires additional programming, recompiling, and re-debugging the code.

In addition, the composition rules used for defining hyperslices depend on specific features of the basic object-oriented environment and descriptions of particular software system units. Structure of the dominant object-oriented class hierarchy imposes restrictions on construction of auxiliary hierarchies since the latter must refer to the same classes, instance variables, and class methods. This problem is commonly referred to as "tyranny of dominant concern". If a classification scheme uses some heuristic criteria that cannot be formally derived from the existing source code, module configurations, and the like, then a comprehensive description of additional composition rules has to be manually developed. In general cases, it is expected to be an arduous job that should require a great deal of professional expertise.

Moreover, due to their narrow specialization, SOC and MDSOC use comprehensive descriptive structures, such as sets of sub-trees describing concerns and hyperslices, rules of class method dispatch, and the like, which are unnecessary for the classification purpose itself. Even after removing the object-oriented specific components and leaving only descriptions of inheritance relationships, dependencies would not allow SOC or MDSOC to be implemented for real-world polyhierarchical classifications due to the amount of programming work and computer resources required for development, storage, and maintenance.

Another classification approach is based on using set-theoretic operations and logical formulae for building a classification in run-time. These approaches generally use the concept of "set based classification". They are typically implemented in the so-called dynamic classification tools, as well as in the rough sets theory and granular computing methods intended for machine learning and data mining.

A set based classification typically uses an information table containing attributive descriptions of properties of classified objects. FIG. 4 illustrates an information table 400 corresponding to the illustrative classification of automobiles shown in FIGS. 1, 2, and 3. A first field 404 of the table 400 lists classified car models, while the remaining eight fields specify car characteristics. Each of these eight fields corresponds to a criterion from the tree classification 100 shown in FIG. 1.

Table cells contain the attributes defining respective car characteristics, where each relevant attribute corresponds to one of the available selection options. The set of attributes from a table row exhaustively specifies a composition of characteristics definable by the eight-criteria classification. The attributes can be represented not only by enumerated identifiers but also by loose keywords or numerical parameters taking values from a continuous range. A search may be conducted that includes the selection of discrete attributes and ranges of attributive numerical parameters in arbitrary order. At each stage of selection, the repository management system retrieves a set of all objects having the specified subset of attributes. For example, using the table in FIG. 4, a search can be narrowed step-by-step by successively selecting options, such as "fuel type=gasoline", "model year=2003", "IC engine family=rotary", "manufacturer name=Mazda", and so on. The search proceeds until the retrieved set of cars is reduced to an acceptable size. In this manner, set based classifications support random access to all the classification criteria, thus resolving the predefined path problem.

Moreover, set based classifications permit retrieval of specific subsets defined by arbitrary compositions of set-theoretic operations, such as intersection, unification, and difference of subsets. When performing a search, compositions may be represented in terms of logical combinations of constraints imposed on the attributes. For example, the following illustrative formula may be used when searching the table 400 (("fuel type=gasoline" AND "manufacturer name=Mazda") OR ("fuel type=diesel" AND "manufacturer name=Toyota")) AND ("model year>2000" OR NOT "IC engine family=rotary").

Unfortunately, set based classifications are a specialized approach not generally applicable for development of real-world polyhierarchical classifications. The approach does not imply the existence of a global persistent polyhierarchy. For example, when performing a search with a dynamic classification tool, each category is described by a user-specified logical formula without any relation to other categories. Rough sets and granular computing based systems automatically build hierarchies of the so-called decision rules expressed in terms of logical formulae. However, these hierarchies are intended solely for making particular conclusions based on statistical correlations between properties of available objects, rather than for building pre-designed multi-criteria categorizations. They are not persistent because their structure depends on available sets of objects listed in the information table. Moreover, because of tree structuring, the decision rule hierarchies restore both predefined path and category multiplication problems.

Information tables do not use domains of criteria applicability. In a typical case, many criteria will only be applicable to a few of the objects, thus resulting in numerous empty or "N/A" cells. The more conditional (i.e. locally applicable) criteria that are used the greater the percentage of empty cells.

As a result, when storing information on qualitatively diverse objects, information tables become very inefficient. Moreover, the lack of automatic control of criteria applicability creates an opportunity for errors during data input into the information table. In fact, when describing a new object with conventional classifications, a data entry person manually selects all the criteria applicable to the object and enter attributes for those criteria. In a real-world application, a classification can use dozens or even hundreds of criteria, while only a few of the criteria may be applicable to a particular object. Without the advantage of automatic recognition of criteria applicability, correct data input becomes unmanageable. For example, if a classification does not provide automatic recognition of criteria applicability, some applicable criteria may be missed, or attributes by non-applicable criteria may be mistakenly entered.

Recently developed advanced search systems, such as Universal Knowledge Processor ('UKP') uses the 'dynamic taxonomies' technique (described in Italian Patent No.: 01303603), combine faceted and set based classification approaches. When interactively searching for information, the dynamic taxonomies provide a graphic user interface that allows for specializations to occur using different facets while concurrently performing set-theoretic operations between them. However, this approach inherits disadvantages of both set-based classifications, such as lack of a pre-designed global polyhierarchy and dependence on the amount of available data, and faceted classifications, such as predefined path and sub-tree multiplication problems. Its range of applicability is therefore limited. It cannot be used, for example, for non-interactive retrieval of information, manipulating abstract categories without reference to available objects, and describing diverse sets of objects.

What is needed, therefore, is a more general approach to the construction of hierarchical classifications that may provide, for example, the following set of features:

1. Global polyhierarchical system of classification categories supporting intrinsic recognition of domains of criteria applicability and simultaneous (random) access to all the applicable criteria;
2. Persistence of the polyhierarchy and, in particular, invariance of its previously developed part with respect to extension of the classified set, addition of new selection options to existing criteria, and introduction of new classification criteria;
3. Compactness of descriptive data structures that provide the ability to avoid cumulative multiplication of explicitly enumerated and mandatory stored classification categories, as well as interrelations between them, or other descriptions;
4. Support for set-theoretic operations, including intersections, unifications, complements and differences of sub-categories;
5. Efficient realization of the algorithm of testing categories for distant inheritance relationships; and/or
6. Conceptual simplicity of the design process, as well as further unplanned extensions and refinements.

The present invention is directed to overcoming, or at least reducing the effects of, one or more of the problems set forth above.

SUMMARY OF THE INVENTION

In one aspect of the present invention, a method for providing a polyhierarchical classification is provided. The method includes identifying properties of objects considered useful for distinguishing the objects under classification. A plurality of criteria are identified for specializing the identified properties of the objects. Each criterion of the plurality of criteria is defined by a set of mutually exclusive attributes so that a single classified object can be assigned no more than one attribute by the same criterion. A form is chosen for attributive expressions that describe classification categories. The attributive expressions are information structures encoding logical formulas that define compositions of object properties in terms of attributes from the plurality of criteria, and the form of the attributive expressions is customizable. A domain of applicability is identified for each criterion. The domains of applicability are representable by attributive expressions composed of attributes from other criteria or the empty attributive expression, and a dependence relationship between criteria is defined by the inclusion of attributes in the attributive expressions, where a selected criterion depends on another criterion if the attributive expression defining its domain of applicability includes at least one attribute by the other criterion. A generating polyhierarchy of criteria is automatically established by the dependence relationships between the criteria. In the generating polyhierarchy of criteria, the attributive expressions identifying domains of applicability of criteria define corresponding root categories, and each criterion originates from its respective root category. When established, the generating polyhierarchy of criteria implicitly defines an induced polyhierarchy of classification categories without requiring an explicit enumeration of the categories and an order between them.

These and other objects of the present invention will become apparent to those of skill in the art upon review of the present specification, including the drawings and the claims.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 4 schematically illustrates an information table 400 to be used in a set-based classification in place of the tree, directed acyclic graph (DAG), and faceted classifications 100, 200, and 300 as shown in FIGS. 1, 2, and 3, respectively;

FIGS. 5-22 schematically illustrate various embodiments of a method, a device, and a system according to the present invention, wherein, more specifically:

FIG. 5 schematically illustrates partial classification by a criterion $C_1$ ($N_1$=4);

FIG. 6 schematically illustrates partial classification by another criterion $C_2$ ($N_2$=2);

FIG. 7 schematically illustrates classification by superposition of criteria $C_1$ and $C_2$;

FIG. 8 schematically illustrates classification by superposition of five criteria, where the last three criteria are conditional criteria that depend of the first two;

FIG. 9 schematically illustrates the classification from FIG. 8 in the form of a directed acyclic graph (DAG), where bold borders denote root categories of criteria;

FIG. 10 schematically illustrates the generating polyhierarchy of criteria for the example as shown in FIGS. 8 and 9, where the phantom lines denote imaginary graph components;

FIG. 11 shows one illustrative embodiment of a database configuration facilitating polyhierarchical classifications based on attributive expressions in the form of simple collections;

FIG. 12 schematically illustrates a three-window graphic user interface according to various illustrative embodiments for the polyhierarchal classification as shown in FIG. 11;

FIG. 13 schematically illustrates a classification of Matlab objects by two dependent criteria in the form of a directed acyclic graph (DAG), where bold borders denote root categories;

FIG. 14 shows one illustrative embodiment of a database configuration facilitating polyhierarchical classifications based on attributive expressions in the form of collections of attributes with branch unions;

FIG. 15 shows one illustrative embodiment of a database configuration facilitating classifications based on attributive expressions in the form of unions of simple collections;

FIG. 16 schematically illustrates a fragment of the generating polyhierarchy of a classification of mathematical objects (available from QNT Software Development Inc., for example), where root categories of criteria are shown as gray blocks;

FIG. 17 schematically illustrates a sub-tree of an original custom classification;

FIG. 18 schematically illustrates a typical sub-tree of the restructured classification resulting from the sub-tree of the original classification shown in FIG. 17;

FIG. 19 illustrates a simplified block diagram of a method practiced in accordance with one embodiment of the present invention;

FIG. 20 schematically illustrates a generating polyhierarchy of criteria 2000 implicitly defining a sample polyhierarchical classification of automobile models in place of the tree, DAG, faceted, and set-based classifications as shown in FIGS. 1, 2, 3, and 4, respectively;

FIG. 21 illustrates a summary of syntax of the Polyhierarchy Description Language (PolyHDL) for describing generating polyhierarchies; and FIG. 22 illustrates one embodiment of a PolyHDL description of the sample generating polyhierarchy shown in FIG. 20.

Figure 1:
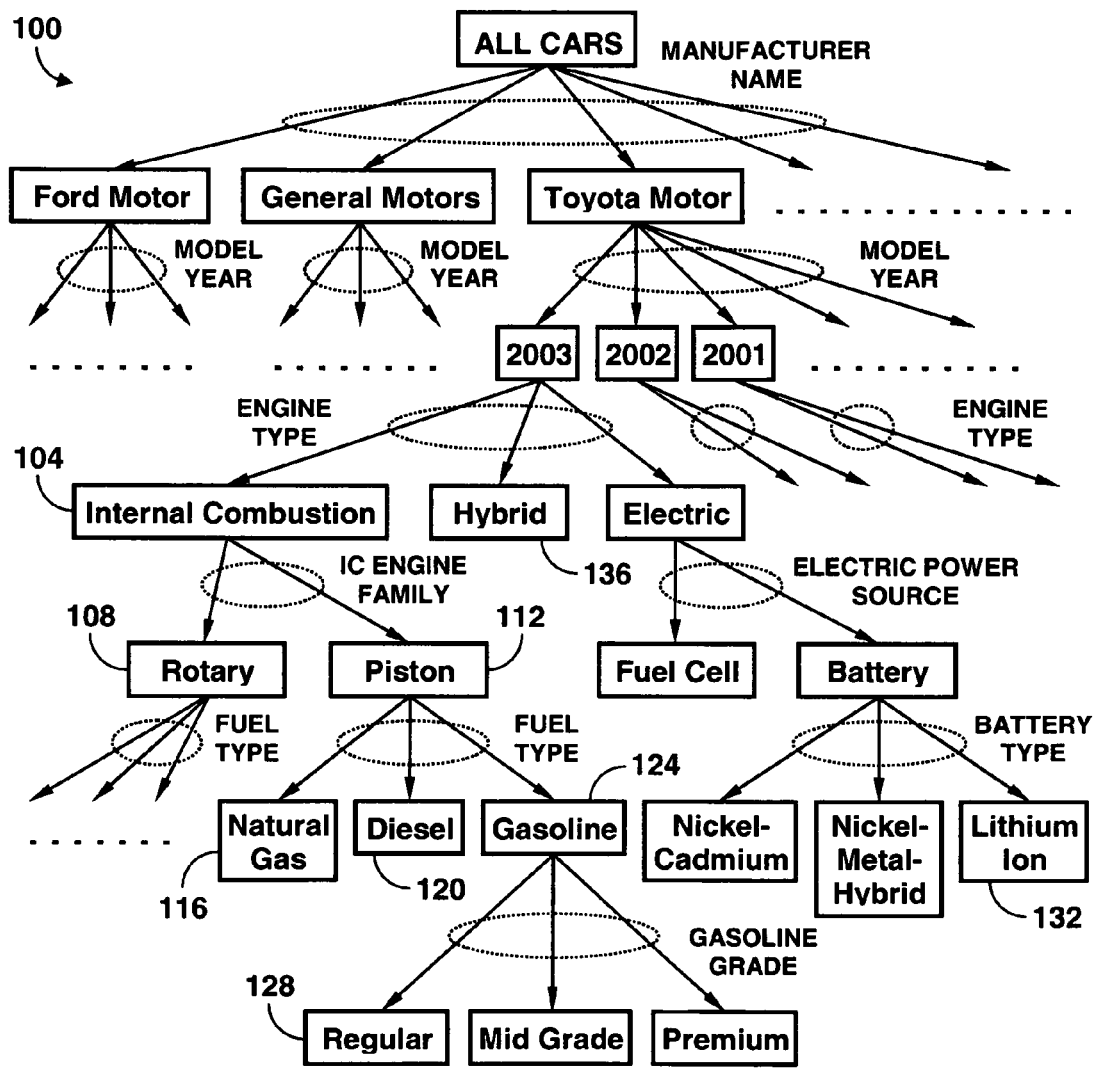
FIG. 1 schematically illustrates a tree structured multi-criteria classification scheme 100 representing a sample hierarchical classification of automobile models.
Figure 2:
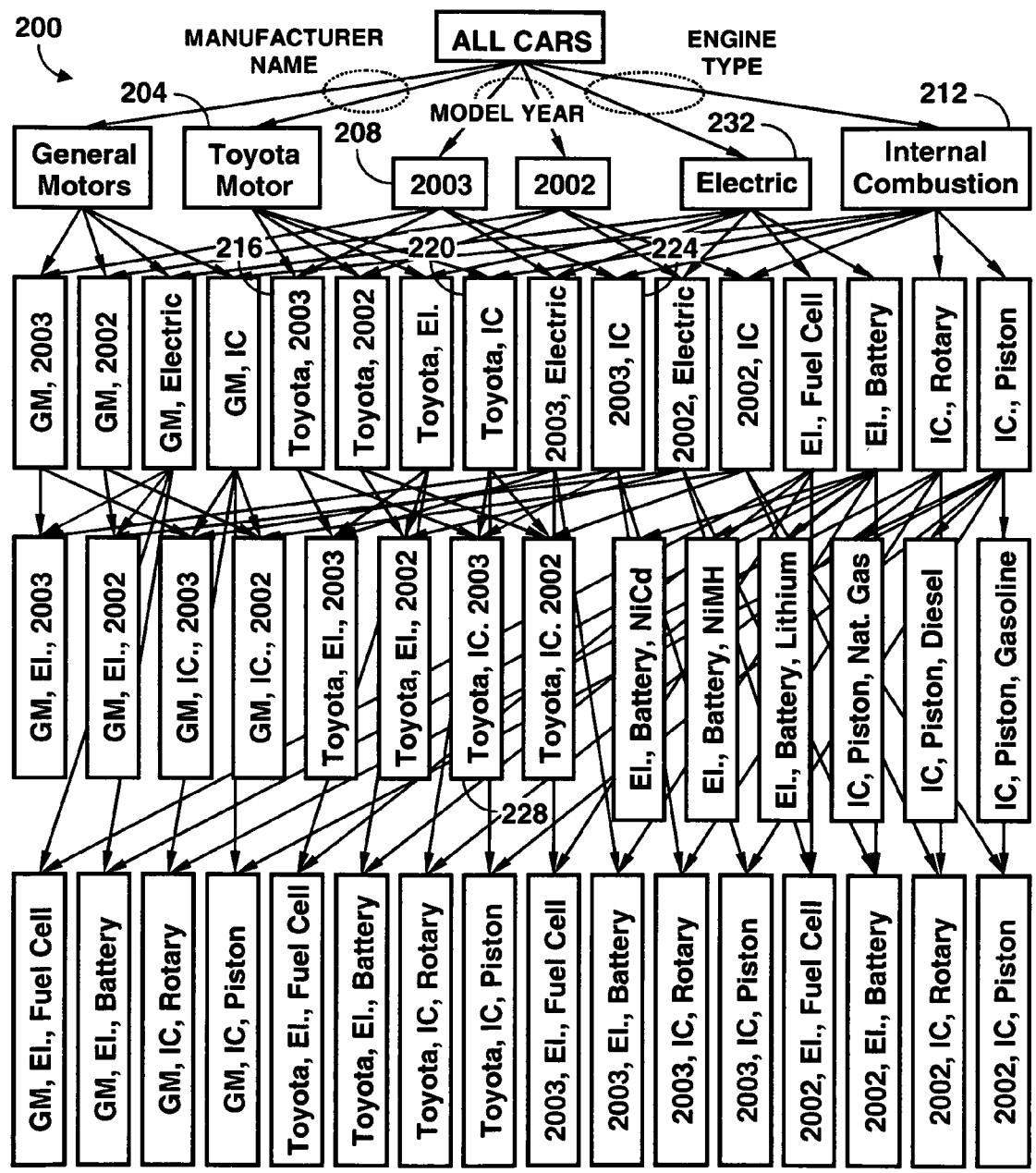
FIG. 2 schematically illustrates a topmost fragment of a directed acyclic graph (DAG) structured polyhierarchical classification scheme 200 in place of the tree classification 100 as shown in FIG. 1.
Figure 3:
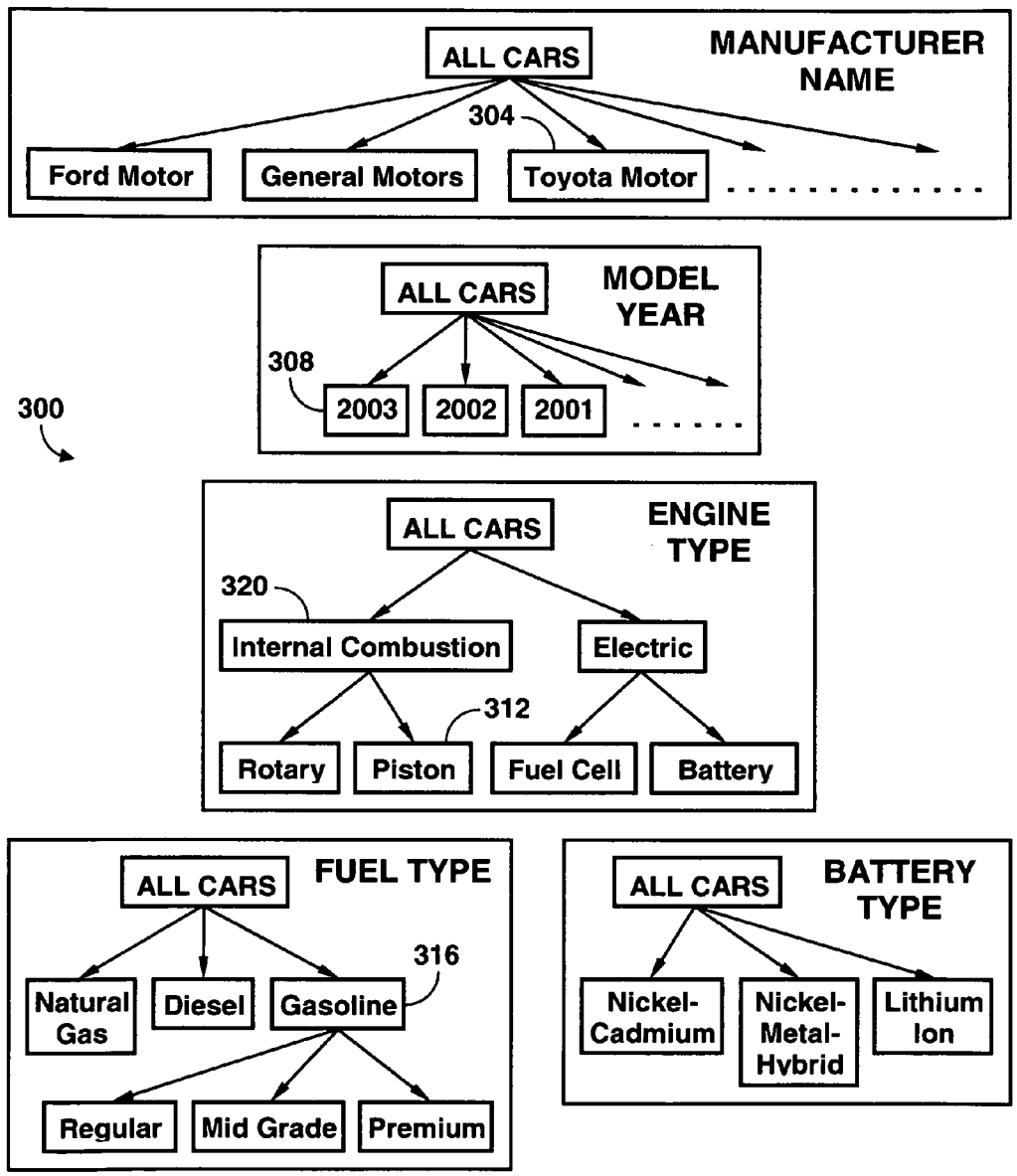
FIG. 3 schematically illustrates a faceted classification scheme 300 in place of the tree and directed acyclic graph (DAG) classifications 100 and 200 as shown in FIGS. 1 and 2, respectively.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are shown in FIGS. 5-22. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. To simplify the following discussion of the present invention, headers, such as "Illustrative Embodiments of a Classification by a System of Criteria", "Illustrative Embodiments of Polyhierarchies of Criteria", etc., have been introduced at certain points for the convenience of the reader. These headers and references in the text thereto should not be considered or interpreted as limitations to the present invention.

Various illustrative embodiments of the present invention offer general, straightforward, mathematically rigorous approaches to construction of polyhierarchical classifications with intrinsic recognition of domains of criteria applicability and simultaneous (random) access to applicable classification criteria. Classifications in accordance with the present invention alleviate ambiguities and limitations that arise when constructing conventional classifications in terms of trees, directed acyclic graphs (DAGs), compositions of trees (facets), and information tables.

A new approach in accordance with various illustrative embodiments of the present invention is based on the introduction of a kernel system of classification criteria that complies generally with the following guidelines:

Each criterion uniquely defines a particular disjoint decomposition of a classification category into a denumerable set of more specific subcategories;

A domain of definition, (i.e., area of applicability) of each criterion is explicitly defined by composition of classifications by some more general criteria; and Subsets of criteria sharing a common domain of definition do not have to be mandatorily ordered by rank or any other property.

Decomposition by a particular criterion is associated with a denumerable set of the criterion's branches identified by respective distinct symbols, such as numbers, verbose names, database records, and the like. Any meaningful ordered pair (criterion, branch) denoting an elementary specialization is called an (elementary) attribute assigned by the corresponding criterion. Hence, each criterion is responsible for the specialization of a particular property of an object by specifying a value of the respective discrete attribute. Since any criterion has its own range of definition (i.e., domain of applicability), in accordance with the second rule above, that range is specified by attributes appointed by more general criteria, and so forth. In one embodiment, a criterion cannot be applied until a specialization by more general criteria defining its domain of applicability is made, so one can say that a selected criterion depends on those more general criteria. Therefore, a recurrent sequence of the criteria forms a polyhierarchical structure established by the directed non-reflective relation of criteria dependency and is called the generating polyhierarchy of criteria.

Classification categories are implicitly identified as attributive expressions encoding compositions of elementary specializations represented in terms of attributes from different criteria. Depending on the required functionality of the target classification, the categories can be identified by whether they are (1) simple collections of attributes implying logical conjunction of elementary specializations encoded by attributes from different criteria, (2) collections with branch unions allowing, in addition, logical disjunction of elementary specializations encoded by attributes from the same criterion, (3) unions of simple collections encoding arbitrary logical statements on object properties representable in terms of elementary specializations by criteria with using conjunctions, disjunctions, differences, and negations, or (4) other application-specific attributive structures encoding logical statements on object properties in terms of elementary specializations.

These categories form an induced polyhierarchy of categories that is established by the directed relation of implication of logical statements on object properties represented by the respective attributive expressions. If criteria of the generating polyhierarchy are semantically related, some classification categories can appear to be identically empty. However, this does not restrict possibilities of application of various illustrative embodiments of the methods according to the present invention.

The generating polyhierarchy implicitly and unambiguously defines the induced polyhierarchy, thus making redundant an explicit description of the equivalent DAG. The generating polyhierarchy is an independent re-usable information structure serving as a template classification for structuring information. In general, the generating polyhierarchy may be further applied to a number of classified sets, included in more general classifications as a component, or used as a prototype for more comprehensive classifications.

The generating polyhierarchy provides a compact representation of the target classification, while requiring neither enumeration nor storage of a vast majority of the classification categories. For practical applications it is usually sufficient to store only:

the root categories defining domains of applicability of the criteria;

non-empty leaf (most derived) categories serving as containers for the classified objects; and non-empty abstract categories emerging if some objects have an incomplete description (i.e., they cannot be assigned attributes from some applicable criteria due to, for example, incomplete knowledge of their properties).

The basic operations such as selection by a superposition of criteria, retrieval of parent and child categories, tests for the pertinence of a given category to another one, and set-theoretic operations of intersection, unification, and complement (difference of subsets), can be performed directly in terms of the attributive expressions. Due to the reduction of the stored descriptive data structures, and the specifically non-local nature of that description, the managing algorithms appear to be quite simple and straightforward.

To perform basic operations, such as database access, operations on attributive expressions, and user interface, reusable non-application specific software code may be developed to support using and managing the polyhierarchy classification. The functionality of the supporting software depends on the form of the attributive expressions (e.g., simple collections, collections with branch unions, unions of simple collections, or a custom form of attributive expressions) and the configuration of the data repository used to store the generating polyhierarchy of criteria and the persistent categories of the induced polyhierarchy of classification categories. However, unlike with conventional classification methods, the software code does not depend on application-specific features of the polyhierarchical classification and the complexity of the classification.

The various illustrative embodiments of the present inventive methods offer a general tool for constructing polyhierarchical classifications that:

Describe general persistent polyhierarchical structures of dependencies that cannot be efficiently represented in terms of trees, general DAGs, or their compositions;

Are automatically produced by generating polyhierarchies of criteria that can be developed and managed as primary reusable information structures separated from the target polyhierarchy of categories;

Are highly flexible with respect to extending classified sets, introducing new kinds of classified items and classification criteria;

Substantially reduce or eliminate programming work usually required for developing and managing classifications;

Do not depend on specific features of a processing environment such as hardware configuration, operating system or database structure;

Reduce the amount of hardware resources required for development, maintenance and use of client data repositories due to the dramatic simplification of descriptive structures and managing algorithms;

Allow mathematically rigorous and clearly understandable ("look-and-feel") ways of design that do not require special knowledge;

Provide a natural approach to development of intelligent and flexible graphic user interfaces;

Could be efficiently implemented with existing database management systems, and

Create a new basic formalism for describing existing and building next-generation taxonomical systems as well as for developing software/middleware engineering environments.

Various illustrative embodiments of the present inventive methods have potential applications and intended uses such as the design, development, maintenance, and use of any hierarchically structured data repositories including (but not limited to):

Taxonomical, expert, content management, machine learning, and artificial intelligence systems;

Data and knowledge bases;

Intelligent control systems and robots;

Software and middleware engineering environments;

Application-specific lists, catalogues, and directories;

Components of operating systems (file and folder catalogues, registry, and the like);

Internet search engines;

Descriptive structures of object-, subject-, and aspect-oriented computer programs and compilers (specifically, when intensively using multiple inheritance); and On-line documentation and help subsystems.

One preferable illustrative embodiment of a method according to the present invention features the integration of additional descriptive data structures, such as connected lists of criteria, attributes, branches, root and non-empty categories, and the like into existing databases. This allows, for example, the use of standard and/or built-in database management systems for developing, maintaining, and using the resulting classifications.

Illustrative Embodiments of a Classification by a System of Criteria

Let 'A' be a finite or an infinite set of unspecified objects. A classification of objects 'a∈A' may be built as a hierarchical decomposition of A into a system of subsets (categories of classification) using a system of loose specialization rules (criteria of classification).

A simple case is a classification by a single criterion. The set A may be partitioned into mutually disjoint categories A(i) using some loose rule (criterion):

$$A = \bigcup_{i=1}^{N} A(i), \text{ where } N \geq 2 \text{ and } A(i) \cap A(j) = \emptyset \text{ if } i \neq j.$$

The partitioning above is equivalent to introducing a function attr(a) on the set A that takes integral values from 1 to N depending on the subset A(i) that the element a∈A belongs to:

$$attr(a) = i \Leftrightarrow a \in A(i), 1 \leq i \leq N.$$

This partitioning may be considered a classification by criterion C, criterion C being defined by the function attr, and categories A(i) are generated by the criterion C. Distinct values attr(a)=i are called branches of the criterion C, and ordered pairs (C, i) are called attributes in the sense that these represents properties of elements a∈A distinguished under classification by the criterion C. The number of branches of a criterion is called its cardinality.

Due to the unambiguousness of the function attr, attributes (C, i) are mutually exclusive for any given C, (i.e., no single element a∈A may be assigned more than one attribute by any particular criterion).

In addition, the numeric identification of branches (i=1, . . . , N) is used here only for notational convenience. In practical implementations of various illustrative embodiments of the methods claimed herein, the branches of criteria may be represented by any unordered but denumerable collections of distinct symbols, such as verbose names, references to database records, binary strings, programming entities, and the like.

Note that in practical implementations, it may sometimes be convenient to introduce criteria of cardinality N=1 that generates the only category, identical to the subset under classification. The use of such criteria does not impair the logic of further considerations nor limit possibilities of application of various illustrative embodiments of the methods according to the present invention.

Figure 5:
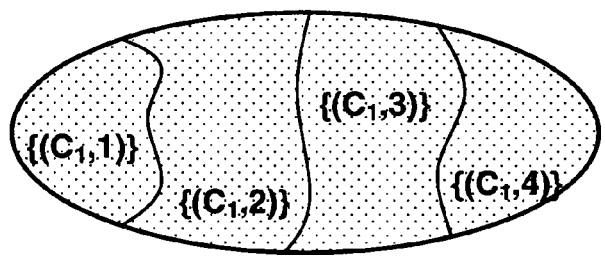
Figure 6:
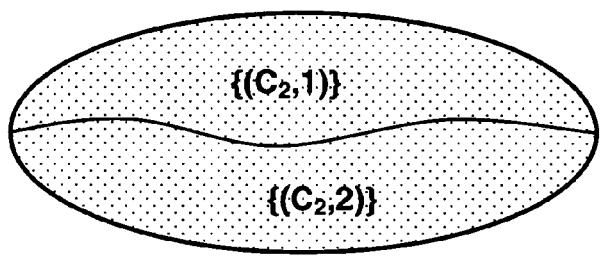

Practical cases typically require concurrent use of several classification criteria $C_p$, each criterion being defined by a correspondent unambiguous function $attr_p(a)$, $1 \leq p \leq M$. Then we have a system of M partitionings of the set A into mutually disjoint categories $A_p(i)$ such that for each p $$A = \bigcup_{i=1}^{N_p} A_p(i), \text{ where } N_p \geq 2 \text{ and } A_p(i) \cap A_p(j) = \emptyset \text{ if } i \neq j$$

$$attr_p(a) = i \Leftrightarrow a \in A_p(i), 1 \leq i \leq N_p$$

where $N_p$ is the cardinality of criterion $C_p$. Note that inclusion $a \in A_p(i_p)$ is equivalent to assigning only one attribute $(C_p, i_p)$ to the element 'a' without applying all other criteria $C_q$, $q \neq p$. In other words, assignment of each separate attribute corresponds to partial ("one-parameter") classification of the set A. Such classifications are illustrated by FIGS. 5 and 6, with respective attributes shown in curly braces.

Now, classifications generated by superpositions of criteria may be considered. For example, the inclusion $a \in A_p(i) \cap A_q(j)$, where $1 \leq p$, $q \leq M$, $p \neq q$, $1 \leq i \leq N_p$, $1 \leq j \leq N_q$, means that the element 'a' is assigned a set of two attributes $(C_p, i)$, $(C_q, j)$, without applying all other criteria (if any). Therefore, the superposition of criteria $C_p$ and $C_q$ generates the partitioning of the set A into $N_p N_q$ mutually disjoint categories $A_{pq}(i,j) = A_p(i) \cap A_q(j)$, such that:

$$A = \bigcup_{i=1}^{N_p} \bigcup_{j=1}^{N_q} A_{pq}(i, j), \quad \text{where } 1 \leq p, q \leq M, p \neq q \text{ and}$$

$$A_{pq}(i, j) \cap A_{pq}(k, l) = \emptyset \text{ if } i \neq k \text{ or } j \neq l$$

$$attr_p(a) = i, attr_q(a) = j \Leftrightarrow a \in A_{pq}(i, j), 1 \leq i \leq N_p, 1 \leq j \leq N_q.$$

Figure 7:
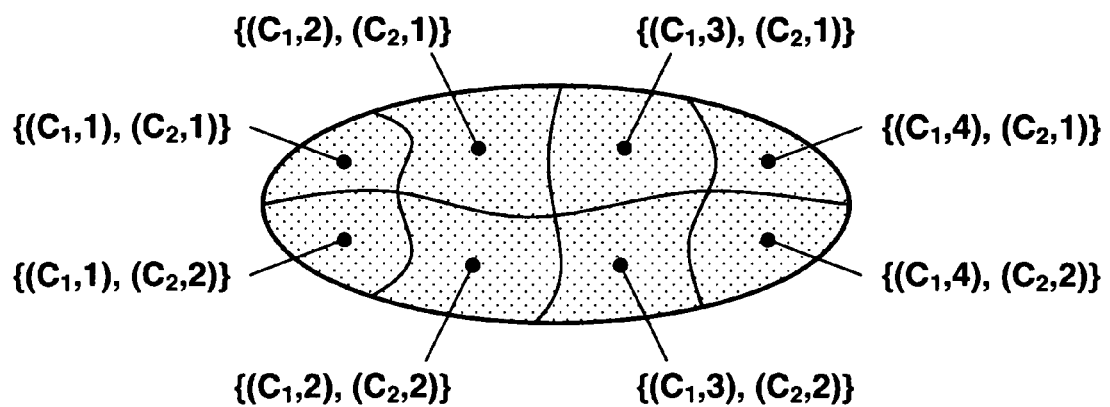

This partitioning represents a "two-parameter" classification of the set A, as illustrated by FIG. 7.

Classifications generated by superposition of more than two criteria may be built in a similar way. The inclusion $a \in A_{p(1)}(i_1) \cap A_{p(2)}(i_2) \cap \ldots \cap A_{p(L)}(i_L)$ may be considered, where $1 \leq L \leq M$, $1 \leq i_s \leq N_{p(s)}$, and $\{p(s)\} = \{p(1), p(2), \ldots, p(L)\}$ is a set of L criterion numbers such that $1 \leq p(s) \leq M$ and $p(s) \neq p(t)$ if $s \neq t$. This inclusion means that element 'a' is assigned a subset of L respective attributes $\{(C_{p(s)}, i_s), 1 \leq s \leq L\}$, without regard to all other criteria $C_q$, $q \notin \{p(s)\}$ (if any). Consequently, the superposition of criteria $\{C_{p(s)}, 1 \leq s \leq L\}$ generates the partitioning of A into $N_{p(1)} N_{p(2)} \ldots N_{p(L)}$ mutually disjoint categories $A_{\{p(s)\}}\{i_s\} = A_{p(1)}(i_1) \cap A_{p(2)}(i_2) \cap \ldots \cap A_{p(L)}(i_L)$ such that $$A = \bigcup_{i_1=1}^{N_{p(1)}} \bigcup_{i_2=1}^{N_{p(2)}} \ldots \bigcup_{i_L=1}^{N_{p(L)}} A_{\{p(s)\}}\{i_s\},$$

where $A_{\{p(s)\}}\{i_s\} \cap A_{\{p(s)\}}\{j_s\} = \emptyset$ if $\{i_s\} \neq \{j_s\}$ $$attr_{p(1)}(a) = i_1, attr_{p(2)}(a) = i_2, \ldots,$$

$$attr_{p(L)}(a) = i_L \Leftrightarrow a \in A_{\{p(s)\}}\{i_s\}, 1 \leq i_s \leq N_{p(s)}.$$

Each of these partitionings, unambiguously defined by the collection of criteria numbers $\{p(s)\}$, represents an "L-parameter" classification of the set A.

In the above-described formal classification scheme, criteria of classification are not ordered by any rank or other feature. This means that the resulting system of categories, as well as any algorithms using the resulting system of categories, are invariant with respect to the transposition (renumbering) of the criteria.

Note that if criteria $C_p$ are semantically related, then some combinations of attributes may correspond to contradictory descriptions of properties of the classified objects. For example, when classifying substances under normal conditions by two criteria: $C_1$ ("phase state") with branches "solid", "liquid", and "gas", and $C_2$ ("magnetic properties") with branches "diamagnetic", "paramagnetic" and "ferromagnetic", criteria $C_1$ and $C_2$ appear to be semantically related due to the existence of the contradictive combination of properties "gas" and "ferromagnetic". This means that the corresponding categories (like "ferromagnetic gases") are identically empty sets; that does not hinder further considerations, nor the possibilities of application of various illustrative embodiments of the methods according to the present invention. Use of the conditional criteria (see, for example, the next section titled "Illustrative Embodiments of Polyhierarchies of Criteria") and generalized forms of attributive expressions (see, for example, the sections below titled "Unions of Criterion Branches" and "Uniting Arbitrary Categories") allows for the design of classifications without the above-mentioned contradictive descriptions.

Note that the above-described scheme is directly applicable to cases of infinite denumerable sets of criteria $\{C_p, p=1, 2, 3, \ldots\}$ and infinite cardinalities $N_p$.

Illustrative Embodiments of Polyhierarchies of Criteria

In practical applications, many useful classification criteria are applicable not to the whole set A, but only to some of its subsets. In this case, those subsets (criteria domains of applicability) are explicitly described by attributes from other criteria; (i.e., the domains of applicability are themselves categories of classification).

Conditional criteria may be introduced that are applicable to those, and only those, elements $a \in A$ that have attributes $\{C_{p(s)}, j_s\}$ by some set of other criteria $\{C_{p(s)}\}$ with wider domains of definition. The category equal to the domain of definition of a conditional criterion $C_q$ is called a root category of that criterion and is denoted $root(C_q)$. Particularly, in examples given by FIGS. 5-7, $root(C_1) = root(C_2) = A$, where set A is considered as a category corresponding to the empty set of attributes. In other words, the criterion's root category introduces that criterion. Conditional criteria sharing one root category are not ordered by rank or any other feature. This means that the resulting system of categories, as well as any algorithms using the resulting system of categories, are invariant with respect to the transposition (renumbering) of the conditional criteria sharing one root category.

Note that if a classification uses some semantically related criteria whose root categories overlap, then some combinations of attributes may correspond to contradictory descriptions of object properties. This means that such categories would be identically empty sets by design. An example of such a case is the classification of substances by two criteria "phase state" and "magnetic properties" considered in the previous section "Illustrative Embodiment of a Classification by a System of Criteria". However, that does not hinder further consideration of such categories nor limit methods of application of such categories.

Figure 8:
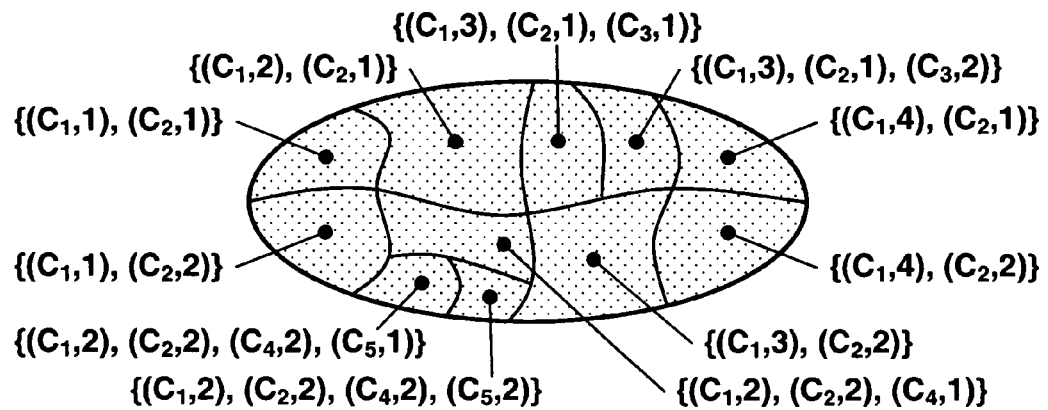
Figure 9:
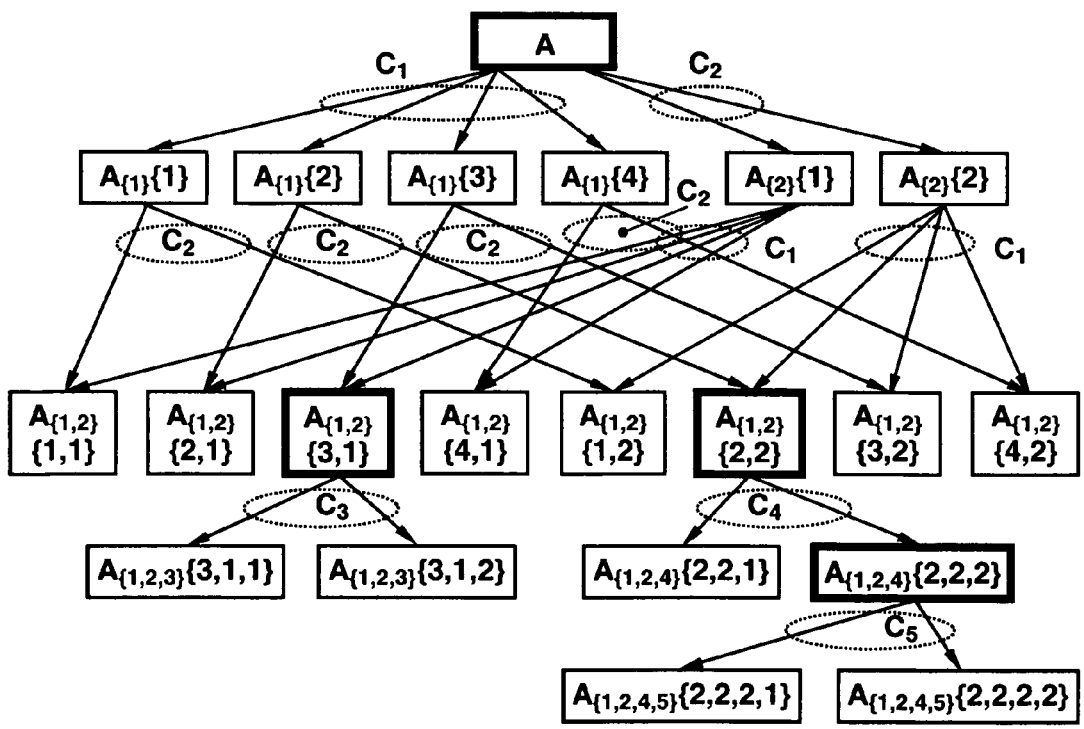

The subsets of attributes from different criteria defining categories of a classification are called simple collections. FIG. 8 gives an example of classification by conditional criteria. In this example, curly braces enclose respective simple collections. This classification can also be illustrated in the form of a directed acyclic graph (DAG), as shown in FIG. 9. The simple collections are a particular case of attributive expressions representing categories in terms of combinations of elementary specializations encoded by attributes. Generalized forms of attributive expressions are introduced, for example, in the sections below titled "Unions of Criterion Branches" and "Uniting Arbitrary Categories".

Since a root category of a conditional criterion is defined through other criteria, the construction of a criteria system is essentially recurrent. First, criteria may be introduced on the whole set A (the most general category). Then the categories formed by attributes from those criteria can be used for introducing additional conditional criteria. As a result of assigning attributes by those additional criteria, new categories are formed that can be used as roots for introducing yet other criteria, and so forth.

A directed binary relation of dependence between conditional criteria may be introduced. We will say that criterion $C_u$ depends on criterion $C_v$, $v \neq u$, and use notation $C_u \subset C_v$, if the simple collection defining the category $root(C_u) = A_{\{p(s)\}}\{i_s\}$ includes an attribute by the criterion $C_v$, i.e., $v \in \{p(s)\}$. Note that the relation of dependence is non-reflexive, that is $C_u \not\subset C_u$, and is transitive, that is, from $C_u \subset C_v$ and $C_v \subset C_w$, it follows that $C_u \subset C_w$. Combination of these properties guarantees the absence of loops (cyclic paths) in the system of all possible relations of dependence defined on a set of criteria.

Figure 10:
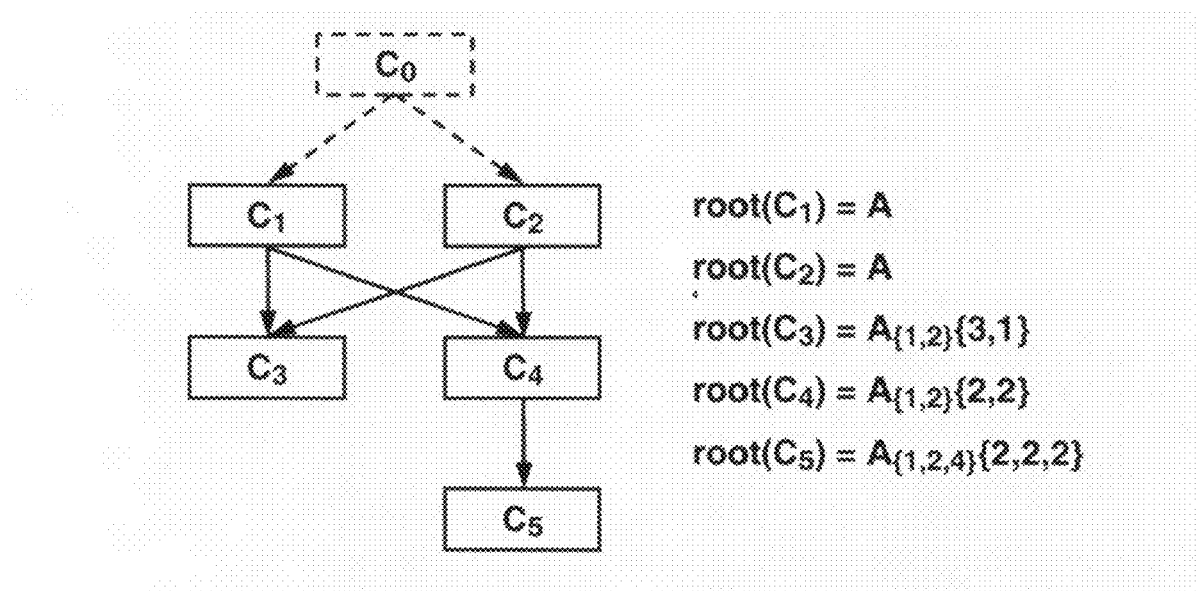

For the purpose of illustration, a subset of independent criteria may be considered whose shared root category is the whole set A. In this case, an additional imaginary criterion $C_0$ may be introduced that generates the category equal to the whole set A, and corresponding imaginary relations of dependence between those originally independent criteria and $C_0$. Then, the recurrent system of conditional criteria becomes a polyhierarchy that may be represented, for the purpose of illustration, by a connected directed acyclic graph (DAG) with a single root vertex $C_0$. Vertices of this graph and its edges represent, respectively, criteria and dependence relations between them. The generating polyhierarchy of criteria for the sample classification above (see FIGS. 8 and 9) may be visually represented like the DAG as shown in FIG. 10.

It may be observed that the introduction of the imaginary criterion $C_0$ permits all other classification criteria to be considered as conditional. Therefore, it is possible to consider polyhierarchies of criteria while making no distinction between independent and conditional criteria.

Illustrative Embodiments of the Induced Polyhierarchies of Categories

It is easy to show that categories generated by a polyhierarchy of criteria form a polyhierarchy themselves, with a directed binary relation of inclusion, starting from one topmost category A. The inclusion relation $A_{\{p(s)\}}\{i_s\}$ ($1 \leq s \leq L_1$) $\subset A_{\{q(t)\}}\{j_t\}$ ($1 \leq t \leq L_2$) for categories viewed as subsets of imaginary objects is equivalent to the inclusion relation $\{(C_{p(s)}, i_s)\} \supset \{(C_{q(t)}, j_t)\}$ for simple collections defining those categories. For example, in FIGS. 8 and 9 the categories $A_{\{1,2,4,5\}}\{2,2,2,1\}$ and $A_{\{1,2\}}\{2,2\}$ are defined by the simple collections $\{(C_1, 2), (C_2, 2), (C_4, 2), (C_5, 1)\}$ and $\{(C_1, 2), (C_2, 2)\}$, respectively. It follows from the inclusion $\{(C_1, 2), (C_2, 2), (C_4, 2), (C_5, 1)\} \supset \{(C_1, 2), (C_2, 2)\}$ that each element $a \in A_{\{1,2,4,5\}}\{2,2,2,1\}$ has at least the same two traits, specified by attributes $(C_1, 2), (C_2, 2)$, as all the elements of $A_{\{1,2\}}\{2, 2\}$. Hence all the elements of the former category pertain to the latter one, (i.e., $A_{\{1,2,4,5\}}\{2,2,2,1\} \supset A_{\{1,2\}}\{2,2\}$). Therefore, a category polyhierarchy can be described directly in terms of simple collections.

Categories related to a given category by relations of inclusion and differing from it by only one attribute may be considered either immediate parents (immediate base) categories or immediate children (immediate derived) categories, depending on the direction of the inclusion relation. To prove the existence of a global polyhierarchical structure of a plurality of categories and give a guideline for practical implementations, three tasks are considered below: 1) find all immediate parent (base) categories of a given category; 2) find all immediate child (derived) categories for a given category; and 3) determine whether one of two given categories is a more general category than the other, (i.e., check if they are related by inclusion).

Consider, for example, any given category $A_{\{p(s)\}}\{i_s\}$ with a nonempty set of attributes $\{(C_{p(s)}, i_s), 1 \leq s \leq L\}$. Note that the subset of criteria $\{C_{p(s)}, 1 \leq s \leq L\}$ form a sub-hierarchy with the same imaginary base criterion $C_0$ as the whole criteria polyhierarchy. Therefore, that sub-hierarchy contains at least one criterion $C_{p(m)}$, $1 \leq m \leq L$, such that no criterion from $\{C_{p(s)}\}$ depends on it, i.e., $C_{p(s)} \not\subset C_{p(m)}$, $s=1, 2, \ldots, L$. This criterion, $C_{p(m)}$, is called a leaf criterion of category $A_{\{p(s)\}}\{i_s\}$. For example, in FIGS. 8 and 9, the category $A_{\{1,2,4\}}\{2,2,2\}$ defined by simple collection $\{(C_1, 2), (C_2, 2), (C_4, 2)\}$ has only one leaf criterion $C_4$, since $C_1 \not\subset C_4$ and $C_2 \not\subset C_4$ while $C_4 \subset C_1$ and $C_4 \subset C_2$. The category $A_{\{1,2\}}\{2,2\}$ defined by simple collection $\{(C_1, 2), (C_2, 2)\}$ has two leaf criteria $C_1$ and $C_2$, since $C_1 \not\subset C_2$ and $C_2 \not\subset C_1$.

If $C_{p(m)}$ is excluded from the considered sub-hierarchy, a reduced sub-hierarchy of L–1 criteria is produced. Therefore, there is an immediate base category $A_{\{q(t)\}}\{k_t\}$ with one less attribute $\{(C_{q(t)}, k_t), 1 \leq t \leq L-1\} = \{(C_{p(s)}, i_s), 1 \leq s \leq L, s \neq m\}$, related to the given category by inclusion $A_{\{p(s)\}}\{i_s\} \subset A_{\{q(t)\}}\{k_t\} \Leftrightarrow \{(C_{p(s)}, i_s)\} \supset \{(C_{q(t)}, k_t)\}$. Because the immediate base category $A_{\{q(t)\}}\{k_t\}$ has fewer attributes, the immediate base category $A_{\{q(t)\}}\{k_t\}$ corresponds to a more abstract classification level.

Thus, for each category $A_{\{p(s)\}}\{i_s\} \neq A$, there is a set of immediate base categories, their number exactly being equal to the number of that category's leaf criteria. This, in particular, illustrates that categories generated by a polyhierarchy of criteria (generating polyhierarchy) also form a polyhierarchy. The latter may be referred to as an induced polyhierarchy of classification categories.

A free criteria of a given category $A_{\{p(s)\}}\{i_s\}$ are those criteria $C_f$ that are defined for that category but not used in any of its attributes, (i.e., $A_{\{p(s)\}}\{i_s\} \subseteq \text{root}(C_f)$ and $f \notin \{p(s)\}$). For example, in FIGS. 8 and 9 the categories $A_{\{2\}}\{2\}$ and $A_{\{1,2,4\}}\{2,2,2\}$ each have one free criterion, $C_1$ and $C_5$ respectively, since $A_{\{2\}}\{2\} \subset A = \text{root}(C_1)$ and $A_{\{1,2,4\}}\{2,2,2\} = \text{root}(C_5)$. Similarly, the top most category A has two free criteria $C_1$ and $C_2$, since $\text{root}(C_1) = \text{root}(C_2) = A$. The sets of leaf criteria and free criteria of a given category do not intersect, since the former may participate in the attributes forming a respective simple collection, while the latter do not. By adding one of the free attributes $(C_f, i_f)$ ($1 \leq i_f \leq N_f$) to the simple collection of the category $A_{\{p(s)\}}\{i_s\}$ an immediate derived category $A_{\{r(t)\}}\{n_t\}$ is produced with one more attribute $\{(C_{r(t)}, n_t), 1 \leq t \leq L+1\} = \{(C_{p(s)}, i_s), 1 \leq s \leq L\} \cup (C_f, i_f)$. The immediate derived category $A_{\{r(t)\}}\{n_t\}$ is related to the original one by inclusion: $A_{\{p(s)\}}\{i_s\} \supset A_{\{r(t)\}}\{n_t\} \Leftrightarrow \{(C_{p(s)}, i_s)\} \subset \{(C_{r(t)}, n_t)\}$. Since the immediate derived category $A_{\{r(t)\}}\{n_t\}$ has more attributes than the given category $A_{\{p(s)\}}\{i_s\}$, it corresponds to a more concrete classification level. Thus, for each category with a non-empty set of free criteria there is a set of immediate derived categories, and their number exactly equals the sum of cardinalities of free criteria of the given category.

In addition, the problem of matching two given different categories $A_{\{p(s)\}}\{i_s\}$ ($1 \leq s \leq L_1$) and $A_{\{q(t)\}}\{j_t\}$ ($1 \leq t \leq L_2$) by an inclusion relation is equivalent to checking the inclusion $A_{\{p(s)\}}\{i_s\} \supset A_{\{q(t)\}}\{j_t\} \Leftrightarrow \{(C_{p(s)}, i_s)\} \subset \{(C_{q(t)}, j_t)\}$, (i.e., $L_1 < L_2$, $p(s)=q(s)$ and $i_s=j_s$ for $s=1, 2, \ldots, L_1$). Therefore, the solution of this problem amounts to a mere comparison of two attribute sets forming respective simple collections.

When the classification polyhierarchy is described by a conventional directed acyclic graph (DAG), for example, the solution of that problem amounts to finding a path, or sequence of edges, between two given vertices (see the section above titled "Description of the Prior Art"). If that graph is stored "as is" (i.e., without cumbersome auxiliary descriptions) finding a path requires a combinatorial search of intermediate vertices, and the cost of it dramatically increases with the complexity of the polyhierarchy. To optimize the path search, a redundant description including auxiliary data may be employed. However, in a general case, such optimization would lead to a no less dramatic increase in data storage requirements. Therefore, an effective solution of this problem is not possible for descriptions in terms of conventional DAGs.

Implicit Description of Induced Polyhierarchies of Categories

It can be observed that construction of a polyhierarchy of categories is induced (i.e. uniquely defined) by a generating polyhierarchy of criteria. Therefore, a generating polyhierarchy may be considered as primary with respect to a polyhierarchy of categories, not only when designing the classification itself, but also when developing data structures and user interfaces in real applications.

When designing a classification system, one task is to choose classification criteria and establish dependencies between them. Because only those branches that define dependency relationships between criteria are required for a generating polyhierarchy, there is no need to detail all branches that will be necessary for the whole polyhierarchy at this initial stage. This allows a design of the classification in more abstract terms, without the use of additional classification principles (other than criteria dependencies) and without exhaustively enumerating all possible selection options. The specification of branches that participate in dependencies between criteria produces simple collections corresponding to root categories.

At further stages, other branches of criteria are added, thereby automatically inducing, (i.e., making meaningful), correspondent categories of classification. This process allows an automatic and dynamic extension of the induced polyhierarchy. Since extension of the classified set typically requires the addition of new branches, cardinalities of criteria should generally not be fixed in advance.

To summarize, the conditions of applicability of various illustrative embodiments of the methods include:

Branches of each criterion are mutually exclusive, which means that a single classified objects can be assigned no more than one attribute by the same criterion;

Domains of applicability of criteria are defined by sets of attributes of more general criteria, (i.e., they coincide with some categories (roots) of the same polyhierarchical classification); and Criteria that share their root category are not ordered by rank or any other property. This means that only dependency relations between criteria should be used when designing a generating polyhierarchy.

The generating polyhierarchy together with the sets of criteria branches implicitly describe the structure of an induced polyhierarchical classification of categories. Therefore, the enumeration and storage of the overwhelming majority of categories become redundant, since categories can be dynamically retrieved anytime using the generating polyhierarchy of criteria. In this particular embodiment, the proposed classification method is fully synthetic. The subset of persistent categories that are permanently stored in the form of simple collections (or more general forms of attributive expressions introduced below) is defined by considerations of practical implementation. In one embodiment, the permanent storage of only the following categories is sufficient for effectively working with the induced polyhierarchy:

Root categories that define the structure of a generating polyhierarchy;

Nonempty leaf categories used as "containers" for classified objects; and

Possibly, also intermediate abstract categories if they are non-empty, if some objects are not fully classified (i.e., they cannot be assigned attributes from some applicable criteria due to, for example, incomplete knowledge of their properties).

For convenient interfacing with external applications, the storage of some additional categories can be useful, in particular:

Identically empty categories, arising from the use of semantically related criteria with overlapping domains of definition (if any). As noted above, if a classification uses some semantically related criteria whose root categories overlap, then some combinations of attributes may correspond to contradictory descriptions of object properties. This means that such categories would be identically empty sets by design. Explicit presentation of these categories by simple collections may facilitate the logic of detecting contradictory queries to a client database; and Categories that define domains of applicability of additional, (i.e., external to this classification), search tools, such as keyword search engines, applications for sorting by dynamic criteria, and the like.

Figure 11:
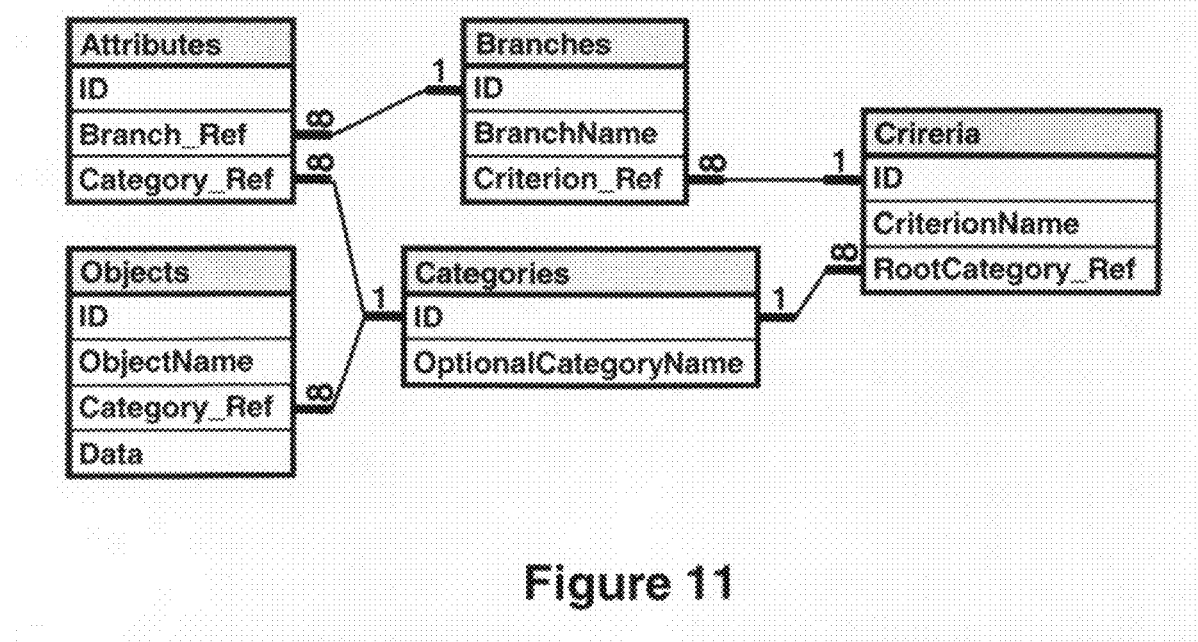

Illustrative Embodiments of Database Configurations Facilitating Simple Collections Illustrative embodiments of the proposed methods can be efficiently implemented by including additional constructs into existing databases. Below, a simplified illustrative example of a realization using the Microsoft Access 2000 environment is considered. FIG. 11 shows a system of linked tables supporting the base functionality of a polyhierarchical classification based on attributive expressions in the form of simple collections.

The list of objects subject to classification (client objects) is stored in the table "Objects". For each object, table fields "ID", "ObjectName", "Category_Ref" and "Data" contain, respectively, the object's unique identifier, verbose name, reference to object category and object-specific data unrelated to the purpose of classification. Of course, in practical applications, this table may contain other fields for object-specific data, comments, references to other tables, and the like; in particular, these additional data can be used by search tools external to the classification.

The other four tables, "Attributes", "Branches", "Criteria" and "Categories", store the description of the polyhierarchical classification. Each of these tables has the "ID" field with unique identifiers (such as auto-numbers) of respective description elements.

The "Categories" table stores the list of persistent categories that are sufficient for comfortable work with the polyhierarchy (the categories that are sufficient, for example, were considered and described above at the end of the section titled "Implicit Description of Induced Polyhierarchies of Categories"). Since this table serves only for the identification of particular persistent simple collections, it has only one required field, "ID". Attributes of each category, in this scheme, are stored in the "Attributes" table, discussed more fully below.

The "Criteria" and "Branches" tables that describe, respectively, criteria and branches, include fields "CriterionName" and "BranchName" which are used for verbose human-readable definitions, but are not essential for the polyhierarchy structure. In particular, these names can be changed at any time and do not have to be unique. The field "Root-Category_Ref" of the "Criteria" table contains references to root categories of corresponding criteria, and the field "Criterion_Ref" of the "Branches" table contains references that define to which criterion every branch belongs. So, in this illustrative example, the "Branches" table contains all possible attributes that can form simple collections defining categories. Note that to provide the basic functionality, neither branch indices (within a particular criterion) nor the cardinalities of criteria are required, hence their absence from the illustrated database scheme.

The "Attributes" table describes composition of simple collections that define categories, as a "many-to-many" relation between tables "Branches" and "Categories". Each instance of an attribute is represented by a reference "Branch_Ref" to the corresponding row in the table "Branches". Instances of attributes are associated with categories by references "Category_Ref" to "IDs" of corresponding categories.

The exemplary database configuration is intended for automatically performing low-level operations such as retrieving lists of branches of a selected criterion, finding a root category of a criterion, retrieving a simple collection of attributes defining a selected category, finding objects pertaining to a given category, and the like. These processes may be performed using standard management systems of relational databases. Implementations of these methods in environments other than relational databases may require development of supplementary platform-specific routines to support such low-level operations. In addition, supplementary software codes may be used for supporting higher-level operations, such as database access, user interfaces, and operations on classification categories mentioned, for example, in the section titled "Illustrative Embodiments of the Induced Polyhierarchies of Categories". However, unlike with conventional classification methods, the supplementary software does not depend on application-specific features of the polyhierarchical classification and the complexity of the classification.

Illustrative Embodiments of a Graphical User Interface

Figure 12:
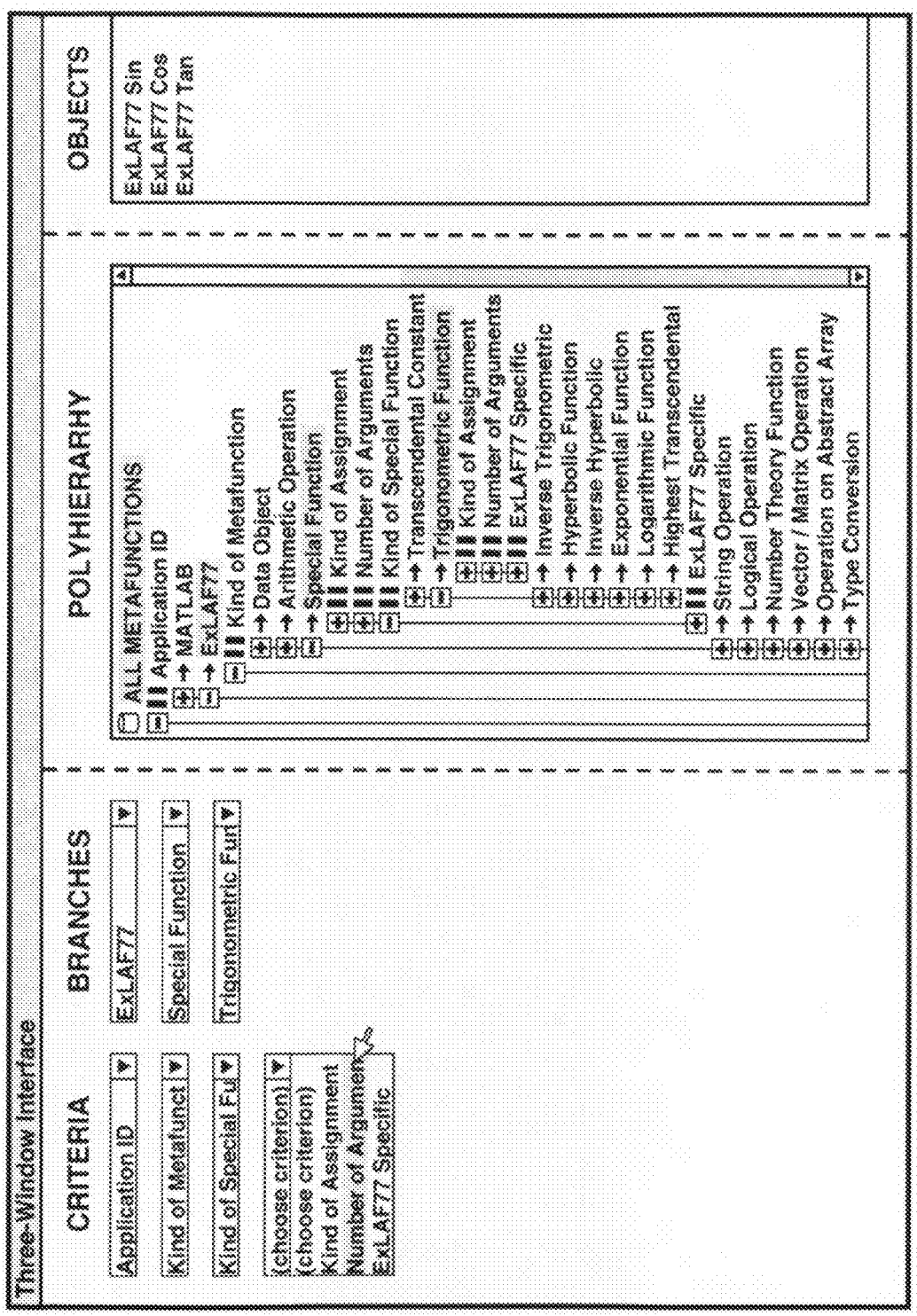

FIG. 12 illustrates a simple implementation of a graphical user interface 1200 to the database shown in FIG. 11. It is designed for the selection of elements from a classified set by a superposition of dependent criteria. The application window consists of three distinct functional parts (views), hence the name "three-window interface."

The left view includes drop-down lists of free criteria (left column) and drop-down lists of criteria branches (right column). Before the selection process begins, there is only one drop-down list—a list of criteria that are applicable to the whole classified set. The selection is performed by a step-by-step specialization with an alternate selection of criteria and branches. At each step, when a criterion is selected, a drop-down list of its branches appears next to it in the right column. When a branch is selected, a new attribute is added to the currently selected category (i.e., superposition of attributes), and a new list of free criteria applicable to the currently selected category, if any such free criteria exist, appears below the last criterion choice. The rollback in selection can be performed simply by choosing another item or "deselect" from one of those lists where a selection has already been done. Doing so makes anything selected below the changed level disappear, because in this particular selection method, the choice available at each level depends on all previous levels. An improvement to this interface would include only removing those subsequently selected attributes that are inconsistent with the rollback change, rather than all of them.

The central view in the application window visualizes the polyhierarchical classification in a form similar to the conventional one that is typically used to represent tree hierarchies. But, unlike the typical representation, the central view uses two kinds of expansion nodes: those corresponding to free criteria (a pair of vertical blue, or darker, arrows in the icon) and their branches (a horizontal green, or lighter, arrow in the icon). The user can expand and minimize the lists of free criteria and their branches by clicking on conventional tree expander icons "+" and "−." Clicking on a particular branch performs a specialization by the respective criterion. If an available free criterion is not used for a specialization, it will stay available at the next specialization level, thereby appearing again in the list of free criteria. The central part (view) of the application window allows a step-by-step specialization by successive selection of criteria and branches, thereby duplicating the functionality of the drop-down lists in the left view. The two views are connected to each other: any selection or rollback in either of them triggers an automatic selection of the corresponding item or rollback in the other one. These selection tools can be used concurrently, so that each specialization step can be performed in either of the two views.

The sequence of specializations performed in the left and central window divisions (views) define at each step a particular category of classification. The right division (view) shows a list of all items of the classified set that pertain to that category. As the selection range is refined at each successive specialization step, the list of items is shortened. An item can be selected by clicking on it, whereupon its short description appears in the area below.

This illustrative embodiment of user interface can be easily adjusted for facilitating interactive data input when developing databases. It is sufficient to add just two ancillary controls: an input field for object name and a 'Record' or 'Confirm' button for recording a new object name and associating it with a set of properties specified with using the windows described above.

Illustrative Embodiments of Unions of Classification Categories, and Taxonomy Algebra In this section, several generalizations are presented of the formalism that describes categories by attributive expressions in the method of building polyhierarchical classifications described above. These generalizations are based on the introduction of disjunctive operations on categories: one generalization, for example, allows construction of new categories by uniting branches within a particular criterion, and another generalization, for example, goes further toward uniting arbitrary categories. Each version makes it possible to generalize the polyhierarchical system of relations (e.g., "general-specific") between categories, the second one of these generalizations, for example, turning the set of all possible categories into a ring, (i.e., a system of subsets closed with respect to the operations of unification, intersection, subtraction, and symmetric difference). A detailed discussion of the respective semantic extensions of the notion of attribute collection, as well as algorithms required for efficient work with classification in terms of attributive expressions is provided herein.

A ring (in the set-theoretic sense) is a non-empty system S of subsets, satisfying the following conditions:

1. S is closed with respect to operation of intersection of subsets: For all pairs of subsets A, B∈S, A|B∈S, and
2. S is closed with respect to operation of symmetric difference of subsets: For all pairs of subsets A, B∈S, A∆B∈S.

From the definition above it follows that any ring S of subsets satisfies also the following conditions:

3. S includes the empty subset: ∅∈S, and
4. S is closed with respect to operation of union of subsets: For all pairs of subsets A, B∈S, A∪B∈S, and
5. S is closed with respect to operation of complement of subsets: For all pairs of subsets A, B∈S, A\B∈S.

One of the ideas behind the aforementioned method of classification is the use of the generating polyhierarchy of classification criteria for an automatic construction of the induced polyhierarchy of categories. Each category may be defined, for example, by a simple collection of attributes, where each attribute is assigned by a particular criterion, with no more than one attribute from each criterion. That simple collection uniquely defines a superposition (intersection) of partitionings of the classified set by separate features, (i.e., the induced polyhierarchy is constructed by using logical conjunction of elementary specializations defined by attributes). If the identically empty category is formally added to the set of categories of the induced polyhierarchy, the latter becomes a semiring of subsets.

A semiring (in the set-theoretic sense) is a system S of subsets, satisfying the following conditions:

1. S includes the empty subset: $\emptyset \in S$, and
2. S is closed with respect to operation of intersection of subsets: For all pairs of subsets A, $B \in S$, $A \cap B \in S$, and
3. Existence of finite decomposition: For all pairs of subsets A, $B \in S$, such that $A \subset B$ exists decomposition $B = A_1 \cup A_2 \cup \ldots \cup A_N$, where subsets $A_k \in S$ (k=1, 2, ..., N) are mutually disjoint, and $A_1 = A$.

In some cases, however, definition of categories solely by means of a conjunction of features may not be sufficient. For example, some routines of the Matlab package take for input objects uncommon types such as "number or vector," "vector or matrix," and the like. A fragment of one of the possible classifications based on a conjunction of features that include such categories is shown in FIG. 13.

Figure 13:
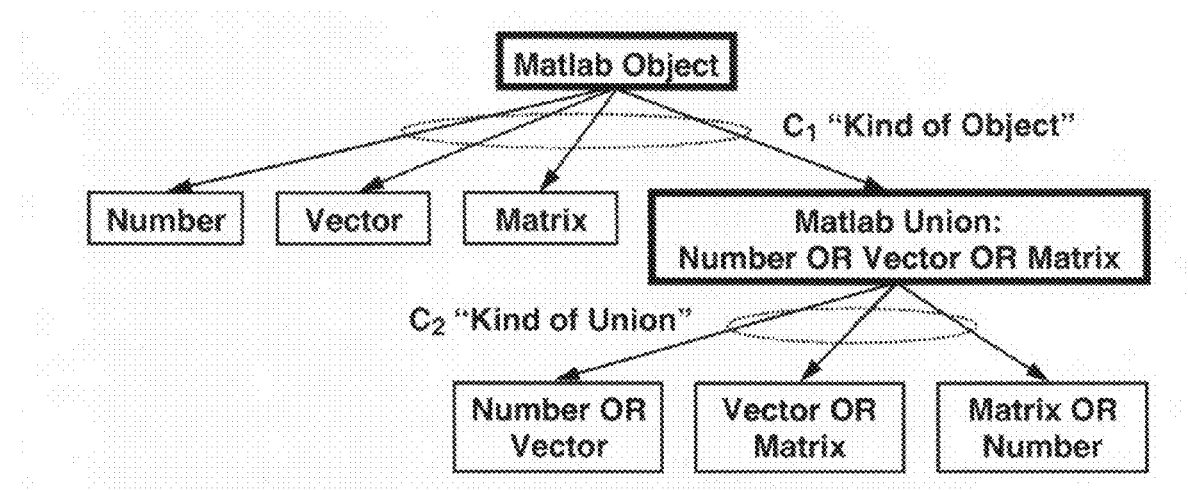

Categories shown in FIG. 13 are described by the following simple collections:

TABLE 1

Conjunctive classification by two dependent, semantically unrelated criteria

| Category | Simple collection |
|---|---|
| Matlab Object | {ref} - reference (base) collection |
| Number | {ref, $(C_1, 1)$} |
| Vector | {ref, $(C_1, 2)$} |
| Matrix | {ref, $(C_1, 3)$} |
| Matlab Union | {ref, $(C_1, 4)$} |
| Number OR Vector | {ref, $(C_1, 4)$, $(C_2, 1)$} |
| Vector OR Matrix | {ref, $(C_1, 4)$, $(C_2, 2)$} |
| Matrix OR Number | {ref, $(C_1, 4)$, $(C_2, 3)$} |

By applying formal comparison rules to these collections it cannot be derived that "Number" ⊂ "Matrix OR Number," since {ref, $(C_1, 1)$} ⊄ {ref, $(C_1, 4)$, $(C_2, 3)$}, "Vector"="Number OR Vector"∩"Vector OR Matrix," since {ref, $(C_1, 2)$}≠{ref, $(C_1, 4)$, $(C_2, 1)$}∩{ref, $(C_1, 4)$, $(C_2, 2)$}={ref, $(C_1, 4)$}, and so forth. Therefore, this particular variant of the classification does not reflect some relations of "general-specific" between categories that are significant in the context of Matlab's interfaces.

A more complex version of the conjunctive classification can be created, that uses three independent but semantically related criteria: $C_1$ "Is a Number?," $C_2$ "Is a Vector?," and $C_3$ "Is a Matrix?," each originating from the same root category "Matlab Object" and including two branches <<yes>> and <<no>>. All categories for this variant are listed in Table 2.

TABLE 2

Conjunctive classification by three independent, logically related criteria

| Category | | |
|---|---|---|
| | $C_1$ | $C_2$ | $C_3$ |
| Matlab Object | — | — | — |
| Number | yes | — | — |
| Vector OR Matrix | no | — | — |

TABLE 2-continued

Conjunctive classification by three independent, logically related criteria

| Category | | |
|---|---|---|
| | $C_1$ | $C_2$ | $C_3$ |
| Vector | — | yes | — |
| Matrix OR Number | — | no | — |
| Matrix | — | — | yes |
| Number OR Vector | — | — | no |
| Identically empty | yes | yes | — |
| Number | yes | no | — |
| Identically empty | yes | — | yes |
| Number | yes | — | no |
| Vector | no | yes | — |
| Matrix | no | no | — |
| Matrix | no | — | yes |
| Vector | no | — | no |
| Identically empty | — | yes | yes |
| Vector | — | yes | no |
| Matrix | — | no | yes |
| Number | — | no | no |
| Identically empty | yes | yes | yes |
| Identically empty | yes | yes | no |
| Identically empty | yes | no | yes |
| Number | yes | no | no |
| Identically empty | no | yes | yes |
| Vector | no | yes | no |
| Matrix | no | no | yes |
| Identically empty | no | no | no |

Dashes in this table correspond to free criteria.

Although this variant is able to test category inclusions via formal comparisons of the respective simple collections of attributes, it has two significant drawbacks. The first problem is that criteria are semantically related, which causes numerous identically empty categories. The second problem lies in the non-uniqueness of object categorization. For example, an object <<Number>> can be put into these five categories: {ref, $(C_1, \text{yes})$}, {ref, $(C_1, \text{yes})$, $(C_2, \text{no})$}, {ref, $(C_1, \text{yes})$, $(C_3, \text{no})$}, {ref, $(C_2, \text{no})$, $(C_3, \text{no})$}, and {ref, $(C_1, \text{yes})$, $(C_2, \text{no})$, $(C_3, \text{no})$}. So, a practical implementation of this version of the classification may require the use of auxiliary rules, such as a convention to relate types to the most specific of all suitable categories. The most specific categories are shown in Table 2 in bold type, for example.

These examples illustrate that classifications based exclusively on conjunctions of elementary specializations do not always allow for a neat implementation. This may be resolved through the use of disjunctive operations on categories in terms of attributive expressions.

Formalisms based on generalized forms of attributive expressions may be introduced to combine operations of both logical conjunction and disjunction of elementary specializations when constructing generating and induced polyhierarchies. These illustrative examples are an extension of the automatic reproduction of the induced polyhierarchy of classification categories by the generating polyhierarchy of criteria discussed above.

When introducing disjunctions of elementary specializations, it should be appreciated that "assigning attributes to a classified object" in the definition of classification criteria given, for example, in the beginning of the section "Illustrative Embodiments of a Classification by System of Criteria" above, is not the same as associating an object with a classification category that is defined by a disjunctive attributive expression, such as collections with branch unions and unions of simple collections (described in, for example, the sections below titled "Unions of Criteria Branches" and "Uniting Arbitrary Categories"). In the definition of classification criteria, "assignment of attributes to an object" means a set elementary specialization of object properties, which is essentially a conjunctive procedure, (i.e., elementary specializations encoded by the attributes are implied to be linked with logical AND). Therefore, assigning more than one attribute by the same criterion to an object results in a contradictive specialization of its properties.

However, an object can be associated with a classification category that is defined by a disjunctive attributive expression containing several attributes by the same criterion. This may imply, for example, that properties of the object cannot be definitely specialized due to the lack of available information on that object. Associating an object with a category defined by a disjunctive attributive expression denotes a number of possible options for an unknown set of object properties. Those possible options are linked with logical OR, such a category may reflect, for example, an incomplete specialization of the set of object properties.

Unions of Criterion Branches

As described above, classification of a subset A by a criterion $C_p$ corresponds to a definition of a single-valued attribute function $attr_p$ on A that takes discrete values 1, 2, 3, ..., and so forth. As a result of the classification, A is partitioned into mutually disjoint categories A(i) which are identified by values i of the function $attr_p$ (branches of the criterion $C_p$). If an element 'a' pertains to a category a∈A(i) or in other terms $attr_p(a)=i$, this characterizes a feature of element 'a' related to the meaning of the attribute function, so the criterion branches should represent mutually exclusive characteristics of objects.

When constructing a classification by superposition of criteria, each category $A_{\{p(S)\}}\{i_s\}$ is associated with a set of object properties formally described by the corresponding simple collection $\{(C_{p(s)}, i_s), 1 \leq s \leq L\}$. Adding a new attribute $(C_q, j)$ to the collection is equivalent to the definition of a more specific ("smaller") category $A_{\{p(s)\}}\{i_s\} \cap A_{\{q\}}\{j\}$, and, therefore, the simple collection defines a conjunctive composition of properties. That any two branches of a given criterion are mutually exclusive means that assigning two or more attributes by the same criterion always gives an identically empty category.

The semantics of simple collections can be generalized by including unions of criterion branches. For the purpose of illustration, it is convenient to adopt a convention that assigning several attributes by the same criterion is always performed in the sense of a disjunction of respective elementary specializations. Unlike the formalism of simple collections, this extended convention allows repetitions of criteria in attributive expressions, but all elementary specializations defined by branches of one criterion are united (disjuncted) rather than being intersected (conjuncted).

As an example, consider extending a given category $A_{\{p(s)\}}\{i_s\}$ by means of uniting criterion branches. In the category's attribute collection, an attribute $(C_{p(t)}, i_t)$, may be selected and its criterion $C_{p(t)}$ may be used to form a new attribute $(C_{p(t)}, k_t)$, $k_t \neq i_t$ that differs from the original one by its branch number $k_t$. After adding this new attribute to the initial collection $\{(C_{p(s)}, i_s), 1 \leq s \leq L\}$ an extended collection $\{(C_{p(s)}, i_s), 1 \leq s < t\}, (C_{p(t)}, i_t), (C_{p(t)}, k_t), \{(C_{p(s)}, i_s), t < s \leq L\}\}$ is formed where the criterion number p(t) is used twice. This collection is equivalent to the union of categories $A_{\{p(s)\}}\{i_s\} \cup A_{\{p(s)\}}\{j_s\}$ where $j_s=i_s$ if $s \neq t$ and $j_t=k_t$. Any number of branches can be united in the same way.

In order to facilitate the illustration, it is helpful to introduce several definitions. Collections of attributes encoding only conjunctions of elementary specializations, as described above, (and therefore not including multiple attributes by any single criteria) $\{(C_{p(s)}, i_s), 1 \leq s \leq L\}$, $p(s) \neq p(t)$ if $s \neq t$, are called simple collections in order to distinguish them from arbitrary collections, where criterion numbers can be repeated in several attributes. Categories defined by simple collections will be called simple categories, and all other categories will be called composite categories. Unlike those simple categories, construction of composite categories involves disjunctive operations, such as unifications of elementary specializations corresponding to criterion branches, and unifications of arbitrary compositions of elementary specializations (see, for example, the section below titled "Uniting Arbitrary Categories").

Union of branches, or branch union, may be defined as a fragment of a collection composed of attributes by distinct branches of the same criterion:

$$U_{p(s)}\{i_{n,s}, 1 \leq n \leq K_S\} = \{(C_{p(s)}, i_{1,s}), (C_{p(s)}, i_{2,s}), (C_{p(s)}, i_{3,s}), \ldots, (C_{p(s)}, i_{K_s,s})\} \quad (1)$$

where $i_{n,s} \neq i_{m,s}$ if $n \neq m$. The number $K_s$ of attributes included in a union is called its cardinality. Clearly, the cardinality of branch union $U_{p(s)}\{i_{n,s}\}$ cannot exceed the cardinality of criterion $C_{p(s)}$. The notion of total branch union $U_{p(s)}$ is a union with the cardinality equal to that of criterion $C_{p(s)}$, and the notion of the complement of branch union:

$$compl(U_{p(s)}\{i_{n,s}\}) = \{(C_{p(s)}, i_{m,s}), i_{m,s} \notin \{i_{n,s}, 1 \leq n \leq K_s\}\} = U_{p(s)} \setminus U_{p(s)}\{i_{n,s}\} \quad (2)$$

The sum of cardinalities $U_{p(s)}\{i_{n,s}\}$ and $compl(U_{p(s)}\{i_{n,s}\})$ equals the cardinality of criterion $C_{p(s)}$, and the complement of a total branch union is an empty union: $compl(U_{p(s)}) = \emptyset$.

The above notation allows the representation of a collection of attributes as a set of branch unions (1):

$$\{(C_{p(s)}, i_s), 1 \leq s \leq L\} = \{U_{p(t)}\{i_{n,t}, 1 \leq n \leq K_t\}, 1 \leq t \leq M\}, \quad (3)$$

where $L = K_1 + K_2 + \ldots + K_M$. This new form of attributive expressions called collections with branch unions implies a disjunctive composition of properties of classified objects defined by attributes within every single union $U_{p(s)}\{i_{n,s}\}$ and conjunctive composition of properties defined by separate unions. All branch unions included in simple collections have cardinality $K_s=1$.

Description of categories in terms of collections with branch unions (3) is equivalent to a valid superposition of intersections and unifications of subsets generated by separate criteria, taking into account criteria dependencies. In particular, there is no restriction on the use of composite categories as criteria roots, so the branch unions can be used in construction of the generating polyhierarchy. Therefore, the directed relation "general-specific," (i.e., the relation of inclusion), that is the foundation of a polyhierarchical classification, retains its meaning in the new semantics. This extension increases the number of valid (meaningful) categories of the induced polyhierarchy by using disjunctions in definitions of specializations and generalizations.

Operations on Collections with Branch Unions

In general, practical applications require a formalism that would allow an efficient execution of typical operations with categories represented by attribute collections with branch unions. Discussed below are three important tasks including: 1) comparison of two given categories by the relation "general-specific," (i.e., the test for inclusion), 2) calculation of the intersection of two categories, and determining 3) the direct parent (base) and 4) the direct child (derived) categories of a given category. As before, for a given category A, its direct parent and direct child are those categories $B \supset A$ and $D \subset A$ whose definitions differ from A by only one attribute. For convenience, it may be assumed that unions of branches in attribute collections (3) are numbered in the order of definition of dependency relations between criteria $C_{p(s)}$ ($1 \leq s \leq M$), i.e., $C_{p(s)} \subset C_{p(t)}$ when $1 \leq s < t \leq M$. Due to the hierarchical (acyclic) structure of relations between criteria, such an ordering should always exist. In some applications, it may be useful to define categories by collections that include complements of branch unions (2).

Test for Inclusion Relations

Consider two arbitrary categories $$A_{\{p(s)\}}\{i_{n,s}\} \sim \{U_{p(s)}\{i_{n,s}1 \leq n \leq K_{1,s}\}, 1 \leq s \leq M_1\} \text{ and}$$

$$A_{\{q(t)\}}\{j_{m,t}\} \sim \{U_{q(t)}\{j_{m,t}1 \leq m \leq K_{2,t}\}, 1 \leq t \leq M_2\} \quad (4)$$

Using the rules of logical superposition of elementary specializations encoded by attributes given, for example, in the section above titled "Unions of Criterion Branches", it can be determined that $$A_{\{p(s)\}}\{i_{n,s}\} \subset A_{\{q(t)\}}\{j_{m,t}\} \Leftrightarrow (M_1 \geq M_2 \text{ and}$$
$$U_{p(s)}\{i_{n,s}\} \subset U_{q(s)}\{j_{m,s}\} \text{ if } 1 \leq s < M_2) \Leftrightarrow (M_1 \geq M_2$$
$$\text{and } p(s)=q(s), K_{1,s} \leq K_{2,s}, i_{n,s}=j_{n,s} \text{ if } 1 \leq n \leq K_{1,s},$$
$$1 \leq s \leq M_2) \quad (5)$$

For the inclusion to be strict, it is necessary and sufficient that at least one of the inequalities $M_1 \geq M_2$ and $K_{1,s} \leq K_{2,s}$ ($1 \leq s \leq M_2$) be strict. Note that when the compared categories are simple, $K_{1,s}=1$, $U_{p(s)}\{i_{n,s}\}=(C_{p(s)}, i_s)$ ($1 \leq s \leq M_1$) and $K_{2,t}=1$, $U_{q(t)}\{j_{m,t}\}=(C_{q(t)}, j_t)$ ($1 \leq t \leq M_2$). In that case (5) takes the form:

$$A_{\{p(s)\}}\{i_{n,s}\} \subset A_{\{q(t)\}}\{j_{m,t}\} \Leftrightarrow M_1 \geq M_2 \text{ and } p(s)=q(s),$$
$$i_s=j_s \text{ if } 1 \leq s \leq M_2,$$

which coincides with the condition of inclusion for categories of a purely conjunctive classification (see, for example, the section above titled "Illustrative Embodiments of the Induced Polyhierarchies of Categories").

Computing Intersection

It is possible to combine sets of criteria indices of the two given categories (4)

$$\{u(r), 1 \leq r \leq M_3\} = \{p(s), 1 \leq s \leq M_1\} \cup \{q(t), 1 \leq t \leq M_2\}, \quad (6)$$

where $M_3 \geq M_{1,2}$, and construct the corresponding collection of attributes:

$$\{U_{u(r)}\{i_{l,r}, 1 \leq l \leq K_{3,r}\} 1 \leq r \leq M_3\}, \text{ where}$$

$$U_{u(r)}\{i_{l,r}\} = U_{p(s)}\{i_{n,s}\} \text{ if } u(r) \in \{p(s)\} \text{ and } u(r) \notin \{q(t)\},$$

$$U_{u(r)}\{i_{l,r}\} = U_{q(t)}\{i_{m,t}\} \text{ if } u(r) \notin \{p(s)\} \text{ and } u(r) \in \{q(t)\},$$

$$U_{u(r)}\{i_{l,r}\} = U_{p(s)}\{i_{n,s}\} \cap U_{q(t)}\{i_{m,t}\} \text{ if } u(r) \in \{p(s)\} \text{ and}$$
$$u(r) \in \{q(t)\}. \quad (7)$$

Using the algorithm of testing for inclusion (5) it can be verified that the category $A_{\{u(r)\}}\{i_{l,r}\}$ described by the collection (7) is included into both given categories: $A_{\{u(r)\}}\{i_{l,r}\} \subset A_{\{p(s)\}}\{i_{n,s}\}$ and $A_{\{u(r)\}}\{i_{l,r}\} \subset A_{\{q(t)\}}\{j_{m,t}\}$ When any of the branch unions $U_{u(r)}\{i_{l,r}\}$ is extended by adding another attribute, at least one of those inclusions is broken, therefore $A_{\{u(r)\}}\{i_{l,r}\}$ is the most general (the most abstract) category included in both $A_{\{p(s)\}}\{i_{n,s}\}$ and $A_{\{q(t)\}}\{j_{m,t}\}$. That is, $A_{\{u(r)\}}\{i_{l,r}\}=A_{\{p(s)\}}\{i_{n,s}\} \cap A_{\{q(t)\}}\{j_{m,t}\}$ If at least one of the intersections $U_{u(r)}\{i_{l,r}\}=U_{p(s)}\{i_{n,s}\} \cap U_{q(t)}\{i_{m,t}\}$ turns out to be empty when $u(r) \in \{p(s)\}$ and $u(r) \in \{q(t)\}$, then, by logical conjunction of elementary specializations defined by distinct branch unions, the resulting intersection $A_{\{u(r)\}}\{i_{l,r}\}$ is empty too.

Retrieving Direct Derived Categories

Now consider a category $A_{\{p(s)\}}\{i_{n,s}\}$ defined by the collection (3). If any of the branch unions $U_{p(t)}\{i_{n,t}\}$ of that collection has cardinality $K_t \geq 2$, then removing from that branch union one of its attributes ($C_{p(t)}, i_{m,t}$) ($1 \leq m \leq K_t$) results in a non-empty reduced union $U_{p(t)}\{i_{n,t}\}\setminus(C_{p(t)}, i_{m,t}) \subset U_{p(t)}\{i_{n,t}\}$ of cardinality $K_t-1$. After the initial branch union is replaced by the reduced one, the attribute collection takes the form:

$$\{U_{p(1)}\{i_{n,1}\}, \ldots, U_{p(t-1)}\{i_{n,t-1}\}, U_{p(t)}\{i_{n,t}\}\setminus(C_{p(t)}, i_{m,t}),$$
$$U_{p(t+1)}\{i_{n,t+1}\}, \ldots, U_{p(M)}\{i_{n,M}\}\}. \quad (8)$$

Since removal of an attribute from the branch union means reduction of the corresponding subset (category), it will remain within the domain of definition of criteria $C_{p(s)}$ ($1 \leq s \leq M$), so the relations of dependency between criteria are not affected. Therefore, the reduced collection defines a valid category that is included within $A_{\{p(s)\}}\{i_{n,s}\}$ and differs from it by only one attribute ($C_{p(t)}, i_{m,t}$), or, in other words, a direct derived category.

Note that removing an attribute from a union of cardinality 1 results in the identically empty category that is not considered as derived. So, when computing direct children by this procedure, it should be used to reduce branch unions of cardinalities $K_s \geq 2$. The number of child categories resulting from the reduction of branch unions equals the number of variants of that reduction L−M, where $L=K_1+K_2+\ldots+K_M$ is the total number of attributes used in the collection, and M is the number of branch unions.

Use of this formalism allows the addition of attributes by free criteria (see, for example, the section above titled "Illustrative Embodiments of the Induced Polyhierarchies of Categories") to be represented in the more general terms of removing attributes from branch unions, as discussed in this section. If the initial category $A_{\{p(s)\}}\{i_{n,s}\}$ has F free criteria $C_{f(t)}$ ($1 \leq t \leq F$), then its collection of attributes can be formally represented in a form with an added total unions of branches, with each total union corresponding to a free criterion:

$$\{U_{p(s)}\{i_{n,s}, 1 \leq n \leq K_s\}, 1 \leq s \leq M\} = \{\{U_{p(s)}\{i_{n,s},$$
$$1 \leq n \leq K_s\}, 1 \leq s \leq M\}, \{U_{f(t)}, 1 \leq t \leq F\}\},$$

where $U_{f(t)}$ are total unions of branches of free criteria $C_{f(t)}$. This representation is equivalent to the form without the total unions because the addition of a total union does not specify any additional property but instead means that the respective criterion is not applied, although it could be. So, the addition of a total union to a collection does not alter the category described by that collection.

Using the notation with total unions, the procedure of removing an attribute from a union discussed above (see (9)) can be directly applied to total unions $U_{f(t)}$ ($1 \leq t \leq F$) in the same way as to other branch unions $U_{p(s)}\{i_{n,s}\}$ included in the collection. In order to calculate the total number of direct child categories, the number of attributes L and the number of branch unions M should be modified by taking the free criteria into account in the formula L−M derived above.

It should be appreciated that the method of determining direct child categories through assigning attributes by free criteria, as described, for example, in the section "Illustrative Embodiments of the Induced Polyhierarchies of Categories" does not have independent sense of an elementary specialization. This is because the granularity of elementary specialization attainable is dependent upon the chosen form of the attributive expressions. The attributive expression obtained by assigning a new attribute by a free criterion in the semantics of simple collections is equivalent, in the semantics of collections with branch unions considered here, to a sequence of elementary specializations: one-by-one removal of attributes from the total union of branches of that free criterion. It follows that: a) the assignment of an individual attribute by a free criterion is equivalent to a superposition of elementary disjunctive specializations (a sequence of removals of attributes from the respective branch union), and b) the category resulting from assignment of an attribute by a free criterion cannot be considered a direct child of the initial category in a general case (if the cardinality of the free criterion exceeds two).

Retrieving Direct Base Categories

The disjunctive method of construction of direct base categories should be founded, by its meaning, on the addition of attributes to branch unions. However, in a general case, generalizing a category by extending one of its branch unions can result in violating domains of definitions of the criteria participating in a given attributive expression. Consideration may be given, therefore, to which attributes can be added to the collection without affecting the domains of definition, thereby preserving the dependencies between criteria participating in the collection.

Consider a given category $A_{\{p(s)\}}\{i_{n,s}\}$ defined by the collection of attributes (3). The hull of this category may be defined as the intersection of root categories of all criteria that are used in that collection:

$$\mathrm{hull}(A_{\{p(s)\}}\{i_{n,s}\}) = \bigcap_{s=1}^{M} \mathrm{root}(C_{p(s)}) \supset A_{\{p(s)\}}\{i_{n,s}\}. \quad (9)$$

The hull is the most broad (most abstract) category among all classification categories on which all the criteria $C_{p(s)}$ ($1 \leq s \leq M$) are valid. By applying the algorithm for computing intersections (6) and (7) to the attribute collections representing the root categories $\mathrm{root}(C_{p(s)})$ ($1 \leq s \leq M$), an attribute collection may be constructed for the hull (9). Since $A_{\{p(s)\}}\{i_{n,s}\} \subset \mathrm{hull}(A_{\{p(s)\}}\{i_{n,s}\})$, the resulting collection, in a general case, does not contain all the criteria $C_{p(s)}$. However, it may be assumed that the <<missed>> criteria are explicitly represented in the collection of the hull by total unions of their branches, (i.e. that the collection is represented in the notation $\{U_{p(s)}\{j_{m,s}, 1 \leq m \leq K_{2,s}\}\ 1 \leq s \leq M\}$, where $K_{2,s} \leq K_{1,s}$ and $\{j_{m,s}, 1 \leq m \leq K_{2,s}\} \supset \{i_{n,s}, 1 \leq n \leq K_{1,s}\} \Leftrightarrow j_{n,s} = i_{n,s}$ for $1 \leq n \leq K_{1,s}$ and $1 \leq s \leq M$). The logical equivalence of this representation was proved in the section above titled "Retrieving Direct Derived Categories".

If for a certain t the strict inequality $K_{2,t} < K_{1,t}$ is valid, then the initial category $A_{\{p(s)\}}\{i_{n,s}\}$ can be extended by adding a new attribute $(C_{p(t)}, j_{m,t})$ ($K_{1,t} < m \leq K_{2,t}$) to the union $U_{p(t)}\{i_{n,t}, 1 \leq n \leq K_{1,t}\} \subset U_{p(t)}$. It is evident that the category resulting from such extension rests within the limits of the initial hull (9). Therefore, the relations of dependence between criteria $C_{p(s)}$ ($1 \leq s \leq M$) are preserved. Since the initial category $A_{\{p(s)\}}\{i_{n,s}\}$ is included in the resulting category and they differ by only one attribute, the latter category is a direct parent category of the former one. The number of all direct base categories is the number of ways to add one attribute to branch unions $U_{p(s)}\{i_{n,s}\}$ which equals the sum of differences of cardinalities: $(K_{2,1} - K_{1,1}) + (K_{2,2} - K_{1,2}) + \ldots + (K_{2,M} - K_{1,M})$.

It can be observed that the method of retrieval of parents of simple categories by removing attributes corresponding to leaf criteria (see, for example, the section above titled "Illustrative Embodiments of the Induced Polyhierarchies of Categories") does not have independent sense of an elementary specialization in this formalism. This is because the granularity of elementary specialization attainable is dependent upon the chosen form of the attributive expression. Leaf criteria, by their definition, do not participate in the definition of root categories $\mathrm{root}(C_{p(s)})$ ($1 \leq s \leq M$), so in the attribute collection of $\mathrm{hull}(A_{\{p(s)\}}\{i_{n,s}\})$ they are represented by total unions of branches. The sequence of elementary disjunctive extensions by adding attributes to the union of branches of a leaf criterion transforms it to a total union, which is logically equivalent to the lack of specialization under that criterion. The resulting total union can be removed from the attribute collection without altering the respective category.

Therefore, retrieval of direct parent categories by removing leaf criterion attributes, as described above, loses its role as an independent method once branch unions are adopted. In fact, the collection resulting from the removal of a single attribute of a leaf criterion in the semantics of simple collections is obtained, in the semantics of collections with branch unions, by a sequence of elementary generalizations: one-by-one additions of attributes to the corresponding branch union. This means that a) removal of a single attribute by a leaf criterion can be represented by a superposition of elementary disjunctive generalizations (a sequence of additions of attributes to the respective branch union), and b) the resulting category can not, in a general case, be considered a direct parent of the initial category (for leaf criteria with cardinalities exceeding two).

Uniting Arbitrary Categories

In principle, it may be possible that a proposed formalism, even with the branch union generalization, turns out not to be convenient enough for the construction of a classification. For instance, consider building an extensive classification of material objects. Objects that have optical subsystems may require the introduction of criteria reflecting their optical properties (e.g., focal length, resolution, photosensitivity, and the like), but categories of such objects can be very specialized and significantly different. For example, both electronic devices and living animals may have optical subsystems. This creates the desirability to define criteria on a union of unrelated, or generally speaking, arbitrary categories. To resolve this problem, an even more general formalism may be needed, that:

Allows the description of arbitrary unions of categories represented in terms of attributive expressions, and in certain special cases reduces to branch unions;

Preserves the meaning of dependency relations between criteria and that of the relation "general-specific" between categories; and Allows an efficient practical implementation in common programming environments and database management systems.

A convenient notation is useful for the description. Assignment of an attribute $(C_{p(s), is})$ is equivalent to the introduction of a predicate $P_{p(s)}(i_s)$ that takes the value "true" or "false" depending on whether the object has the property characterized by the branch is of the criterion $C_{p(s)}$. Each criterion $C_{p(s)}$ of cardinality $N_{p(s)}$ defines a set of mutually exclusive predicates $\{P_{p(s)}(i_s), 1 \leq i_s \leq N_{p(s)}\}$, $P_{p(s)}(i) \wedge P_{p(s)}(j)$=false for $i \neq j$. Therefore, definition of categories in terms of collections with branch unions (3) is equivalent to the introduction of conjunctive logical functions $$c_{\{p(s)\}}\{i_{n,s}\} = \bigwedge_{s=1}^{N} u_{p(s)}\{i_{n,s}\} = \qquad (10)$$

$$\bigwedge_{s=1}^{N} \bigvee_{n=1}^{K_s} P_{p(s)}(i_{n,s}) \sim \{U_{p(s)}\{i_{n,s}, 1 \leq n \leq K_s\}, 1 \leq s \leq M\},$$

$$\text{where } u_{p(s)}\{i_{n,s}\} = \bigvee_{n=1}^{K_s} P_{p(s)}(i_{n,s}) \sim U_{p(s)}\{i_{n,s}, 1 \leq n \leq K_s\}.$$

Functions (10) take the value true or false depending on whether the classified object pertains to categories $A_{\{p(s)\}}\{i_{n,s}\}$.

Domains of definitions of predicates $P_{p(s)}(i_s)$ coincide with root($C_{p(s)}$), therefore the succession of "using" $P_{p(s)}(i_s)$ in any logical expression is implicitly determined by the criteria dependencies. This means that in a general case, operations $\wedge$ in definitions (10) and other formulas are non-commutative. However, they are mutually distributive with operations $\vee$.

Generalization of this formalism for the case of unions of arbitrary categories can be performed by defining categories by using logical polynomial functions of the form:

$$d_{\{p(s,k)\}}\{i_{s,k}\} = \bigvee_{k=1}^{K} h_{\{p(s,k)\}}\{i_{s,k}\} = \bigvee_{k=1}^{K} \bigwedge_{s=1}^{L_k} P_{p(s,k)}(i_{s,k}), \qquad (11)$$

where $$h_{\{p(s,k)\}}\{i_{s,k}\} = \bigwedge_{s=1}^{L_k} P_{p(s,k)}(i_{s,k}), 1 \leq k \leq K.$$

Each of the terms $h_{\{p(s,k)\}}\{i_{s,k}\}$ in polynomials $d_{\{p(s,k)\}}\{i_{s,k}\}$ is a purely conjunctive logical function corresponding to a simple category and encoded by respective simple collections.

Taking into account mutual distributivity of operations $\wedge$ and $\vee$ it is possible to transform any of the functions (10) corresponding to a collection with branch unions (3) to the polynomial form (11). But as to an opposite conversion, a complete factorization of the polynomial (11) is necessary for its transformation to the form (10), which may not be possible in a general case. Therefore, polynomials (11) make a broader class of compositions of predicates P compared to conjunctive functions (10).

Each polynomial (11) defines a category $A_{\{p(s,k)\}}\{i_{s,k}\}$=A $(d_{\{p(s,k)\}}\{i_{s,k}\})$ as a set of all elements 'a' for which the polynomial takes the value true, or in a formal notation: $a \in A_{\{p(s,k)\}}\{i_{s,k}\} \Leftrightarrow (d_{\{p(s,k)\}}\{i_{s,k}\}$=true). For any two such polynomials $d_1$ and $d_2$ the following statements are true:

$$A(d_1 \vee d_2) = A(d_1) U A(d_2), \qquad (12)$$

$$A(d_1 \wedge d_2) = A(d_1) \cap A(d_2), \qquad (13)$$

$$A(d_1) \subset A(d_2) \Leftrightarrow (d_1 \Rightarrow d_2). \qquad (14)$$

The formula (14) means that the category $A(d_2)$ includes $A(d_1)$ if and only if the implication relationship between respective logical functions $d_1$ and $d_2$ is valid (i.e., from the statement $d_1$=true it follows that $d_2$=true, such that the inclusion of categories in terms of logical functions (11) is represented by the relation of implication between them). The meaning of relations (12)-(14) in the context of various illustrative embodiments is explained below.

First, since the induced polyhierarchy is automatically and uniquely determined by the generating polyhierarchy, any a priori information about the composition of the classified set need not be used when building a classification. So, the categories are considered as subsets of all imaginary objects that can theoretically exist due to the compatibility of various properties determined by attributes from participating dependent criteria.

Second, in order to enable a gradual extension of the classification, it should be certain that an induced polyhierarchy remains valid when new branches are added to some criteria. In other words, the formalism in use is additive with respect to criteria cardinalities, all relations between categories are invariant with respect to increasing cardinalities. As an example, consider a classification of a set A by two mutually independent criteria $C_1$ and $C_2$, each criterion having the cardinality 2. Since the union of branches 1 and 2 of criterion $C_1$ is total, it covers the entire set A, so, as a matter of fact the following inclusion is valid: $A_{\{2\}}\{1\} \subset A_{\{1\}}\{1\} U A_{\{1\}}\{2\}$=A. However, if the cardinality of $C_1$ is increased to 3, then the union of its branches 1 and 2, $A_{\{1\}}\{1\} U A_{\{1\}}\{2\}$, is not a total union any more, and the inclusion considered here does not hold. So, the lack of invariance of the formula $A_{\{2\}}\{1\} \subset A_{\{1\}}\{1\} U A_{\{1\}}\{2\}$ prohibits its use in the context of the described formalism, which is equivalent to negating its correctness.

Third, the semantics of the formalism considered does not allow the description of relations between categories that results from the semantical relation of criteria, because there are no criteria reflecting such relations. For example, in the conjunctive classification of the Matlab objects with three mutually independent but semantically related criteria $C_1$ "Is a Number?", $C_2$ "Is a Vector?", and $C_3$ "Is a Matrix?", (see, for example, the section above titled "Illustrative Embodiment of Unions of Classification Categories and a Taxonomy Algebra") the semantical relationship between criteria results in the relations $\{ref, (C_1, yes)\} \subset \{ref, (C_1, yes), (C_2, no), (C_3, no)\}$, $\{ref, (C_1, yes)\} \cap \{ref, (C_2, no)\}=\{ref, (C_1, yes)\}$, and so forth. Such correlations are based on "external" conventions (namely, any particular object cannot pertain simultaneously to any two of categories "Number", "Vector", "Matrix"), or those that are not reflected in the structure of the generating polyhierarchy, so they do not have a proper representation in terms of predicates and logical functions.

In summary, categories of classification are treated as subsets of all imaginary (potentially existing) objects with combinations of properties permitted by the construction of the generating polyhierarchy. When performing set theory operations on categories and establishing relations between them, the requirement of invariance with respect to increasing criteria cardinalities should be considered. Any category relationships stipulated only by the <<external>> semantics of criteria and not reflected in the structure of the generating polyhierarchy are excluded from consideration.

In one implementation of this methodology, it is convenient to represent the logical polynomial functions (11) in the form of assemblies:

$$d_{\{p(s,k)\}}\{i_{s,k}\} \sim \{S_{\{p(s,1)\}}\{i_{s,1}\}, S_{\{p(s,2)\}}\{i_{s,2}\}, \ldots, S_{\{p(s,K)\}}\{i_{s,K}\}\} = \{S_{\{p(s,k)\}}\{i_{s,k}\}, 1 \leq k \leq K\}, \qquad (15)$$

where $S_{\{p(s,k)\}}\{i_{s,k}\} \sim h_{\{p(s,k)\}}\{i_{s,k}\} (1 \leq k \leq K)$, and $$S_{\{p(s,k)\}}\{i_{s,k}\}=\{(C_{p(1,k)}, i_{1,k}), (C_{p(2,k)}, i_{2,k}), \ldots, (C_{p(L_k,k)}, i_{L_k,k})\}=\{(C_{p(s,k)}, i_{s,k}), 1 \leq s \leq L_k\}, \qquad (16)$$

where $p(s,k) \neq p(t,k)$ if $s \neq t$. Without loss of generality it can be assumed that none of the simple categories defined by simple collections (16) includes another, (i.e., $S_{\{p(s,k)\}}\{i_{s,k}\} \subset S_{\{p(s,l)\}}\{i_{s,l}\}$ if $k \neq l$). Assemblies (15) are yet another form of attributive expressions called unions of simple collections. This representation, by definition, includes the conjunction of elementary specializations of properties within each simple collection (16) and the disjunction of specializations represented by separate simple collections.

To compute the complements of categories considered below, an expression for the negation of a logical polynomial will be needed. Simple transformations result in the formula $$-d_{\{p(s,k)\}}\{i_{s,k}\} = \tag{17}$$
$$\bigwedge_{k=1}^{K}(-h_{\{p(s,k)\}}\{i_{s,k}\}) = \bigwedge_{k=1}^{K} \bigvee_{s=1}^{L_k} \left( \left( \bigwedge_{t=1}^{s-1} P_{p(t,k)}(i_{t,k}) \right) \wedge (-P_{p(s,k)}(i_{s,k})) \right),$$

where the operation of logical negation is denoted by "−". This formula differs from the classic one by additional <<cofactors>> ($\wedge P_{p(t,k)}(i_{t,k})$, $1 \leq t \leq s-1$) that are introduced for a correct representation of definition domains of the predicates $P_{p(s,k)}(i_{s,k})$. In practical implementations, the negations of predicates can be represented by complements of the respective attributes: $(-P_{p(s,k)}(i_{s,k})) \sim \text{compl}(C_{\{p(s,k)\}}, i_{s,k})$, see (2). Whenever necessary, the complements can be eliminated from the unions of simple collections by using mutual distributivity of operations $\wedge$ and $\vee$.

Since the semantics of unions of simple collections is based on set theory operations and rules, it preserves the meaning of the relation "general-specific," which is equivalent to the relation of inclusion. Since it also preserves the meaning of dependency relations between criteria and imposes no restrictions on the use of composite categories as roots, unions of simple collections can be used in the construction of the generating polyhierarchy. This generalization turns the system of categories of the induced polyhierarchy into a ring (i.e., a system of subsets closed with respect to operations of unification, intersection, subtraction and symmetric difference).

Note that the method considered here of describing categories by logical functions and collections of attributes reminds one of the formal language of "granular computing" used for an automatic construction of classifications by known properties of objects (as described, for example, in the article by Y. Y. Yao and J. T. Yao, titled "Granular Computing as a Basis for Consistent Classification Problems," in *Communications of Institute of Information and Computing Machinery*, a special issue of PAKDD'02 Workshop on Toward the Foundation of Data Mining, Vol. 5, No. 2, pp. 101-106, 2002). However, in spite of the perceived similarity of the formalisms used, the instant approach is conceptually different from the granular computing technology. Illustrative examples of these differences may include:

- In various illustrative embodiments, the formalism introduces the basic concept of a generating polyhierarchy that enables development of classifications on a more abstract concept base, and efficient operations on sets of classifications, such as composition and splitting of polyhierarchies;
- The induced polyhierarchy is uniquely defined by the conditions of compatibility of the object properties encoded by the structure of the generating polyhierarchy, so the construction of the classification itself does not require reference to an available set of classified objects; and
- Definitions of set theory operations are invariant with respect to changes in the composition of the classification universe, the implied meaning of criteria, and the increase of criteria cardinalities.
- Also, procedures for elementary generalizations and specializations are introduced, thus allowing definitions of immediate child and parent categories for a selected category, which in its terms automatically provides for the existence of a global polyhiearchal structure of classification.

Operations on Unions of Simple Collections

A number of basic tasks may be useful for working with a classification. These basics tasks may include: 1) the test for inclusion, 2) computing the union, 3) computing the intersection, 4) computing the complement, and 5) retrieving direct base (parent) and direct derived (child) categories. The algorithms to perform these tasks in terms of unions of simple collections form a basic set of operations on categories are called taxonomy algebra.

For simplicity, a number of technical details of operations with simple collections are omitted. Moreover, union components are defined as simple categories that correspond to individual simple collections from the unions.

Test for Inclusion

According to the formula (14), the relation of inclusion between categories is considered equivalent to the relation of implication between their logical polynomials. Due to the independence of predicates $P_{p(s)}(i_s)$ with different criteria numbers $p(s)$, none of the logical polynomial functions (11) at $K \leq 2$ can be represented as a conjunction of predicates. Therefore, for a set of simple categories $A_i$ ($1 \leq i \leq K$), such that $A_i \not\subset A_j$ if $i \neq j$, and a simple category $B \subset A_1 \cup A_2 \cup \ldots \cup A_K$, there exists a number $r$ ($1 \leq r \leq K$) such that $B \subset A_r$.

Two arbitrary categories may be represented by unions of simple collections:

$$A_{\{p(s,k)\}}\{i_{s,k}\} \sim \{S_{\{p(s,k)\}}\{i_{s,k}\}, 1 \leq k \leq K_1\} \text{ and}$$

$$A_{\{q(t,m)\}}\{i_{t,m}\} \sim \{S_{\{q(t,m)\}}\{j_{t,m}\}, 1 \leq m \leq K_2\}. \tag{18}$$

Previous considerations allow the following conclusion: for the first category to be included in the second one, or $A_{\{p(s,k)\}}\{i_{s,k}\} \subset A_{\{q(t,m)\}}\{i_{t,m}\}$, it is sufficient that each of the components of the first union is included into some component of the second union:

$$\forall k (1 \leq k \leq K_1) \; \exists m = m(k)(1 \leq m \leq K_2):$$
$$S_{\{p(s,k)\}}\{i_{s,k}\} \supset S_{\{q(t,m)\}}\{j_{t,m}\}. \tag{19}$$

Computing the Union

The algorithm is based on formula (12) of the disjunction of logical polynomials. The union of two given categories (18) is determined by concatenation of the lists of simple collections included in the unions $\{S_{\{p(s,k)\}}\{i_{s,k}\}\}$ and $\{S_{\{q(t,m)\}}\{j_{t,m}\}\}$:

$$A_{\{p(s,k)\}}\{i_{s,k}\} \cup A_{\{q(t,m)\}}\{i_{t,m}\} \sim \{\{S_{\{p(s,k)\}}\{i_{s,k}\}, 1 \leq k \leq K_1\}, \{S_{\{q(t,m)\}}\{j_{t,1}\}, 1 \leq m \leq K_2\}\} =$$
$$\{S_{\{p(s,1)\}}\{i_{s,1}\}, S_{\{p(s,2)\}}\{i_{s,2}\}, \ldots,$$
$$S_{\{p(s,K)\}}\{i_{s,K1}\}, S_{\{q(t,1)\}}\{j_{t,1}\}, S_{\{q(t,2)\}}\{j_{t,2}\}, \ldots,$$
$$S_{\{q(t,M)\}}\{j_{t,K2}\}\} \tag{20}$$

with the subsequent removal of redundancy, (i.e., reduction of the resulting union of simple collection). The latter means removing simple categories already included in other components of the union. In other words, reduction is the removal of all simple collections S such that the resulting union of simple collections (20) includes at least one simple collection $T \subset S$.

Computing the Intersection

This algorithm is based on the formula (13) of the conjunction of logical polynomials. The intersection of two given categories (18) is equivalent to the union of all non-empty pair-wise intersections of the union components:

$$A_{\{p(s,k)\}}\{i_{s,k}\} \cap A_{\{q(t,m)\}}\{i_{t,m}\} \sim \{T_{k,m}, 1 \leq k \leq K_1, 1 \leq m \leq K_2, T_{k,m} \neq \emptyset\}, \text{ where}$$

$$T_{k,m} = S_{\{p(s,k)\}}\{i_{s,k}\} \text{ if } S_{\{q(t,m)\}}\{j_{t,m}\} \subset S_{\{p(s,k)\}}\{i_{s,k}\},$$

$$T_{k,m} = S_{\{q(t,m)\}}\{j_{t,m}\} \text{ if } S_{\{p(s,k)\}}\{i_{s,k}\} \subset S_{\{q(t,m)\}}\{j_{t,m}\},$$

$$T_{k,m} = \emptyset \text{ if } S_{\{q(t,m)\}}\{i_{t,m}\} \not\subset S_{\{p(s,k)\}}\{i_{s,k}\} \text{ and } S_{\{p(s,k)\}}\{i_{s,k}\} \not\subset S_{\{q(t,m)\}}\{j_{t,m}\}. \quad (21)$$

The resulting union of simple collections $\{T_{k,m}, T_{k,m} \neq \emptyset\}$ should be reduced (see, for example, the previous Section titled "Computing the Union").

Computing the Complement (Difference)

This algorithm is based on the formula (17) for the negation of logical polynomials. If the categories (18) are defined by the polynomials $d_{\{p(s,k)\}}\{i_{s,k}\}$ and $d_{\{q(t,m)\}}\{j_{t,m}\}$, respectively, then:

$$A_{\{p(s,k)\}}\{i_{s,k}\} \backslash A_{\{q(t,m)\}}\{i_{t,m}\} \sim d_{\{p(s,k)\}}\{i_{s,k}\} \wedge (\neg d_{\{q(t,m)\}}\{i_{t,m}\}).$$

Going over to an equivalent description in terms of attributive expressions, results in:

$$A_{\{p(s,k)\}}\{i_{s,k}\} \backslash A_{\{q(t,m)\}}\{i_{t,m}\} = A_{\{p(s,k)\}}\{i_{s,k}\} \bigcap_{m=1}^{K_2} \left( \bigcap_{t=1}^{L_{2,m}} UB_{t,m} \right), \quad (22)$$

where $L_{2,m}$ are the total numbers of attributes in the simple categories $S_{\{q(t,m)\}}\{j_{t,m}\}$ ($1 \leq m \leq K_2$), and the ancillary categories $B_{m,t}$ are defined by the following collections:

$$B_{t,m} \sim \{(C_{q(1,m)}, j_{1,m}), (C_{q(2,m)}, j_{2,m}), \ldots, (C_{q(t-1,m)}, j_{t-1,m}), \text{compl}((C_{q(t,m)}, j_{t,m}))\},$$

where $1 \leq t \leq L_{2,m}$, $1 \leq m \leq K_2$. Using expression (2) for the complements of branches and the mutual distributivity of the operations $\wedge$ and $\vee$, $B_{t,m}$ may be represented as unions of $N_{q(t,m)} - 1$ simple collections $T_{r,m}$:

$$B_{t,m} \sim \{T_{r,m}, 1 \leq r \leq N_{q(t,m)}, r \neq j_{t,m}\},$$

$$T_{r,m} = \{(C_{q(1,m)}, j_{1,m}), (C_{q(2,m)}, j_{2,m}), \ldots, (C_{q(t-1,m)}, j_{t-1,m}), (C_{q(t,m)}, r)\}, \quad (23)$$

where $N_{q(t,m)}$ are the cardinalities of the respective criteria $C_{q(t,m)}$.

Combination of the expressions (22) and (23) provides the ability to compute the complement as a superposition of unions and intersections of the categories $B_{t,m}$ using the algorithms (20) and (21). In a general case, the direct use of these formulas may prove costly, but general ways of efficient optimization are possible.

Since the composition of unions $\{T_{r,m}\}$ depend on the cardinalities $N_{q(t,m)}$, the complement operation in the above-given formulation is not invariant with respect to an increase of the criteria cardinalities. However, it can be made invariant by generalizing the notion of a simple collection by allowing it to include complements of attributes in the same way as complements of branch unions (2) introduced in the section titled "Unions of Criterion Branches". In that case, simple collections encode conjunctions of the predicates $P_{p(s,k)}(i_{s,k})$ and their negations that allow the description of the categories $B_{t,m}$ directly, without using expressions (23). This generalization requires some minor modifications of the algorithms considered here.

Retrieving Direct Derived and Base Categories

It is natural to call direct parents (or direct base) categories and direct children (or direct derived) categories of a given category A those categories $B \supset A$ and $D \subset A$, that result from A after performing a single elementary extension (generalization) and, respectively, restriction (specialization). In other words, those extensions and restrictions that cannot be represented as a composition of simpler operations. More exactly, there are no intermediate categories $B^*$ and $D^*$ such that $B^* \neq A$, $B^* \neq B$, $B \supset B^* \subset A$ and $D^* \neq A$, $D^* \neq D$, $D \subset D^* \subset A$, respectively.

In the semantics of unions of simple collections, any extension of a category A is performed by uniting it with any non-empty category not included in A, and any restriction is performed by subtracting from A one of its non-empty sub-categories. Elementary extensions and restrictions correspond to addition and subtraction of various leaf categories of the induced polyhierarchy. Leaf categories are simple categories without free criteria.

Thus, direct derived and direct base categories of a category A are all possible non-empty categories $A \backslash E$ and $A \cup F$, respectively, where $E \subset A$ and $F \not\subset A$ are leaf categories of the polyhierarchical classification. Clearly, the previously considered procedures of restriction and extension in terms of simple collections (see, for example, the section above titled "Illustrative Embodiments of the Induced Polyhierarchies of Categories") and collections with unions of branches (see, for example, the sections above titled "Retrieving Direct Derived Categories" and "Retrieving Direct Base Categories") can be performed as sequences of corresponding elementary operations in terms of unions of simple collections.

Figure 14:
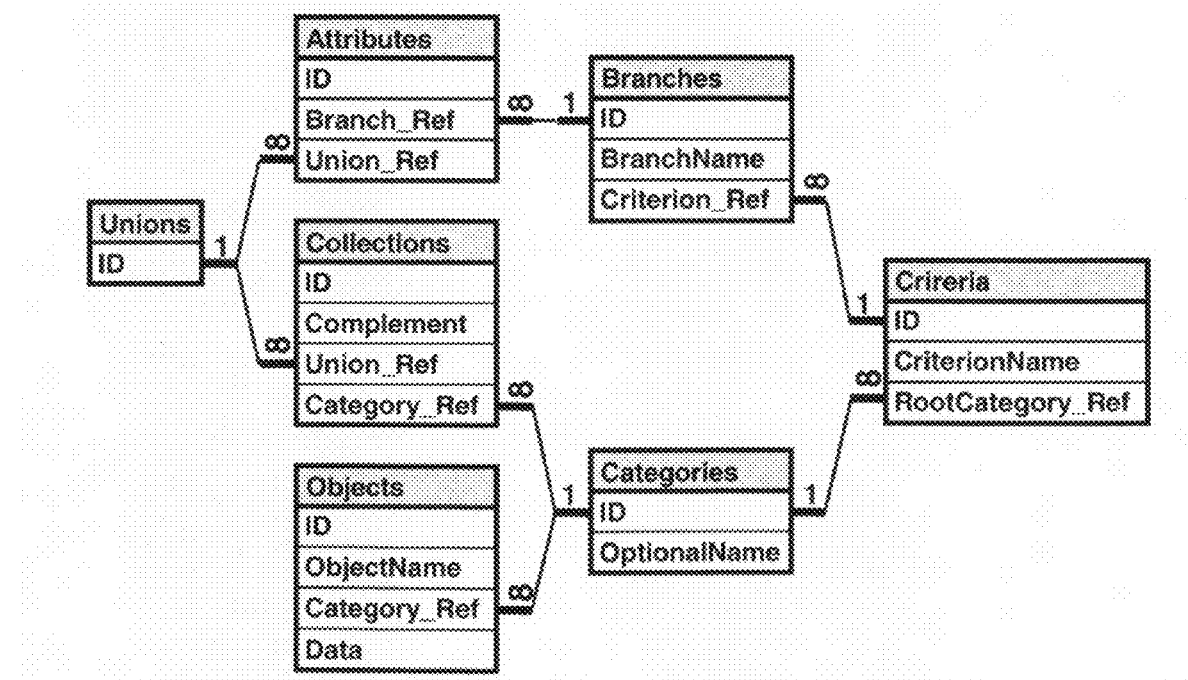

Illustrative Embodiments of Database Configurations Facilitating Collections with Branch Unions and Unions of Simple Collections The generalized forms of attributive expressions, described above, can be implemented using common database management systems (DBMS) as effectively as simpler versions of the method described, for example, in the section above titled "Illustrative Embodiments of Database Configuration Facilitating Simple Collections". In one illustrative embodiment, the generalized form of the attributive expression may be implemented in the Microsoft Access 2000 environment. FIG. 14, for example, shows a database configuration that facilitates classifications based on attributive expressions in the form of collections with branch unions, generally described in the section above titled "Union of Criterion Branches".

Compared with the initial construction of a sample database as described above in the description accompanying FIG. 11, this system includes two additional tables: "Unions" and "Collections". It should be appreciated that other labels or identifiers may be assigned to the tables and that the selected names may vary as a matter of design choice. The first table serves for identifying branch unions (1) participating in persistent collections (3), with the table "Attributes" defining the composition of those branch unions as a "many-to-many" relation between the tables "Branches" and "Unions". Similarly, the "Collections" table defines the composition of the collections with branch unions (3) that describe persistent classification categories, as a "many-to-many" relation between the tables "Unions" and "Categories". To provide the possibility of describing persistent categories by using complements of branch unions (2), the "Collections" table contains the field "Complement" which takes values "Yes" and "No." The value in this field defines whether a particular branch union "Union_Ref" is included in the collection of the persistent category "Category_Ref" as is or as a complement of itself.

Figure 15:
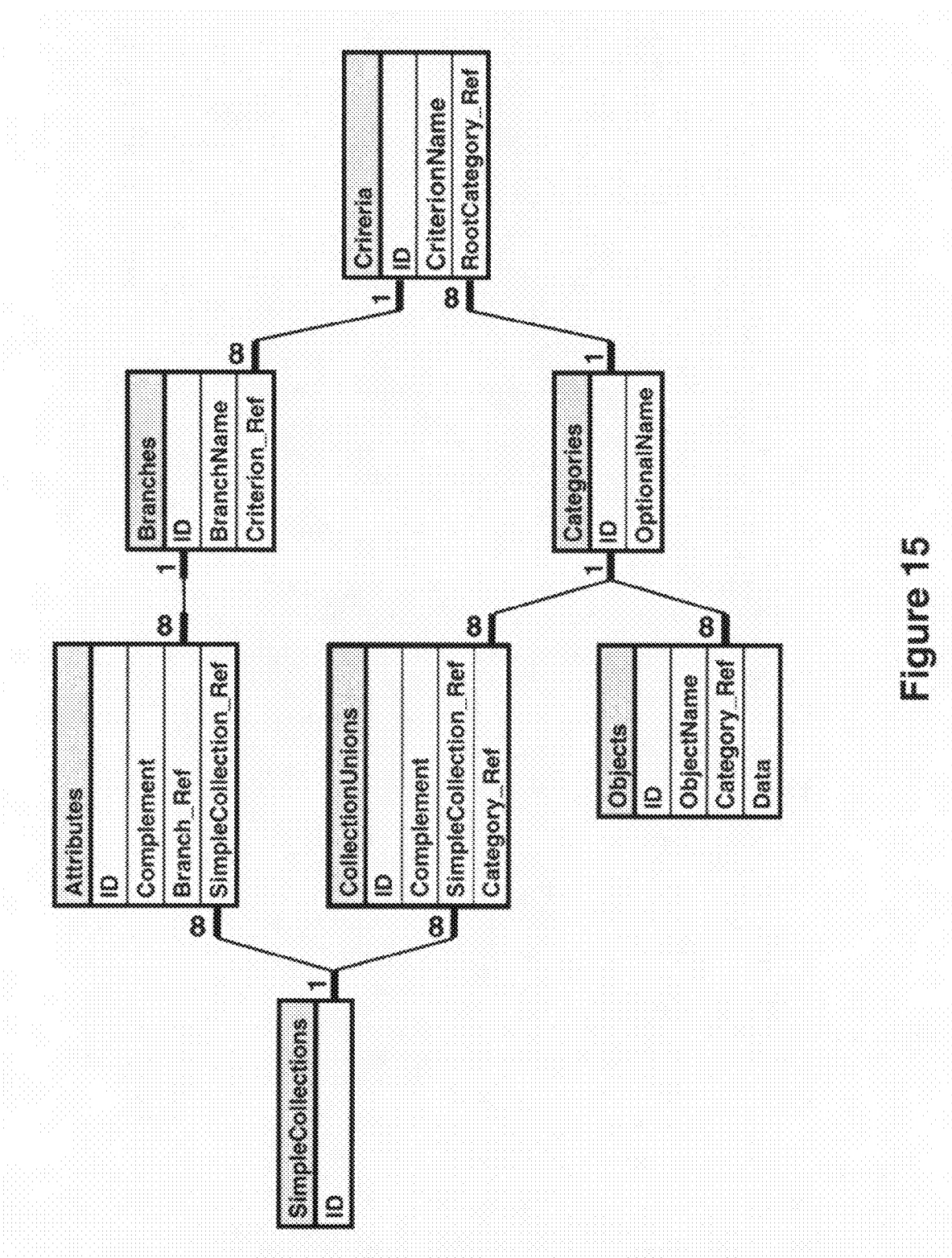
Figure 16:
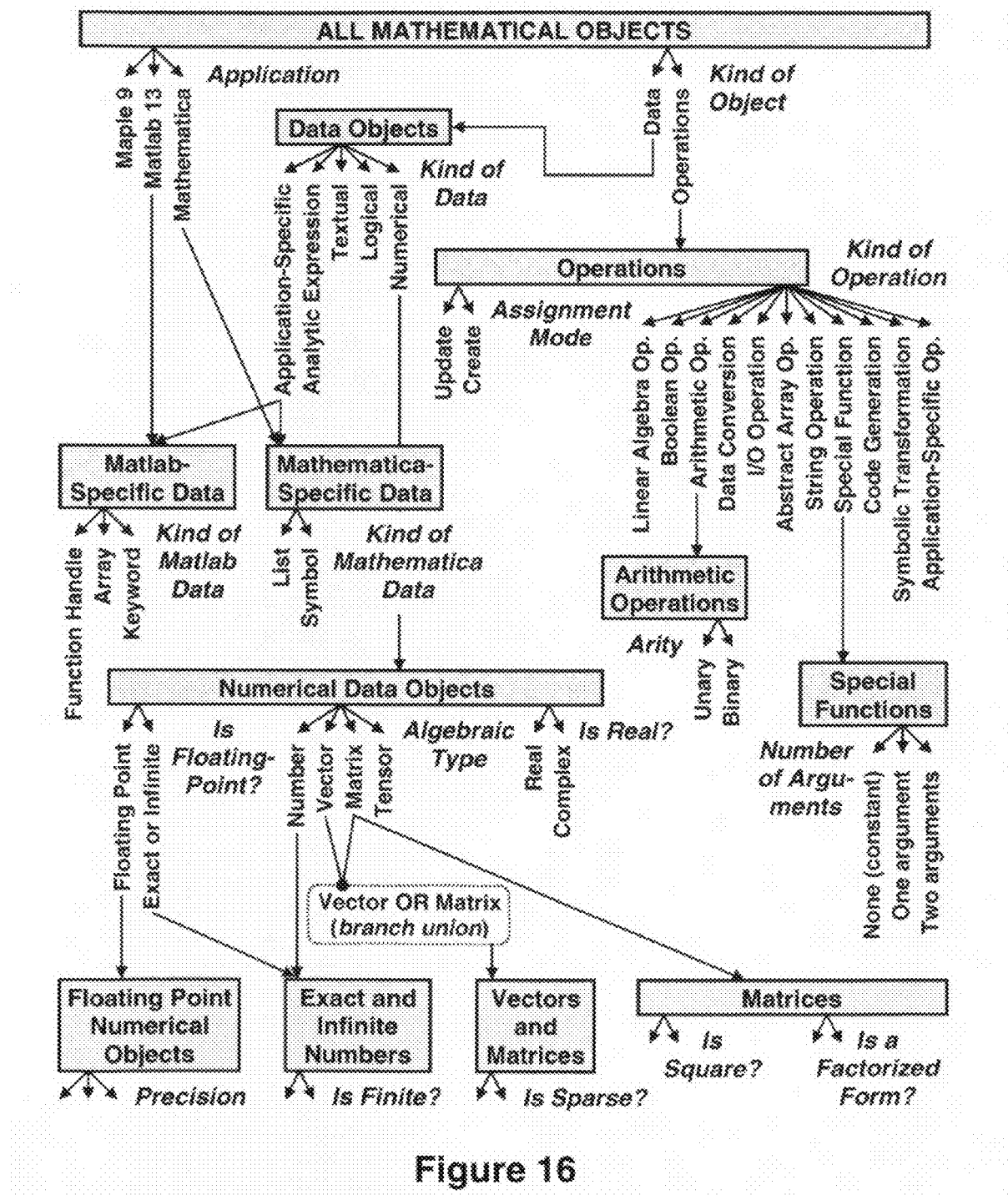

FIG. 15 shows a sample database configuration that facilitates classifications based on the attributive expressions in the form of unions of simple collections, which are described generally, for example, in the section titled "Uniting Arbitrary Categories". By its construction, this configuration is similar to the database configuration illustrated in FIG. 14. The table "SimpleCollections" identifies simple collections (16) participating in persistent unions of simple collections (15), with the composition of those collections defined by the "Attributes" table as a "many-to-many" relation between the tables "Branches" and "SimpleCollections". The use of an additional field "Complement" in the table "Attributes" taking values "Yes" and "No" allows the formation of simple collections with complements of attributes. Finally, the table "CollectionUnions" describes unions of simple collections of the form (15) (in particular, single simple collections) defining persistent categories as a <<many-to-many>> relation between the tables "SimpleCollections" and "Categories".

The exemplary database configurations are intended for automatically performing low-level operations such as retrieving a list of branches of a selected criterion, finding a root category of a criterion, retrieving a list of attributes of the attributive expression defining a selected category, finding objects pertaining to a given category, and the like. These processes may be performed using standard management systems of a relational database. Implementations of these methods in environments other than relational databases may require the development of supplementary platform-specific routines to support such low-level operations. In addition, supplementary software code may be used for supporting higher level operations, such as database access, user interfaces, and operations on classification categories mentioned, for example, in the sections titled "Operations on Collections with Branch Unions" and "Operations on Unions of Simple Collections". However, unlike with conventional classification methods, the supplementary software does not depend on application-specific features of the polyhierarchical classification and the complexity of the classification.

Other Aspects of Practical Implementations

In the development of particular applications, additional technical challenges may arise that may be resolved with the knowledge of application functionality and specific features of the particular polyhierarchical classification. Some of the predictable issues include:

1. As already noted in the sections above, the generalized forms of attributive expressions greatly increase the granularity of classification (i.e., total number of available classification categories, in particular the numbers of direct parents of non-topmost categories and direct children of non-leaf categories). In some cases, this may lead to such a complexity of sub-trees of the induced polyhierarchy that they no longer allow for an observable graphical representation. In this case, the use of the "three-window interface" (see, for example, the description accompanying FIG. 12 in the section titled "Illustrative Embodiments of a Graphical User Interface") becomes difficult, as well as the use of any other graphical interface based on the sub-trees visualization. Thus, the design of the user interface may become an important factor when developing applications with interactive access to the classification, such as with interactive search systems.

2. The description of the classification categories in terms of unions of simple collections is much more general than the description based on collections with branch unions. On the other hand, classifications built with intensive use of branch unions may not be able to be implemented efficiently in terms of unions of simple collections. This follows from the observation that after the transformation of logical polynomials (10) to the form (11), the size of the data structures required for their representation in terms of attributive expressions could increase considerably.

Therefore, when constructing complicated classifications, an optimization of the formalism of unions of simple collections may be required. To combine advantages of the two method versions, it is possible to use a mixed form of the logical functions defining classification categories (see, for example, the section above titled "Uniting Arbitrary Categories"):

$$e_{\{p(s,r)\}}\{i_{n,s,r}\} = \bigvee_{r=1}^{R} g_{\{p(s,r)\}}\{i_{n,s,r}\} = \bigvee_{r=1}^{R} \bigwedge_{s=1}^{M_r} \bigvee_{n=1}^{K_{s,r}} P_{p(s,r)}(i_{n,s,r}), \quad (24)$$

$$\text{where } g_{\{p(s,r)\}}\{i_{n,s,r}\} = \bigwedge_{s=1}^{M_r} \bigvee_{n=1}^{K_{s,r}} P_{p(s,r)}(i_{n,s,r})(1 \le r \le R).$$

Particular terms $g_{\{p(s,r)\}}\{i_{n,s,r}\}$ of the disjunctions $e_{\{p(s,r)\}}\{i_{n,s,r}\}$ are similar to the functions $c_{\{p(s)\}}\{i_{n,s}\}$ from (10), so attributive expressions that encode the functions (24) can be called unions of collections with branch unions. The algorithms of taxonomy algebra for those attributive expressions can be derived by combining algorithms from the appropriate sections above. However, due to the mutual distributivity of the operations $\wedge$ and $\vee_n$, in a general case functions $e_{\{p(s,r)\}}\{i_{n,s,r}\}$ may have several equivalent representations. Thus, practical implementations of unions of collections with branch unions may require choosing an optimal canonical form of the functions (24). The choice should ordinarily depend on the target application functionality and the features of a specific classification.

Illustrative Embodiments of Implementations

The simplified database configurations considered in the subsections above titled "Illustrative Embodiments of Database Configuration Facilitating Simple Collections" and "Illustrative Embodiments of Database Configurations Facilitating Collections with Branch Unions and Unions of Simple Collections" provide efficient support for low-level operations in relational database environment, thus allowing a reduction in the size of program codes that perform high-level operations, such as access to a database, user interfaces, operations on classification categories, etc. However, when optimized for particular applications, those configurations may require modification and/or supplementation by additional elements. For the purpose of illustration, several exemplary modifications are listed below that might be helpful for reducing the use of computer resources, extending the functionality, and enhancing the efficiency of the interfaces:

1. When building complex classifications that contain a large number of criteria and persistent categories, the largest space in the permanently stored descriptive data (without taking into account classified objects) may be occupied by the auxiliary table "Attributes" representing a "many-to-many" relation between other tables, see FIGS. 11, 14, and 15. Therefore, considerable reduction in storage requirements can be achieved by storing persistent attributive expressions in a compact form. For instance, the following techniques can be useful:
   a. Instead of representing persistent attributive expressions by "many-to-many" relations between dedicated tables, they can be compressed into a form of binary or text strings and stored in a special field of the "Categories" table. In some cases the compact format of the attributive expressions can be chosen so that typical operations, such as inclusion checking may be executed directly with the compressed strings without decoding them. In addition to a savings in storage space, this solution provides for faster retrieval of the attributes of a specified category.
   b. In the "Categories" table, a set of intermediate "reference-point" categories can be specified, such that all other classification categories can be derived from them. Reference-point categories are described by their full attributive expressions, while all other persistent categories are described by references to the nearest base reference-point categories supplemented with additional attributive sub-expressions. Those additional sub-expressions can be stored in a compressed form as discussed above. One natural choice for reference-point categories is the set of root categories of criteria. This method of representation of attributive expressions by splitting them into two or more sub-expressions is useful, in particular, for scalable network-distributed classifications with sub-hierarchies stored on, for example, different network nodes.
2. To ensure data consistency when designing and maintaining distributed classifications, it is expedient to remove the direct link of the description of the generating polyhierarchy of criteria with the list of persistent categories. This can be attained by using a dedicated group of independent tables to store criteria and sets of branches that define the structure of their dependencies, (i.e., generating polyhierarchy).
3. In certain contexts, (e.g., in graphical interfaces), it may be useful to quickly restore some sub-hierarchies of categories in the forms of trees or DAGs. This requires an efficient implementation of the retrieval of all direct parents and children of a given category (see, for example, the sections above titled "Illustrative Embodiments of the Induced Polyhierarchies of Categories", "Retrieving Direct Derived Categories", "Retrieving Direct Base Categories", and "Retrieving Direct Derived and Base Categories"). In particular, it is useful to include in the descriptions of persistent categories additional information that would simplify the detection of their leaf and free criteria. This information can be encoded in a number of different ways. As an example, the information may be encoded as follows:
   a. In the descriptions of attributive expressions, the attributes (or branch unions) corresponding to leaf criteria may be assigned a special flag to distinguish them from other attributes (or branch unions).
   b. To explicitly list free criteria, the attributive expressions may be supplemented with new elements that can be called unspecified attributes. Each unspecified attribute has a reference to respective free criteria and has a flag that distinguishes it from other attributes (or branch unions), such as a reference to an "undefined branch" not associated with any criterion.
4. When using semantically related classification criteria, it is helpful to enable the recognition of attributive expressions that correspond to identically empty categories defined by inconsistent sets of object properties. To automate this task it may be beneficial to include the most abstract of identically empty categories in the "Categories" table with a flag to distinguish them from the rest. These categories can be also associated with diagnostic messages stored in a separate database table.
5. In some embodiments, the polyhierarchical classification can be combined with other tools for the search and the retrieval of data, such as interactive applications for search by keywords, parameter ranges, and the like. If these tools are applicable not to the whole classified set but only to some of its subsets, for automatically enabling and disabling them it may be useful to describe their domains of applicability in terms of classification categories. In a general case, classification categories can be defined by "natural" criteria, (i.e., criteria dictated by the nature of the classified objects), as well as additional "control" criteria introduced exclusively for the support of particular external tools. For the automation of interfaces, root categories of the "control" criteria may also be included into the "Categories" table with a flag to distinguish them from other categories.
6. To simplify development of interface program codes, it can be convenient to use attributive expressions not only for describing classification categories, but also as a formal language for representing intermediate logical formulas arising at different stages of data processing when working with a classification. Consider, for example, a particular case when a classification is built on the basis of one of three forms of attributive expressions: simple collections, collections with branch unions, or unions of simple collections. If an application requires access the classification using complex queries in the form of general logical formulas composed of elementary predicates (like those used in set-based and dynamic classifications), the interface program can encode such queries in the form of a union of simple collection for further processing. Since any of three mentioned forms of attributive expressions used in construction of the classification is a particular case of unions of simple collection, descriptions of classification categories can be dynamically converted to the same form. Therefore, when processing client queries, both descriptions of classification categories and input queries can be represented in a unified form, thus allowing use of a standard software library that supports a full set of logical operations (or set theory operations which is the same) using, for example, algorithms described in the section titled "Operations on Unions of Simple Collections". This manner of optimization may be useful for both interactive and automatic modes of accessing a classification. The examples considered here show that a particular classification implementation may use several different forms of attributive expressions for different operations within the classification. For example, a first form of attributive expression may be used for developing and managing the classification, while a second form of attributive expression may be used for operating the classification to facilitate logical operations.

7. Applied polyhierarchical classifications may involve complex systems of criteria. As an example, a relatively small fragment of a generating polyhierarchy used as a foundation of a polyhierarchy of mathematical objects currently under development by QNT Software Development Inc. is presented in FIG. 16. If a classification includes too many simultaneously applicable criteria, then an appropriate ordering of those criteria may be required to provide convenient user interfaces.

A specific feature of various illustrative embodiments of the methods claimed herein is that their practical realization includes definitions of domains of applicability of the classification criteria. Therefore, restructuring many existing classification systems in order to represent them in the form of induced polyhierarchies may require auxiliary criteria introduced exclusively for defining domains of applicability of other criteria. If the original classification is not based on a well-reasoned system of criteria, the classification may require adjustments of user interfaces in order to fill the gap between the new structure of classification and the user's conservative perception.

Figure 17:
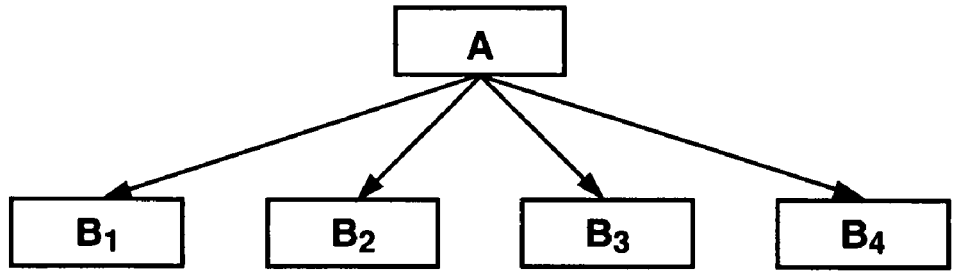
Figure 18:
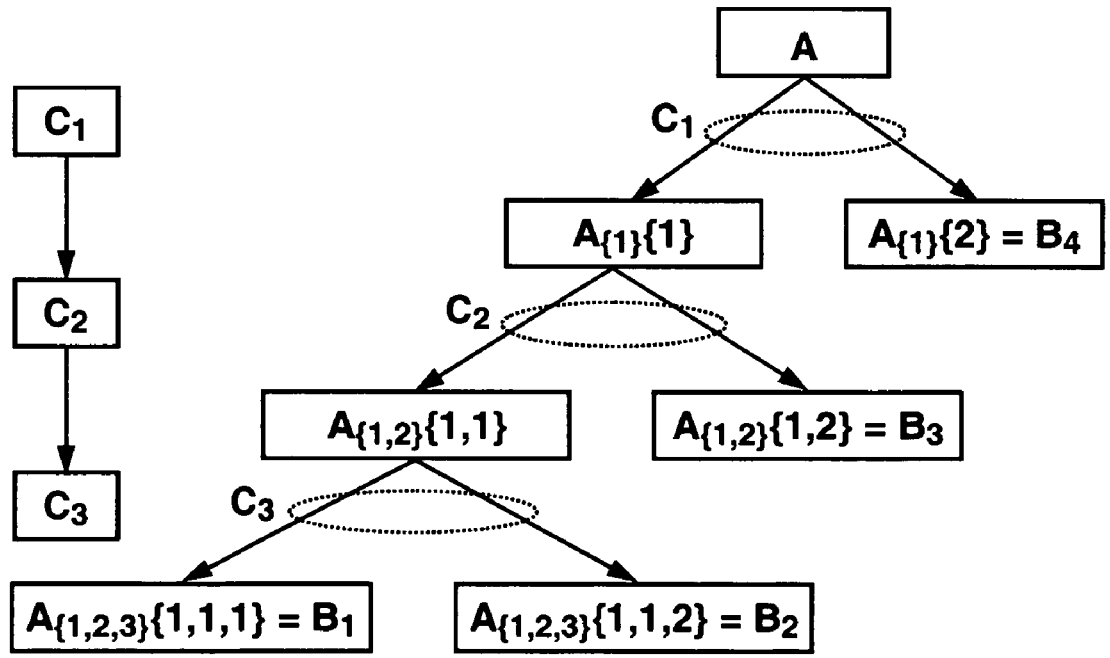

To illustrate these points, FIG. 17 shows a sub-tree of some original classification that corresponds to a partitioning of A into four subcategories: $B_1$, $B_2$, $B_3$ and $B_4$. If the original classification is not based on attributive descriptions of object properties with a well-structured system of classification aspects, then restructuring may result, for example, in replacement of the original sub-tree with a more complex one, such as the sub-tree shown in FIG. 18, where attributive expressions of categories $B_1$, $B_2$, $B_3$, $B_4$ include different numbers of attributes. However, when developing the user interface for this classification, it may be appropriate to hide the intermediate branching levels introduced for a correct reflection of criteria dependencies, and instead display this fragment as a single composite criterion with four branches, represented in FIG. 17.

The considerations above result in the conclusion that criteria presented to the user, as well as the order of their presentation, may not only be determined by the structure of the generating polyhierarchy, but also by considerations of the user's convenience, use of conventional terminology, and the like. Therefore, practical applications may require some auxiliary data structures specifying the interface protocol. Particularly, for the support of non-branching fragments of a generating polyhierarchy in the form of composite criteria, it may be sufficient to add a field for the "shown/hidden" flag to the "Criteria" table. However, it should be appreciated that such ordering of simultaneously applicable criteria and/or hiding criteria for the purpose of improving user interfaces may be accomplished without changing the underlying structure of the generating polyhierarchy.

Advantages of Various Illustrative Embodiments of the Classification Methods

The description of polyhierarchical classifications based on the use of generating polyhierarchies of criteria has several advantages over widely used conventional methods of description by trees, facets, directed acyclic graphs (DAGs), and their compositions (facets). Illustrative examples of some of these advantages include:

1. Compactness of descriptive data. Data structures required for describing a classification which are usually stored in a data repository or represented by an application-specific program code, ordinarily have by an order of magnitude smaller size compared to equivalent descriptions in terms of trees, DAGs or facets. For basic operations, such as specifying object properties and searching for objects by superposition of dependent criteria, retrieving particular sub-hierarchies with dynamically generating attributive expressions that define intermediate categories, matching distant categories by the relation "general-specific", and performing set theory operations on persistent and dynamic categories, it is only necessary to permanently store descriptions of the generating polyhierarchy and non-empty categories of the induced polyhierarchy (see, for example, the section above titled "Implicit Description of Induced Polyhierarchies of Categories"). Because the generating polyhierarchy contains information about relations between criteria (but not categories), its structure is vastly more compact than that of the induced polyhierarchy. Definition of categories in terms of attributive expressions makes it unnecessary to store information about inheritance relations between categories (which are usually represented by graph edges or relations in faceted thesauri) regardless of the complexity of system of those relations.

2. Flexibility of the classification. Instead of listing consistent compositions of object properties that define classification categories, various illustrative embodiments of the classification claimed herein encode the full set of meaningful categories and inheritance relations between them by means of a generating polyhierarchy and sets of branches of its criteria. This simplifies modification of a polyhierarchical classification, for example, during its design, subsequent detailing, and when extending the classified set. So, for example, it proves useful not to list categories that are expected to be non-empty in advance, but form them automatically as new objects are included into the classification. Extension of the category polyhierarchy, required in order to introduce new options for defining object properties, is done simply by extending the set of branches of corresponding criteria. Somewhat more complex modifications necessary for a) increasing the level of detail in descriptions of object properties or b) composing several polyhierarchical classifications into one, can be performed by extending the generating polyhierarchy by adding new criteria or sub-hierarchies of criteria with the automatic expansion (or merger) of the previously formed persistent attributive expressions.

3. Simplification of managing algorithms. Describing categories of classification in terms of attributive expressions directly identifies compositions of object properties without involvement of any redundant information, such as the sequence of specializing those properties. Unlike the conventional methods of description in terms of trees, DAGs, or facets the description presented herein is essentially non-local, because each attributive expression defines an absolute location of a category in the induced polyhierarchy, and, therefore, encodes a full set of possible paths connecting categories in the equivalent DAG. This leads to a considerable reduction in computational costs for solving "non-local" problems, such as a) the check of the distant inheritance (i.e., inclusion) relation between two given categories (see, for example, the sections above titled "Illustrative Embodiments of the Induced Polyhierarchies of Categories", "Test for Inclusion Relation", and "Test for Inclusion"), b) determining the nearest common base category for a given set of categories, and c) determining the nearest common derived category for a given set of categories. Unlike algorithms attempting to solve these problems using local inheritance relations, the use of various illustrative embodiments of the methods claimed herein requires neither combinatorial search for a path nor storage of redundant descriptions.

4. Automatic unambiguousness and consistency of description. A generating polyhierarchy and the sets of criteria branches define the structure of an induced polyhierarchy of categories. Hence, the use of various illustrative embodiments of the methods claimed herein does not require the use of heuristics in determining what persistent categories are necessary and how they relate to each other. Also, consistency of sets of object properties encoded by attributive expressions automatically results from dependence relations between criteria, without the involvement of any auxiliary constructions, such as composition rules, roles and purposes, meta-facets and the like. As opposed to other methods of classification, auxiliary descriptions and/or computer programs are not required to ensure unambiguousness and consistency of input data when developing, maintaining, and using databases or other information repositories.

5. High abstraction level. As already noticed in the section above titled "Implicit Description of Induced Polyhierarchies of Categories", the main stage of constructing a classification is the design of a generating polyhierarchy, which is performed by systemizing classification criteria that provide specialization of significant traits (i.e., properties of imaginary objects, distinguishable under the classification). Unlike the process of designing classifications described by trees, facets and DAGs, it is not required at this stage to a) prescribe an order between mutually independent criteria, b) list necessary vertices (categories), and c) introduce redundant edges or other auxiliary descriptive structures like meta-facets. So, various illustrative embodiments of the methods claimed herein allow the design of polyhierarchical classifications on the basis of broader concepts, without considering secondary, implementation-specific details. In addition, the generating polyhierarchy and/or its sub-hierarchies become primary information structures that can be developed independently and reused when creating various classifications.

6. Increased efficiency of interfaces. The absence of a prescribed order between criteria sharing a common root category and intrinsic recognition of criteria domains of applicability makes interactive data input when developing and using information repositories much more efficient. Thus, it is expedient to build an interface that provides a full set of criteria applicable at a current level of specialization, and allows any of these criteria to be applied for further specializing the description. The use of such an interface for interactive specialization of object properties is similar to browsing partial sub-trees of the polyhierarchical classification, which are defined by the sequence of specializations. However, unlike algorithms implemented in conventional widespread interactive database management and search systems, various illustrative embodiments of the methods claimed herein allow these trees to be formed dynamically rather than to be predefined. This enables a considerable increase in the variety of criteria (i.e. level of detail in specialization of object properties) without paying for the additional costs entailed by an increase in the complexity of the interface or by the catastrophic expansion of descriptive data and/or managing programs.

General Guidelines for Implementation

Figure 19:
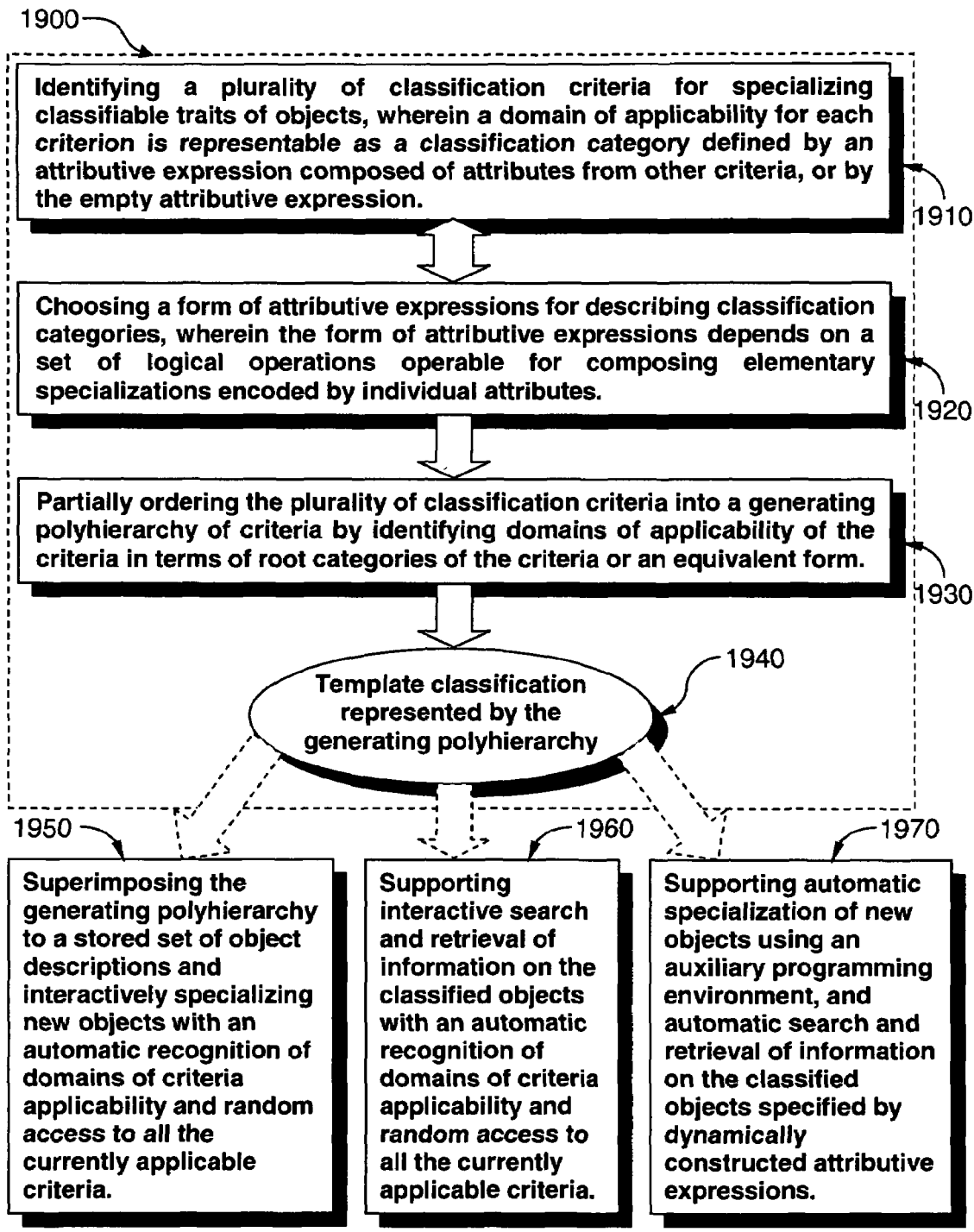

In various illustrative embodiments of the present invention, as shown in FIG. 19, a method 1900 begins, as set forth in box 1910, by identifying a plurality of classification criteria for specializing classifiable traits of objects. The identified plurality of criteria should be sufficient for describing properties of objects considered useful for distinguishing the objects under a classification. As previously described, the objects may be imaginary objects that can theoretically exist due to the compatibility of various properties distinguishable under a classification. Each criterion in the plurality of criteria is represented by a set of mutually exclusive attributes so that a single classified object can be assigned no more than one attribute by the same criterion.

A domain of applicability of each criterion is representable as a classification category defined by an attributive expression that is composed of attributes from other criteria, or by the empty attributive expression. Since some auxiliary criteria may be required for defining domains of applicability of the previously selected criteria, identifying classification criteria may be performed simultaneously with identifying their domains of applicability.

The method 1900 may proceed by choosing a form of attributive expressions for describing classification categories, as set forth in box 1920. The chosen form of the attributive expressions depends on a set of logical operations to be used for composing elementary specializations encoded by individual attributes. Depending on the required functionality of the target classification, the attributive expressions may have the forms of:

simple collections of attributes implying a logical conjunction of elementary specializations encoded by attributes from different criteria (see, for example, the section above titled "Illustrative Embodiments of Polyhierarchies of Criteria");

collections with branch unions allowing, in addition, a logical disjunction of elementary specializations encoded by attributes from the same criterion (see, for example, the section above titled "Unions of Criterion Branches");

unions of simple collections encoding arbitrary logical statements on object properties representable in terms of elementary specializations of criteria using conjunctions, disjunctions, differences, and negations (see, for example, the section above titled "Uniting Arbitrary Categories");

unions of collections with branch unions, which are an optimized version of unions of simple collections (see, for example, the section above titled "Other Aspects of Practical Implementation");

other application-specific attributive structures encoding logical statements of object properties in terms of elementary specializations.

Since domains of criteria applicability should be representable as classification categories defined by attributive expressions, an optimal way of describing those domains may depend on the chosen form of the attributive expressions. On the other hand, describing domains of applicability for application-specific criteria may require support for some predefined set of logical operations that relate to application-specific forms of the attributive expressions. As a result, it is often the case that the steps of identifying a plurality of criteria (box 1910) and choosing a form of the attributive expression (box 1920) are closely related, so that the identified criteria may impose restrictions on the form of the attributive expressions, and variation of that form may result in changes in composition of the identified plurality of criteria.

The method may further proceed by partially ordering the plurality of classification criteria into the generating polyhierarchy of criteria by identifying domains of criteria applicability in terms of their root categories described by respective attributive expressions, as set forth in box 1930. As described in the section above titled "Illustrative Embodiments of Polyhierarchies of Criteria", the dependency relationships between criteria resulting from the definition of their domains of applicability automatically forms the generating polyhierarchy of criteria, as indicated schematically at oval 1940.

The resulting generating polyhierarchy of criteria implicitly provides an unambiguous and exhaustive description of a structure of the target polyhierarchical classification (see, for example, the section above titled "Illustrative Embodiments of the Induced Polyhierarchy of Categories"). The generating polyhierarchy of criteria may be permanently stored in a data repository, or represented in an alternative form intended, for example, for distribution in a text format. The alternative form of representation of the generating polyhierarchy of criteria should be equivalent to the representation in terms of attributive expressions of root categories in the sense that the former can be automatically converted to the latter without using any extra information.

On completing the step set forth in box 1940, the induced polyhierarchy of classification categories appears to be implicitly defined so that explicit identification and/or enumeration of the categories is not required. The method 1900 may further proceed by:

superimposing the generating polyhierarchy to a stored set of object descriptions and interactively specializing new objects with an automatic recognition of domains of criteria applicability and random access to all the currently applicable criteria, as set forth in box 1950, and/or supporting interactive search and retrieval of information on the classified objects with an automatic recognition of domains of criteria applicability and random access to all the currently applicable criteria, as set forth in box 1960, and/or supporting automatic specialization of new objects using an auxiliary programming environment, and automatic search and retrieval of information on the classified objects specified by dynamically constructed attributive expressions, as set forth in box 1970.

At oval 1940, the generating polyhierarchy of criteria may be considered as an independent re-usable information structure serving as a template classification for structuring information. In general, the generating polyhierarchy may be:

superimposed with several sets of classified objects having similar properties;

added to more general template classifications as a component; or used as a prototype for constructing more comprehensive template classifications.

Accordingly, depending upon the implementation of the present invention, the steps set forth in boxes 1910, 1920 and 1930 may be undertaken as separate steps from the steps described in boxes 1950, 1960, 1970. For example, steps 1950, 1960, and 1970 may be repeated when superimposing different sets of classified objects with the template classification.

Further extensions and refinements of the target classification may include, for example:

extending the set of objects superimposed with the generating polyhierarchy;

introducing new branches to existing criteria;

a introducing new criteria to an existing generating polyhierarchy of criteria;

extending an existing generating polyhierarchy of criteria by incorporating other generating polyhierarchies or their sub-hierarchies in the existing generating polyhierarchy of criteria.

Figure 20:
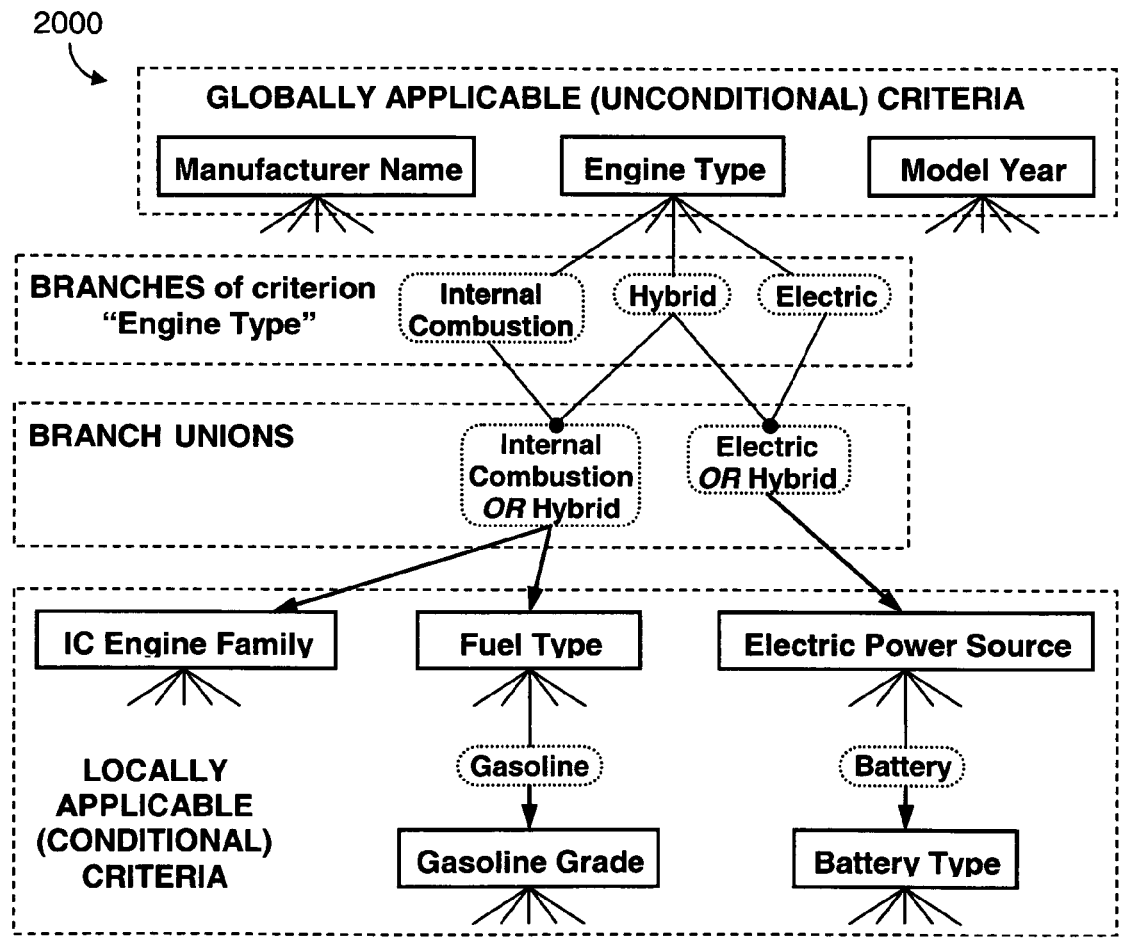

When introducing a new criterion or incorporating a second polyhierarchy into an existing generating polyhierarchy, domains of applicability of the new components should be identified and represented by root categories in the existing generating polyhierarchy. To automatically establish a proper structure of dependency relationships between criteria of the original generating polyhierarchy and criteria of the new components, root categories of the new components should be defined in terms of attributive expressions composed of attributes from criteria of the original generating polyhierarchy, A generating polyhierarchy generally encodes a target classification in a compact, clearly understandable form. For example, FIG. 20 schematically shows the generating polyhierarchy of criteria 2000 encoding the sample classification of automobile models considered in the section above titled "Description of the Related Art" and schematically illustrated in FIGS. 1, 2, 3, and 4. A generating polyhierarchy can be represented in a text format using the Polyhierarchy Description Language ('PolyHDL') designed by QNT Software Development Inc. The summary of PolyHDL syntax and its illustrative application to describe generating polyhierarchy 2000 are presented, respectively, in FIGS. 21 and 22. The template classification in PolyHDL format as shown in FIG. 22 can be used as a prototype for developing more detailed car classifications, or included as a standard component in more general classifications of machinery products, means of conveyance, goods for sale, and the like.

To facilitate performing low-level operations with descriptive structures representing criteria, branches, attributes, attributive expressions and their components, the configuration of the data repository used for classification storage, may be optimized. The optimal configuration of the data repository usually depends on a chosen form of the attributive expressions, as it was schematically shown, for example, in the sections above titled "Illustrative Embodiments of Database Configuration Facilitating Simple Collections" and "Illustrative Embodiments of Database Configurations Facilitating Collections with Branch Unions and Unions of Simple Collections".

To support higher-level operations, such as access to a data repository, logical operations on attributive expressions, interactive input and output of object descriptions, programming interfaces for automatic specialization as set forth in box 1970, and the like, an auxiliary software environment is usually required. Functionality of the auxiliary software typically depends on the set of logical operations supported by the chosen form of the attributive expressions, and potentially, application-specific features of the interfaces. For applications utilizing standard sets of operations, the functionality may be supported by a standard software library available for purchase.

At different stages of the method implementation, including construction, management, and use of the polyhierarchical classification, the software environment may generally support a number of operating modes. These operating modes may include, for example:

describing root categories of new criteria and/or sub-hierarchies of criteria for an existing (in particular, empty) generating polyhierarchy of criteria and incorporating new components to the existing generating polyhierarchy;

removing selected criteria and/or sub-hierarchies of criteria from an existing generating polyhierarchy;

adding branches to existing criteria and removing selected branches of criteria;

automatically constructing attributive expressions of classification categories defined by sequences of specializations by applicable criteria;

automatically performing tests for inclusion between categories represented by their attributive expressions;

automatically recognizing applicable criteria at a current specialization level;

browsing an induced polyhierarchy of categories where the attributive expressions describing the categories are automatically constructed in run-time;

dynamically extracting user-specified sub-hierarchies of an induced polyhierarchy of categories using algorithms for retrieving direct parent and direct child categories;

automatically performing set-theory operations on categories represented by their attributive expressions, where a set of supported operations depends on the chosen form of the attributive expressions;

interactively associating classified objects with classification categories via specifying object properties by superposition of applicable criteria with an automatic generation of the respective attributive expression; automatically associating classified objects with classification categories using programming interfaces specifically designed for an automatic identification of object properties in terms of attributive expressions;

moving classified objects from one category to another and removing selected objects from a classification;

interactively searching for particular objects via specifying object properties by superposition of applicable criteria, or using user-specified queries encoding logical statement of a composition of object properties;

automatically searching for particular objects using programming interfaces designed for an automatic generation of queries encoding logical statement of a composition of object properties;

automatically recognizing persistent categories required to be associated with new classified objects, and recording respective attributive expressions in a data repository;

removing attributive expressions of selected persistent categories from a data repository.

As indicated above, aspects of this invention pertain to specific "method functions" implementable through various information processing systems including, but not limited to, electronic, photonic, quantum, biological and mechanical systems. In an alternate embodiment, the invention may be implemented as a computer program product for use with a computer system, control device, interface subsystem, or their components such as integrated circuits. Those skilled in the art should readily appreciate that programs defining the functions of the present invention can be delivered to a computer in many forms, which include, but are not limited to: (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); (c) information conveyed to a computer through communication media, such as a local area network, a telephone network, or a public network like the Internet; or (d) information encoded in a pre-designed structure of hardware component, such as a microchip. It should be understood, therefore, that such media, when carrying computer readable instructions that direct the method functions of the present invention, represent alternate embodiments of the present invention.

The particular embodiments disclosed above, and described with particularity, are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method for building a polyhierarchical classification of objects, the method comprising:
    a) identifying properties of objects considered useful for distinguishing objects under classification;
    b) identifying a plurality of criteria for specializing the identified properties of the objects, wherein each criterion of the plurality of criteria is defined by a set of mutually exclusive attributes;
    c) choosing a form of attributive expressions for describing classification categories, wherein the attributive expressions are information structures encoding logical formulas that define compositions of object properties in terms of attributes from the plurality of criteria, while the form of the attributive expressions is customizable;
    d) identifying a domain of applicability for each criterion, wherein the domains of applicability are representable by attributive expressions composed of attributes from other criteria or the empty attributive expression, and a dependence relationship between criteria is defined by the inclusion of attributes in the attributive expressions, wherein a selected criterion depends on another criterion if the attributive expression defining its domain of applicability includes at least one attribute by the other criterion, and a generating polyhierarchy of criteria is automatically established by the dependence relationships between the criteria, wherein,
        the attributive expressions identifying domains of applicability of criteria, define corresponding root categories in the polyhierarchical classification, wherein each criterion originates from its respective root category, and
        when established, the generating polyhierarchy of criteria implicitly defines an induced polyhierarchy of classification categories without requiring an explicit enumeration of the categories and an ordering between them; and
    e) storing in a computer-readable medium the polyhierarchical classification of objects.

2. A computer-implemented method for building a polyhierarchical classification of objects, comprising:
    a) identifying a plurality of criteria for specializing the objects based on their properties, wherein each criterion of the plurality of criteria is defined by a set of mutually exclusive attributes, wherein each attribute describes one or more properties of the objects;
    b) recurrently defining a root category for each criterion in terms of an attributive expression representing a logical composition of one or more attributes of criteria whose root categories have been previously defined in the recurrent sequence, or the empty attributive expression; wherein no one criterion participates in the definition of its own root category, and each attributive expression encodes a sequence of specializations by criteria so that the root category of each following criterion includes the category represented by the sequence of all previous specializations;
c) storing in a computer-readable medium the plurality of criteria and their root categories in the form of attributive expressions; and
d) using the stored plurality of criteria for polyhierachically structuring, updating and accessing information associated with the objects.

3. The method of claim 2, further comprising for each object to be classified:
a) subsequently specializing properties of the object by selecting attributes of the stored plurality of criteria so that the root category of each following criterion includes the category represented by the sequence of all previous specializations;
b) composing selected attributes into an attributive expression defining a classification category to be associated with the object to be classified;
c) storing the category in a computer-readable medium in the form of its attributive expression, if the category is not already stored; and
d) storing in a computer-readable medium data identifying the classified object as being associated with the category.

4. The method of claim 2, wherein each criteria of the plurality of criteria is identified and assigned a root category simultaneously.

5. The method of claim 2, wherein choosing the form of attributive expressions includes constructing an application-specific form that is designed based on a set of supported logical operations to be used for defining classification categories, wherein:
a) the sequence of specializations encoded by each application-specific attributive expression strictly corresponds to the recurrent descriptions of criteria root categories so that each attributive expression can be derived from the empty attributive expression by means of a number of recurrent specializations satisfying the limitations of criteria applicability; and
b) no one criterion can be used for specialization until its root category is explicitly defined, while each criterion with a predefined root category is available for specialization from a given category if and only if the root category includes the category, and the attributive expression of the category does not already include a complete specialization by the criterion.

6. The method of claim 2, wherein at least one attributive expression contains at least one of:
a) an intersection of attributes of different criteria;
b) an intersection of the unions or complements of unions; wherein each union or complement of union is composed of the attributes of single criterion with no other union or complement of union in the intersection based on the same single criterion;
c) a union of the intersection of attributes or complements of attributes, wherein each intersection is composed of the attributes of different criteria and no one intersection includes another intersection from the same union; or
d) a union of the intersections of unions or complements of unions; wherein each union or complement of union is composed of the attributes of a single criterion with no other union or complement of union in the same intersection based on the same single criterion, and no one intersection includes another intersection from the same union.

7. The method of claim 2, further comprising developing non-application specific software that implements the classification for one or more chosen forms of attributive expressions.

8. The method of claim 2, further comprising permanently storing the classification as a template classification such that it can be associated with a particular set of objects.

9. The method of claim 8, further comprising combining additional criteria with the template classification to form a separate classification.

10. The method of claim 8, further comprising adding the template classification or a part thereof to another polyhierarchical classification.

11. The method of claim 8, further comprising storing an auxiliary subset of categories in terms of their attributive expressions.

12. The method of claim 2, further comprising:
a) classifying a set of objects by selecting attributes of the stored criteria;
b) restricting the selection of attributes of each object in the set of objects based on applicable criteria as defined by their root categories; and
c) storing each object in association with the attributive expression of its classification category.

13. The method of claim 12, further comprising automatically
a) identifying properties of each object in the set of objects;
b) representing each property in terms of the attributes of the stored plurality of criteria; and
c) associating each object with an attributive expression based on the selected attributes.

14. The method of claim 2, further comprising
a) allowing the selection of attributes of an applicable criterion as defined by its root category; and
b) constructing an attributive expression based on the selected attributes as each attribute is selected.

15. The method of claim 14, further comprising displaying only categories and criteria whose attributive expressions differ from the constructed attributive expression by only one attribute.

16. The method of claim 15, comprising searching and retrieving the specific objects associated with attributive expressions.

17. The method of claim 16, further comprising performing the steps automatically via an application that is external to the classification.

18. The method of claim 2, further comprising:
a) allowing the selection of an attribute of any applicable criterion as defined by its root category;
b) allowing the deselection of any selected attributes, wherein the deselection will not make any other attribute's criterion inapplicable;
c) constructing an attributive expression based on the currently selected attributes as each attribute is selected or deselected; and
d) retrieving and accessing the objects contained in the category defined by the currently constructed attributive expression.

19. The method of claim 18, further comprising:
a) displaying only applicable criteria as being valid for the selection of an attribute; and
b) displaying only attributes whose deselection will not make criteria participating in the currently constructed attributive expression inapplicable.

20. The method of claim 2, further comprising automatically performing inclusion test to determine whether a general-specific relationship exists between the selected categories.

21. The method of claim 2, wherein the chosen form of the attributive expressions determines the supported set theory operations on categories in the induced polyhierarchy of categories without violating domains of criteria applicability, wherein the supported operations includes at least one of
   a) intersection of categories;
   b) difference of categories;
   c) unification of categories; or
   d) complement of a category; and
      wherein all the set theory operations are performed in terms of attributive expressions under the limitations of criteria applicability encoded by root categories of the criteria, so that the resulting categories automatically belong to the induced polyhierarchy of categories.

22. The method of claim 21, wherein all possible options for performing set theory operations on selected categories are automatically predicted, so that before entering each command the user is prompted for only valid operations, wherein:
   a) all valid operations are automatically identified in run time by means of formal analysis of attributive expressions of the selected categories and root categories of the criteria participating in their definitions; and
   b) attributive expressions of the resulting categories are automatically derived from the attributive expression of the selected categories and root categories of the criteria.

23. The method of claim 2, further comprising extracting user-specified sub-hierarchies in the induced polyhierarchy of classification categories, wherein the user-specified sub-hierarchies are automatically restored during run-time using algorithms for retrieving direct child categories and direct parent categories of selected classification categories, wherein the direct child and parent categories of the selected categories are defined by the structure of the generating polyhierarchy of criteria and depend on the chosen form of attributive expressions.

24. The method of claim 2, further comprising extending the polyhierarchy classification by introducing an additional attribute to an existing criterion.

25. The method of claim 2, further comprising extending the polyhierarchical classification by introducing an additional criterion into the generating polyhierarchy of criteria, wherein the additional criterion is assigned a root category defined in terms of attributes from existing criteria, and the dependence relationships between the existing criteria and the additional criterion automatically incorporates the additional criterion into the generating polyhierarchy of criteria.

26. The method of claim 2, further comprising:
   a) inserting a second polyhierarchical classification into the polyhierarchical classification;
   b) identifying a root category from which the second classification is to originate from in the given classification,
   c) redefining original root category of the unconditional criteria of the second classification to the identified root category in the classification, and
   d) replacing original attributive expressions of root categories of all the conditional criteria and all other permanent categories of the second classification with their intersections with the attributive expression of the identified root category in the classification.

27. A computer-implemented method for building a polyhierarchical classification of objects, comprising:
   a) identifying a plurality of criteria for specializing selected properties of the objects, wherein each criterion of the plurality of criteria is defined by a set of mutually exclusive attributes, wherein each attribute describes one or more properties of the objects;
   b) recurrently assigning to each criterion of the plurality of criteria an attributive expression that is either empty or represents a logical expression comprising one or more attributes of other criteria in the plurality of criteria whose attributive expressions have already been defined;
      wherein each non-empty attributive expression assigned to a criterion does not participate in its own definition; and
   c) storing in a computer-readable medium the plurality of criteria and their associated attributive expressions.

28. The method of claim 27, further comprising using the stored plurality of criteria for structuring, updating and accessing information related to the objects.

29. The method of claim 27, further comprising:
   a) identifying a specific object;
   b) specializing properties of the object by selecting attributes of the stored plurality of criteria, wherein only attributes of applicable criterion may be selected; and
   c) composing the selected attributes into an attributive expression.

30. The method of claim 29, further comprising:
   a) storing the attributive expression composed of the selected attributes in a computer-readable medium, if that attributive expression is not currently stored; and
   b) storing in a computer-readable medium a link between the attributive expression and the data associated with the object.

31. The method of claim 29, further comprising removing links between the attributive expression and data associated with objects.

32. The method of claim 31, further comprising deleting the attributive expression, if it is not linked with any data and is not assigned to a criterion.

33. The method of claim 29, further comprising;
   a) searching for data linked with the specific object within the data associated with the attributive expression composed of the selected attributes; and
   b) removing the link between the data and the attributive expression composed of the selected attributes, if the data is found.

34. The method of claim 29, further comprising providing data linked to each attributive expression that includes the attributive expression composed of the selected attributes.

35. The method of claim 29, further comprising providing the links to data associated with the attributive expression composed of the selected attributes, if stored, and the links to data associated with any stored attributive expression that can be specialized from the attributive expression composed of the selected attributes.

* * * * *